(12) United States Patent
Joshi et al.

(10) Patent No.: US 9,405,476 B2
(45) Date of Patent: Aug. 2, 2016

(54) SYSTEMS AND METHODS FOR A FILE-LEVEL CACHE

(71) Applicant: Longitude Enterprise Flash S.a.r.l., Luxembourg (LU)

(72) Inventors: Vikram Joshi, Los Gatos, CA (US); Yang Luan, San Jose, CA (US); Michael F. Brown, Campbell, CA (US); Hrishikesh A. Vidwans, San Jose, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 0 days.

(21) Appl. No.: 14/675,521

(22) Filed: Mar. 31, 2015

(65) Prior Publication Data

US 2015/0205535 A1    Jul. 23, 2015

Related U.S. Application Data

(63) Continuation of application No. 13/287,998, filed on Nov. 2, 2011, now Pat. No. 9,003,104, which is a continuation-in-part of application No. 13/028,149, filed on Feb. 15, 2011, now Pat. No. 8,874,823, and a continuation-in-part of application No. 13/192,365, filed on Jul. 27, 2011, now Pat. No. 9,201,677.

(60) Provisional application No. 61/489,230, filed on May 23, 2011, provisional application No. 61/521,676, filed on Aug. 9, 2011.

(51) Int. Cl.
*G06F 12/00* (2006.01)
*G06F 3/06* (2006.01)
*G06F 12/08* (2016.01)

(52) U.S. Cl.
CPC ............ *G06F 3/0613* (2013.01); *G06F 3/0667* (2013.01); *G06F 3/0688* (2013.01); *G06F 12/0811* (2013.01); *G06F 12/0866* (2013.01); *G06F 12/0888* (2013.01); *G06F 12/0897* (2013.01); *G06F 2212/151* (2013.01); *G06F 2212/152* (2013.01); *G06F 2212/222* (2013.01); *G06F 2212/283* (2013.01); *G06F 2212/311* (2013.01); *G06F 2212/463* (2013.01)

(58) Field of Classification Search
CPC .......................... G06F 12/0238; G06F 3/0679
USPC .......................................... 711/100, 103, 154
See application file for complete search history.

(56) References Cited

U.S. PATENT DOCUMENTS

| | | | | |
|---|---|---|---|---|
| 5,542,066 A * | 7/1996 | Mattson | ............... | G06F 12/0804 711/113 |
| 5,809,543 A * | 9/1998 | Byers | ................... | G06F 11/1666 711/120 |
| 8,244,935 B2 * | 8/2012 | Leventhal | ............. | G06F 3/0613 369/47.14 |
| 8,825,937 B2 * | 9/2014 | Atkisson | ............. | G06F 12/0246 711/102 |
| 2011/0265083 A1 * | 10/2011 | Davis | ................... | G06F 12/0866 718/1 |

* cited by examiner

*Primary Examiner* — Tuan Thai

(57) ABSTRACT

A multi-level cache comprises a plurality of cache levels, each configured to cache I/O request data pertaining to I/O requests of a different respective type and/or granularity. The multi-level cache may comprise a file-level cache that is configured to cache I/O request data at a file-level of granularity. A file-level cache policy may comprise file selection criteria to distinguish cacheable files from non-cacheable files. The file-level cache may monitor I/O requests within a storage stage, and may service I/O requests from a cache device.

22 Claims, 33 Drawing Sheets

| TIME (HH:MM) | CLOCK HAND 1 (10 MINUTES) | | CLOCK HAND 2 (1 HOUR) | |
|---|---|---|---|---|
| | BIT 1 | BIT 2 | BIT 1 | BIT 2 |
| 00:00 | 1 | 1 | 1 | 1 |
| 00:05 | 1 | 1 | 1 | 1 |
| 10 MINUTE CLOCK SWEEP | | | | |
| 00:08 | 1 | 0 | 1 | 1 |
| 10 MINUTE CLOCK SWEEP | | | | |
| 00:18 | 0 | 0 | 1 | 1 |
| DATA ACCESS | | | | |
| 00:22 | 1 | 1 | 1 | 1 |
| 10 MINUTE CLOCK SWEEP | | | | |
| 00:28 | 1 | 0 | 1 | 1 |
| 1 HOUR CLOCK SWEEP | | | | |
| 00:31 | 1 | 0 | 1 | 0 |
| 10 MINUTE CLOCK SWEEP | | | | |
| 00:38 | 0 | 0 | 1 | 0 |
| 10 MINUTE CLOCK SWEEP | | | | |
| 00:48 | 0 | 0 | 1 | 0 |
| 10 MINUTE CLOCK SWEEP | | | | |
| 00:58 | 0 | 0 | 1 | 0 |
| DATA ACCESS | | | | |
| 01:04 | 1 | 1 | 1 | 1 |
| DATA ACCESS | | | | |
| 01:07 | 1 | 1 | 1 | 1 |
| 10 MINUTE CLOCK SWEEP | | | | |
| 01:08 | 1 | 0 | 1 | 1 |

Fig. 10

| Next Cache Tag Index | State | Clock Hands | Checksum | Valid Unit Map |
|---|---|---|---|---|
|  |  |  |  |  |
|  |  |  |  |  |

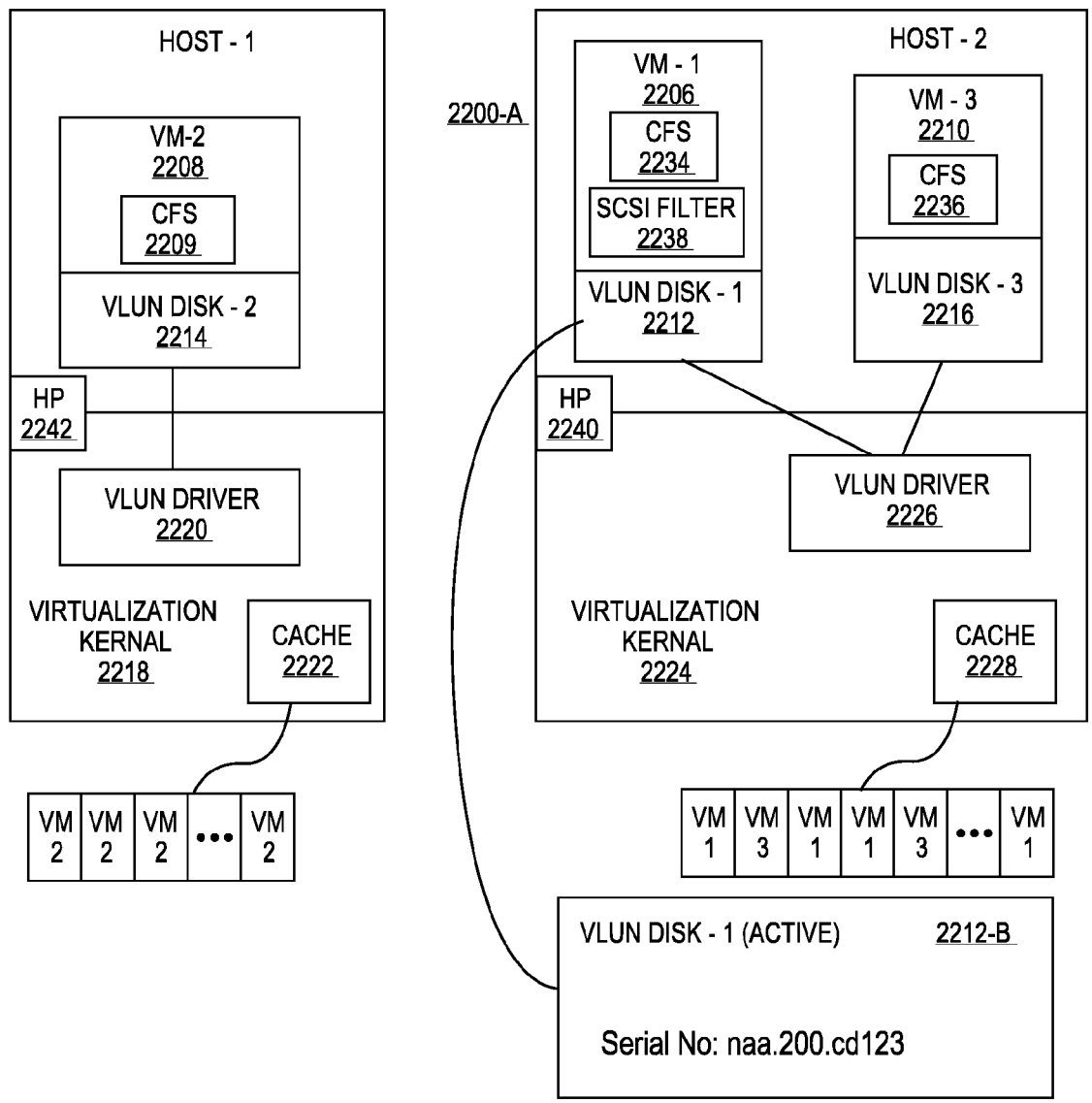
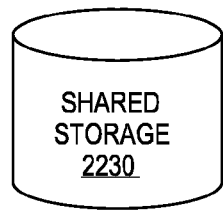
FIG. 22B

| Source ID | State | Clock Hands | Checksum | Valid Unit Map |
|---|---|---|---|---|
|  |  |  |  |  |
Figure 27
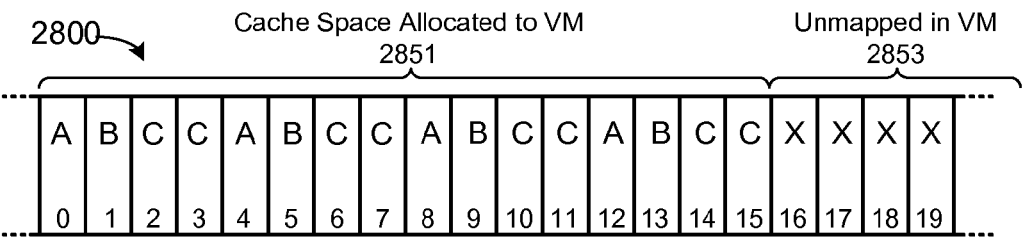
Figure 28A
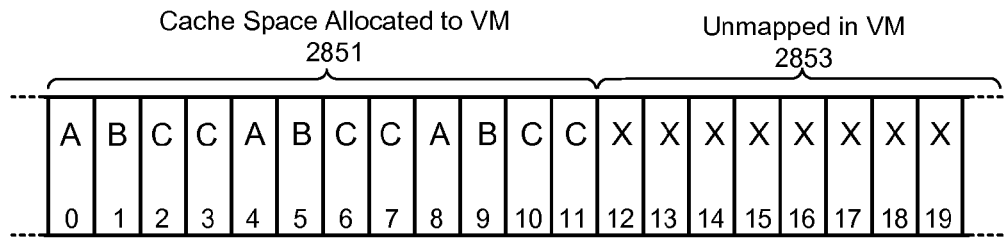
Figure 28B
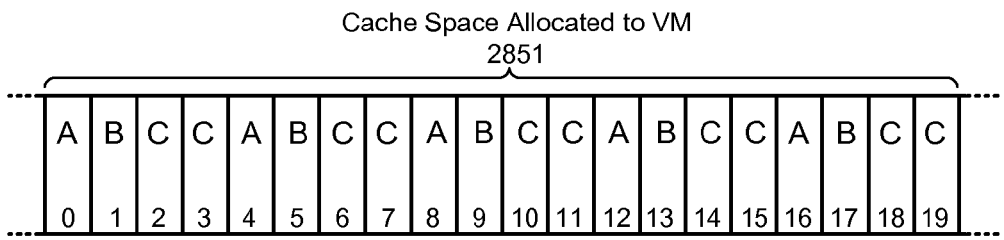
Figure 28C

SYSTEMS AND METHODS FOR A FILE-LEVEL CACHE

TECHNICAL FIELD

This disclosure relates to caching input/output request data on a non-volatile cache, which may comprise a plurality of distinct cache levels, including a file-level cache.

BACKGROUND

Various types of computing environments share resources across multiple hosts or other systems. For example, virtualized systems and virtualized environments often support the sharing and load balancing of resources across multiple hosts or other systems. In this example, a single host can support multiple virtual machines that share common hardware components, storage systems, and the like. These virtual machines may also be referred to as "guest operating systems" as each host is capable of supporting multiple instances of one or more operating systems.

When sharing a data storage system across multiple hosts or multiple virtual machines, the computing environment must properly manage a high volume of data input/output (I/O) operations. The volume of I/O operations is commonly measured in IOPS (I/O Operations Per Second). FIG. 1 illustrates an example of an existing virtualized environment 100 including multiple hosts 102, 104, and 106, and a data storage system 108. In a particular implementation, hosts 102-106 are servers or other computing devices capable of performing a variety of processing and computing functions. Each host 102-106 includes multiple virtual machines 110 operating simultaneously.

During their normal operation, virtual machines 110 initiate data I/O requests, such as data read requests and data write requests, associated with data storage system 108. Data storage system 108 includes multiple data storage drives 112 and/or other data storage mechanisms. The storage resources associated with data storage system 108 are shared among the multiple hosts 102-106 and the virtual machines 110 included in those hosts. Each host 102-106 includes a virtualization kernel 114 (also referred to as a "hypervisor") that manages the virtual machines 110 as well as shared resources, such as data storage system 108.

As the number of virtual machines associated with a particular host increases, there is a corresponding increase in demand for shared resources, such as memory and I/O resources. An increase in I/O resource utilization includes an increased number of data I/O operations that cause a corresponding increase in data communicated between a host and a data storage system. In existing virtualized systems, the increased demand for shared resources such as I/O bandwidth often degrades the performance or application throughput of latency sensitive workload operations within a virtualized system. In these situations, one or more of the virtual machines experiences increased latency or decreased throughput, which may decrease the performance of the virtual machines. Thus, it is desirable to provide a computing environment that improves the handling of data I/O operations associated with multiple hosts or other systems.

It is also desired to provide approaches that leverage existing virtual machine system applications that depend on off-site resources, but still optimizes memory and I/O resources. According to embodiments of the invention, some of these approaches require a local system to cooperate with existing virtual system operating systems to appear to be operating as expected and without any different, circumventing or disruptive operations. As will be seen, the invention provides such approaches, each in an elegant manner.

BRIEF DESCRIPTION OF THE DRAWINGS

FIG. 10 illustrates example clock hand data values associated with a cache tag over time.

FIGS. 22A and 22B depict one embodiment of a system for relocating a virtual machine;

FIG. 27 depicts an exemplary cache tag datastructure;

FIGS. 28A-28C depict exemplary interleaved cache space allocation patterns;

DETAILED DESCRIPTION

The systems and methods described herein relate to the management of data input/output (I/O) operations in a computing environment. Although particular examples discussed herein relate to virtualized environments, the same systems and methods are applicable to any type of computing environment. In particular implementations, the described systems and methods intercept I/O operations in the virtualized environment to dynamically allocate resources, such as cache resources, across multiple virtual machines in the virtualized environment. This management of data I/O operations improves the performance of the virtual machines and reduces the number of I/O operations handled by the primary storage system. Additionally, the management of I/O operations is transparent to other components in the virtualized environment and can be implemented without modification to existing application software or existing data storage systems. Thus operating systems that currently exist will be oblivious to the operations of the embodiments described herein, which will cooperate with the basic operation characteristics of virtual operating systems and not disrupt them, while better optimizing the operations of virtual machines resident in hosts.

Specific systems and methods described herein utilize a cache memory constructed with various memory devices, such as flash memory devices or RAM (random access memory) that may or may not be block oriented. The systems and methods described herein do not differentiate between Flash memory, RAM or other types of memory, and further envision new types of memory developed in the future that will utilize various embodiments described herein. The described systems and methods may utilize any type of memory device, regardless of the specific type of memory device shown in any figures or described herein. Particular systems and methods described herein may generally be referred to as an "I/O hypervisor" due to its management of I/O operations in a virtualized environment.

Figure 1:
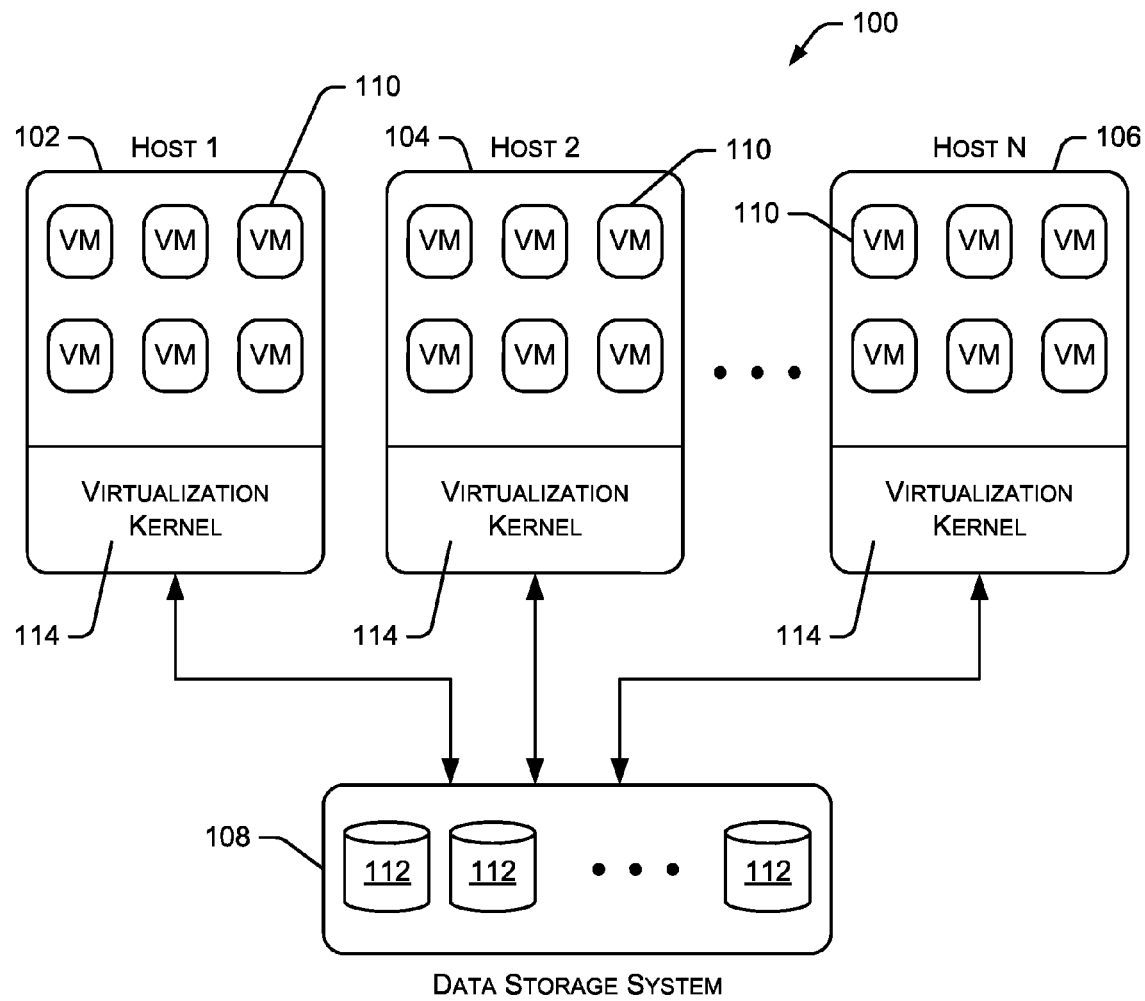
FIG. 1 illustrates an example of an existing virtualized environment including multiple hosts and a shared data storage system.
Figure 2:
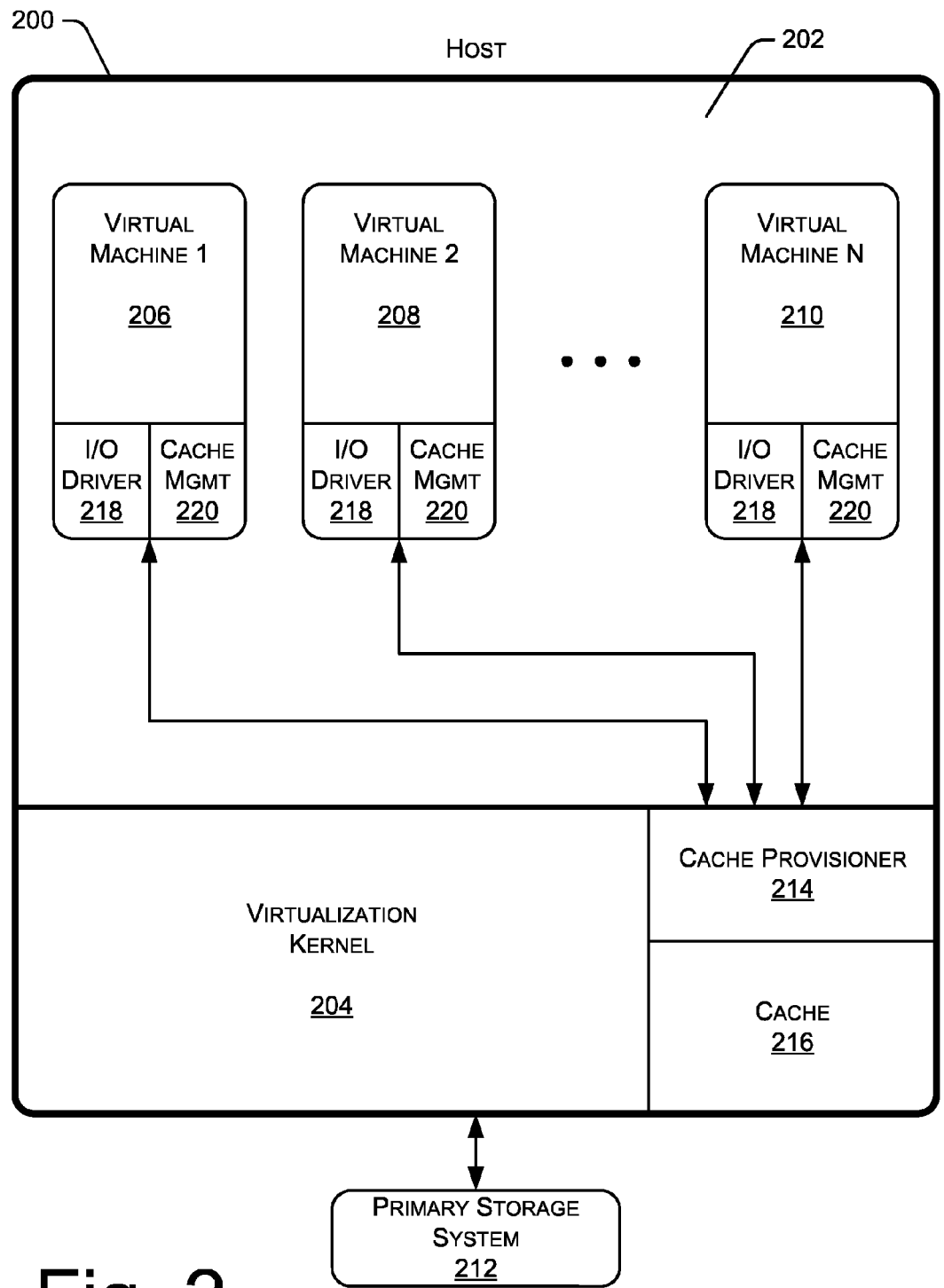
FIG. 2 is a block diagram illustrating example components of a virtualized environment.

FIG. 2 is a block diagram illustrating example components of a host 200 operating in a virtualized environment. Host 200 includes a user space 202 and a virtualization kernel 204. User space 202 includes multiple virtual machines 206, 208 and 210, which are also referred to as "guest operating systems". In various implementations, the system shown in FIG. 2 can operate as a "bare metal" system or a virtual system. A bare metal system has an operating system (such as Windows or Linux) that executes directly on hardware. In a bare metal system, virtualization kernel 204 is not present. In a virtual system, a virtual machine executes on a virtualization kernel (e.g., virtualization kernel 204). The terms "virtual machine" and "guest OS" (guest operating system) are used interchangeably herein. A bare metal system includes a "base operating system" instead of a virtual machine.

Each virtual machine 206-210 can implement a different operating system, such as Windows, Linux, and so forth. In a particular embodiment, host 200 is a computing device capable of hosting the multiple virtual machines 206-210 and supporting the applications executed by the virtual machines and the functions associated with those applications. Host 200 includes, for example, one or more processors, memory devices, communication devices, I/O interfaces, and related components. Although three virtual machines 206-210 are shown within host 200, a particular embodiment may include any number of virtual machines.

Virtualization kernel 204 manages the operation of virtual machines 206-210 as well as other components and services provided by host 200. For example, virtualization kernel 204 handles various I/O operations associated with a primary storage system 212 or other storage devices. Primary storage system 212 is shared among the multiple virtual machines 206-210, and may be shared by multiple hosts. In a particular embodiment, primary storage system 212 includes multiple disk drives or other storage devices, such as storage arrays.

Host 200 also includes a cache provisioner 214 and a cache 216 containing one or more memory devices, such as flash memory devices or RAM. A flash memory device is a non-volatile memory that can be repeatedly erased and reprogrammed. A cache memory constructed using flash memory may also be referred to as a solid state drive (SSD). Cache 216 is managed by cache provisioner 214 to dynamically provision capacity and IOPS to virtual machines 206-210. Cache provisioner 214 allows multiple virtual machines to share the same cache without risk of having two virtual machines access the same cache page. Additional details regarding the operation of cache provisioner 214 and cache 216 are discussed herein.

Each virtual machine 206-210 includes an I/O driver 218 and a cache management system 220—also referred to as a CFS (Cache File System). I/O driver 218 intercepts I/O operations generated by the associated virtual machine and directs the I/O operation to cache provisioner 214 for processing. I/O driver 218 is particularly effective at intercepting I/O operations due to its location within the virtual machine and its close proximity to the source of the data associated with the I/O operation. I/O driver 218 may also be referred to as a "device driver". In a particular embodiment, the I/O drivers are included with an operating system. For example, each device may comprise a respective device driver. These device drivers have a generic component that is a part of the operating system and there is a device-specific component that is typically supplied by the device vendor. In a particular embodiment, the I/O drivers discussed herein are implemented on top of both these drivers. These I/O drivers are in the path of the device driver and intercept well known I/O APIs that are published by the operating system. This architecture is often referred to as a filter driver. In a particular implementation, this is referred to as a filter driver that sits above standard device drivers for I/O operations.

Cache management system 220 contained in each virtual machine interacts with cache provisioner 214 and other components to manage access to cache 216. For example cache management system 220 includes multiple cache tags that are used in associating an address in a virtual machine with a physical address in cache 216. Cache provisioner 214 manages the storage capacity of cache 216 by, for example, allocating cache space among the multiple virtual machines 206-210, as discussed herein. The allocation information associated with a particular virtual machine is communicated to the cache management system in that virtual machine.

Additional details regarding the operation of I/O driver 218 and cache provisioner 214 as well as the use of cache tags 220 are provided below.

In a particular embodiment, each virtual machine 206-210 represents a virtual desktop, such as a desktop environment associated with a particular user. In this embodiment, the user accesses the desktop environment via a terminal or other system. This desktop environment is commonly referred to as VDI (Virtual Desktop Infrastructure). Thus, a single host can replace hundreds or more individual desktop computing systems. In another embodiment, each virtual machine 206-210 represents a server application. In this embodiment, a single host can replace any number of individual software or application servers running multiple server applications.

Figure 3:
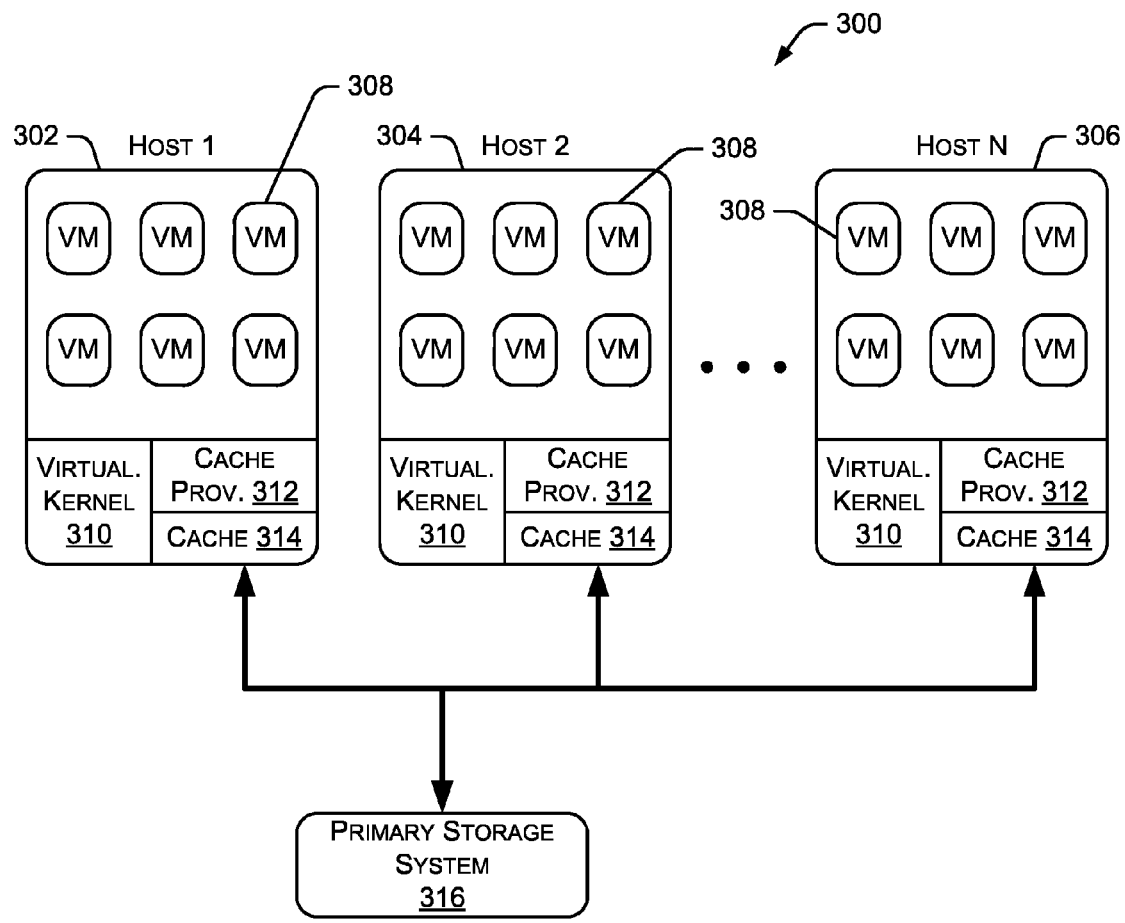
FIG. 3 illustrates an example virtualized environment containing multiple hosts and shared data storage systems.

FIG. 3 illustrates an example virtualized environment 300 containing multiple hosts and shared data storage systems. Virtualized environment 300 includes three host systems 302, 304, and 306, each of which contains multiple virtual machines 308. Although not shown in FIG. 3, each virtual machine 308 includes an I/O driver similar to I/O driver 218 and a cache management system 220 shown in FIG. 2. Each host system 302-306 includes a virtualization kernel 310 and a cache provisioner 312 (labeled "Cache Prov."), similar to those discussed above with respect to FIG. 2. Additionally, each host system 302-306 includes a cache 314, similar to cache 216 discussed with respect to FIG. 2. Although three host systems 302-306 are shown in virtualized environment 300, a particular embodiment may include any number of host systems.

Virtualized environment 300 also includes a primary storage system 316 that is shared among the multiple host systems 302-306 and the multiple virtual machines 308 in those host systems. In a particular embodiment, primary storage system 316 includes multiple disk drives or other storage devices.

Figure 4:
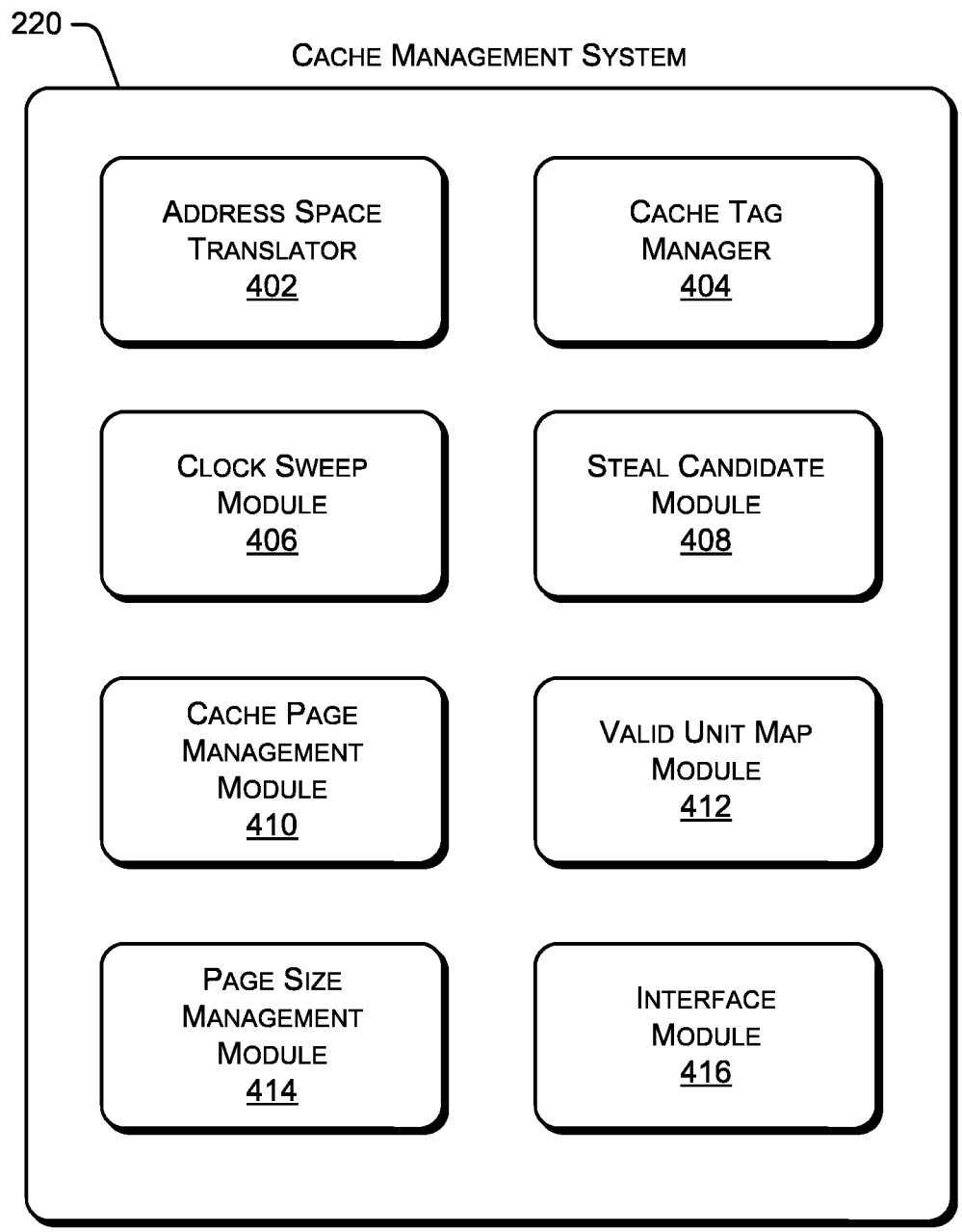
FIG. 4 is a block diagram illustrating example components of a cache management system.

FIG. 4 is a block diagram illustrating example components of cache management system 220 (shown in FIG. 2). Cache management system 220 includes an address space translator 402 that correlates addresses in a primary storage system with storage locations in a cache. A cache tag manager 404 performs various operations associated with a cache and related cache tags, as described herein. A clock sweep module 406 performs various operations associated with the clock hand sweep timer discussed below.

Cache management system 220 also includes a steal candidate module 408 that identifies stored cache data that are candidates for removal from the cache. A cache page management module 410 manages various cache page data and related operations. A valid unit map module 412 identifies valid data stored in a cache and/or a primary storage system. A page size management module 414 performs various page size analysis and adjustment operations to enhance cache performance. Finally, an interface module 416 allows cache management system 220 to interact with other components, devices and systems.

Figure 5:
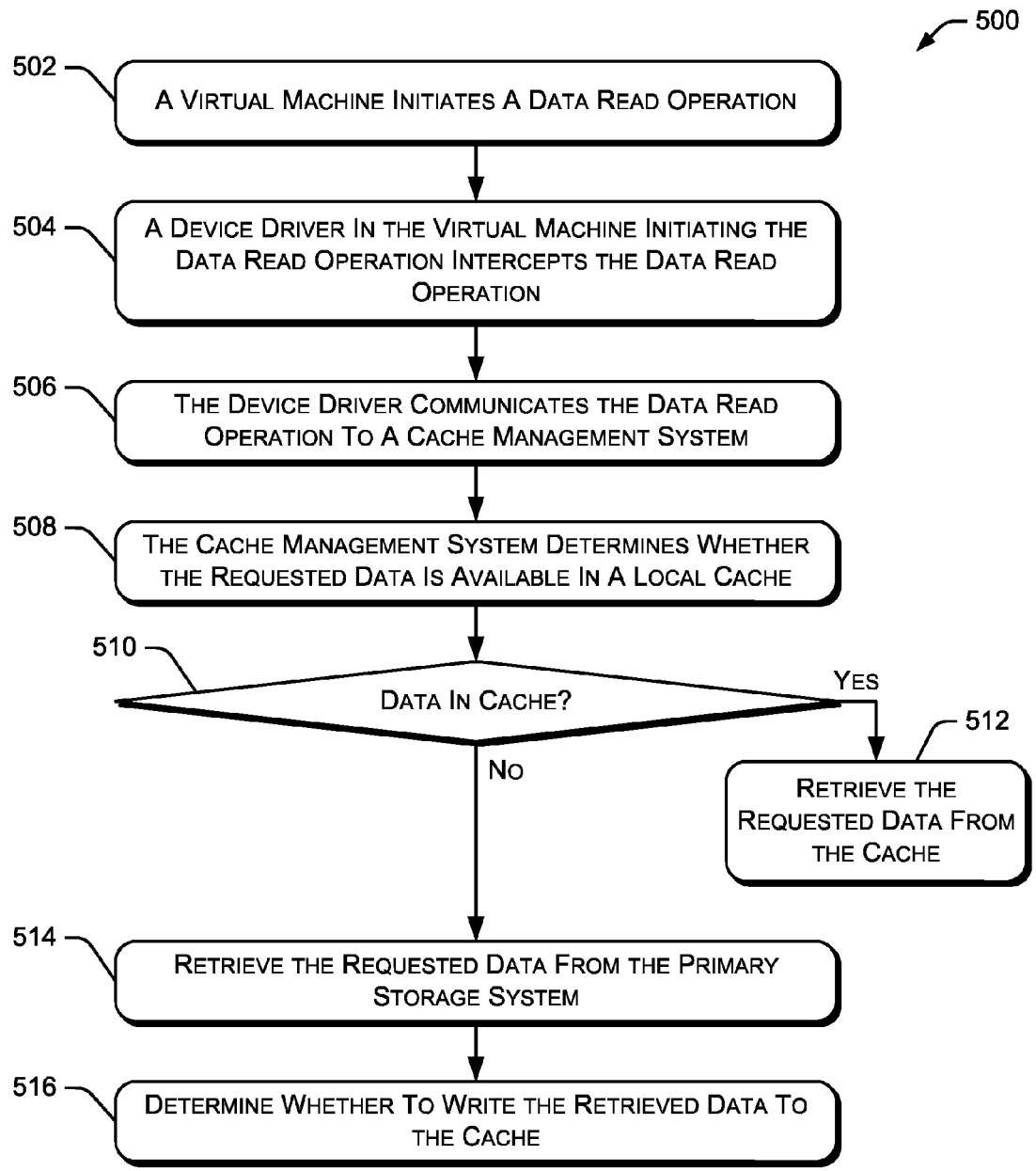
FIG. 5 is a flow diagram illustrating an embodiment of a procedure for implementing a data read operation.

FIG. 5 is a flow diagram illustrating an embodiment of a procedure 500 for implementing a read operation. Initially, a virtual machine initiates a data read operation (block 502). A device driver, such as an I/O driver, in the virtual machine that initiated the data read operation intercepts the data read operation (block 504). The device driver communicates the data read operation to a cache management system (block 506). In alternate implementations, the cache provisioner is located in a different host or in a different component or system.

Procedure 500 continues as the cache management system determines whether the requested data is available in the cache (block 508), such as cache 216 or 314. If the data is determined to be in the cache (block 510), the procedure branches to block 512, where the requested data is retrieved from the cache. If the data is not available in the cache, the procedure branches to block 514, where the requested data is retrieved from the primary storage system, such as primary storage system 212 or 314 discussed above. After retrieving the requested data from the primary storage system, the procedure determines whether to write the retrieved data to the cache (block 516) to improve the storage I/O performance of the virtual machine. This determination is based on various cache policies and other factors.

The cache management system discussed herein (also referred to as a "Cache File System or CFS") treats the flash memory devices as a cache, but uses a file system model. The cache management system develops and maintains a working set for the cache. In general, the working set is the set of data that should be contained in the cache to support optimal performance of the host and its supported virtual machines.

As mentioned above, the cache is created using flash memory devices. These devices typically provide fast read operations, but slow write operations. These slow write operations can result in a significant delay when initially developing the working set for the cache. Additionally, flash devices can generally accept a limited number of write operations. After reaching the "write lifetime" of the flash device, portions of the flash device become unusable and the integrity of the device begins to deteriorate. These characteristics of flash devices are taken into consideration by the cache management system when managing the cache.

Figure 6:
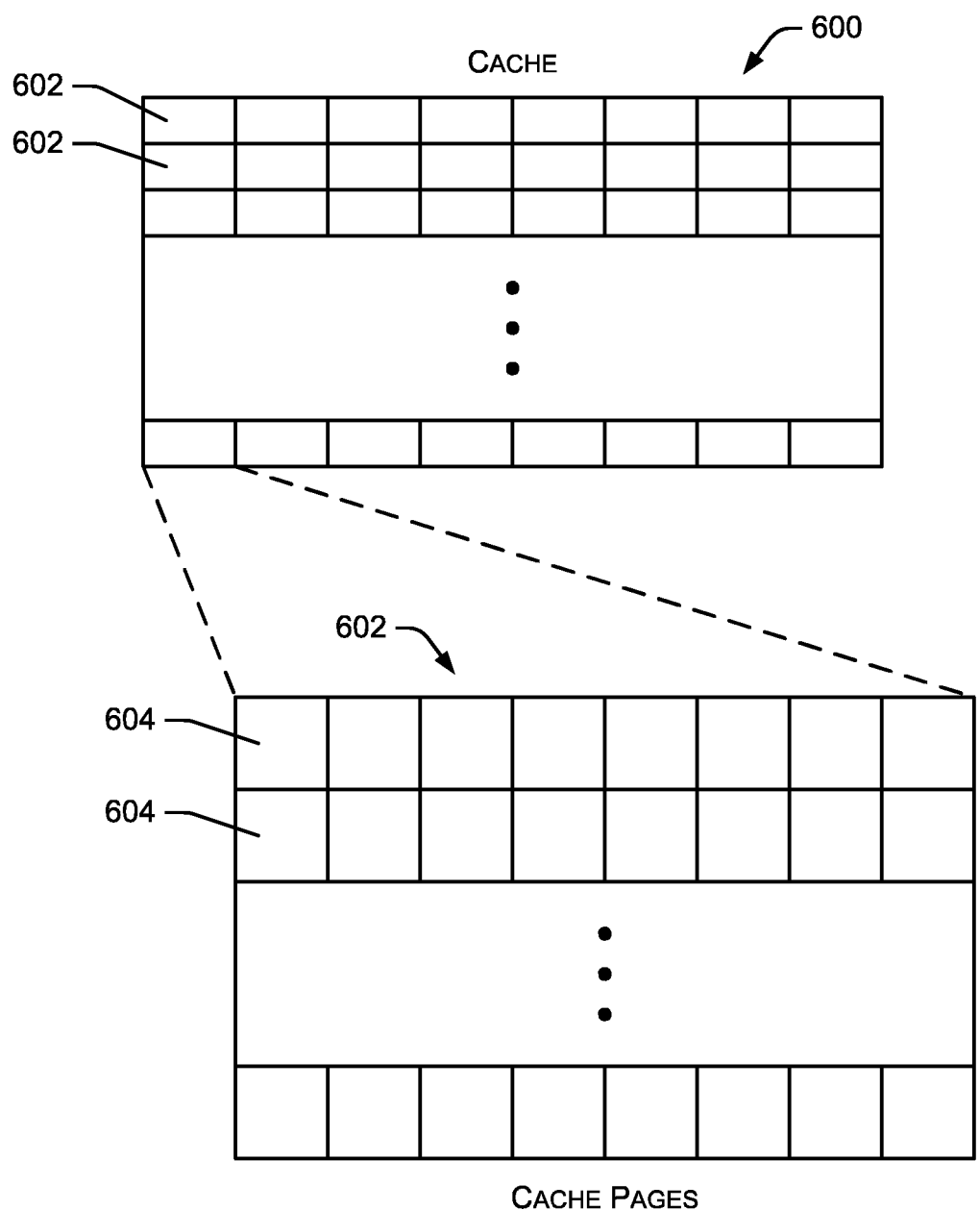
FIG. 6 illustrates an example structure of a data cache and associated cache pages contained in the data cache.

FIG. 6 illustrates an example structure of a cache 600 and associated cache pages contained in the cache. Cache 600 is broken in to multiple chunks 602. A cache can divided into any number of chunks having any size. In a particular embodiment, each chunk 602 contains 256 MB (megabytes) of memory storage. In this embodiment, the number of chunks depends on the cache capacity. For example, a 1 TB (terabyte) cache divided into 256 MB chunks contains 4192 chunks. As shown in FIG. 6, each chunk 602 is divided into multiple cache pages 604.

Cache chunks 602 are assigned to virtual machines based on the cache needs of each virtual machine. The number of chunks 602 assigned to a particular virtual machine can change over time as the cache needs of the virtual machine changes. The number of chunks 602 assigned to a specific virtual machine defines the cache capacity of that virtual machine. For example, if two 256 MB chunks are assigned to a specific virtual machine, that virtual machine's cache capacity is 512 MB. The assignment of chunks 602 to particular virtual machines is handled by the cache provisioner, such as the cache provisioner 214 described above.

Cache tags are used in mapping storage I/O addresses in a virtual machine to actual cache pages 604 (e.g., physical addresses in the cache). The cache tags can cache data associated with any storage device assigned to a virtual machine. These cache tags perform translations between the address of blocks on the storage device (e.g., the primary storage system) and a cache address. In some embodiments, cache tags may be organized linearly in RAM or other memory. This allows the address of the cache tag to be used to locate a physical cache page because of the algorithmic assumption that each cache tag has a linear 1:1 correspondence with a physical cache page. Alternatively, or in addition, cache tags may be organized into another data structure, such as a hash-table, tree, or the like.

As shown in FIG. 2, cache tags 220 associated with a particular virtual machine are stored within that virtual machine. The cache tags contain metadata that associates storage I/O addresses to specific cache pages in the cache. In a particular embodiment, each cache tag is associated with a particular page in the cache.

In a particular embodiment, a "thin provisioning" approach is used when allocating cache chunks to the virtual machines. In this embodiment, each virtual machine is allocated a particular number of cache chunks, as discussed above. However, the entire cache capacity is "published" to each of the virtual machines. For example, if the total cache size is 1 TB, each virtual machine reports that has access to the entire 1 TB of storage space. However, the actual allocation of cache chunks may be considerably smaller (e.g., 256 MB or 512 MB)—based on the current needs of the virtual machine. The allocated cache chunks represent a specific range of cache addresses available within the cache. The cache provisioner dynamically changes these cache chunk allocations as each virtual machine's working set requirements change. Regardless of the number of cache chunks actually allocated to a particular virtual machine, that virtual machine reports that it has access to the entire 1 TB cache. The guest OS of the virtual machine operates with a virtual disk of size 1 TB. By using a "thin provisioning" approach, the actual storage space allocated to the virtual machine can be changed dynamically without the guest operating system indicating an error condition.

Figure 7:
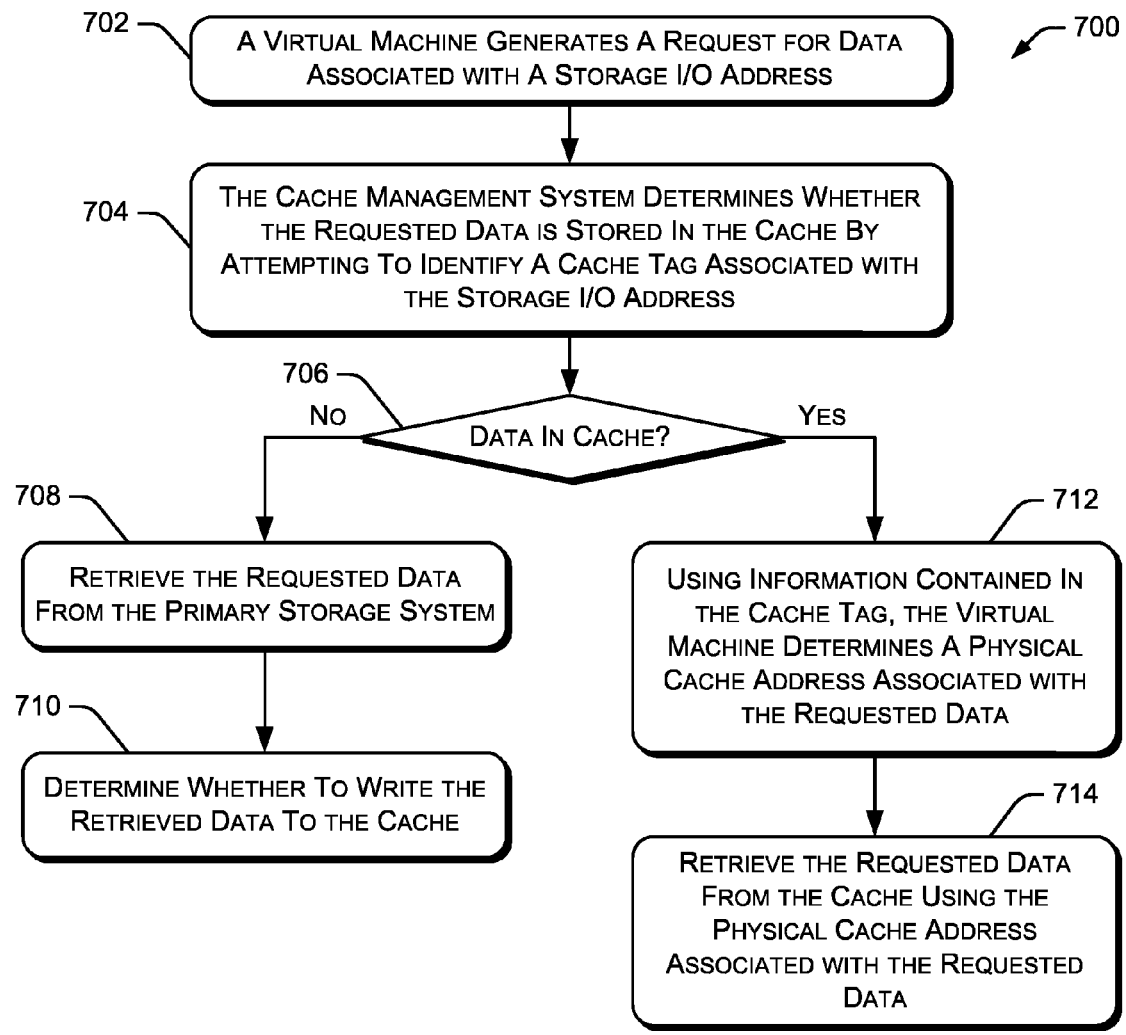
FIG. 7 is a flow diagram illustrating an embodiment of a procedure for implementing a virtual machine read operation using cache tags.

FIG. 7 is a flow diagram illustrating an embodiment of a procedure 700 for implementing a virtual machine read operation using cache tags. Initially, a virtual machine generates a request for data associated with a storage I/O address (block 702). The cache management system (e.g., cache management system 220 shown in FIG. 2) determines whether the requested data is stored in the cache by attempting to identify a cache tag associated with the storage I/O address (block 704). If the requested data is not in the cache (block 706), the requested data is retrieved from the primary storage system (block 708). After retrieving the requested data from the primary storage system, the procedure determines whether to write the retrieved data to the cache (block 710) to improve storage I/O performance of the virtual machine. This determination is based on various cache policies and other factors.

If the decision is to write the retrieved data to the cache, the cache management system uses the memory address of the cache tag to determine a physical cache address associated with the data to be written. The data is then written to the cache using the physical cache address associated with the data.

If the requested data is in the cache (block 706), the cache management system uses the memory address of the cache tag to determine a physical cache address associated with the requested data (block 712). The requested data is then retrieved from the cache using the physical cache address associated with the requested data (block 714).

Storing the cache tag information within the associated virtual machine allows the virtual machine to easily determine where the data is stored physically in the cache without having to access a different system or process. Instead, the systems and methods described herein allow each virtual machine to quickly access cache tags, which increases the speed and efficiency of the I/O operations. Additionally, the virtual machine typically understands the data it is processing better than other systems. For example, the virtual machine understands the nature and context of the data it is processing. This understanding of the data enhances the development and management of an effective working set. Other systems that are external to the virtual machine may simply see the data as raw data without any context or other understanding. Thus, having the cache tag information stored locally in the virtual machine enhances the operation of the virtual machine and the I/O operations.

Figure 8:
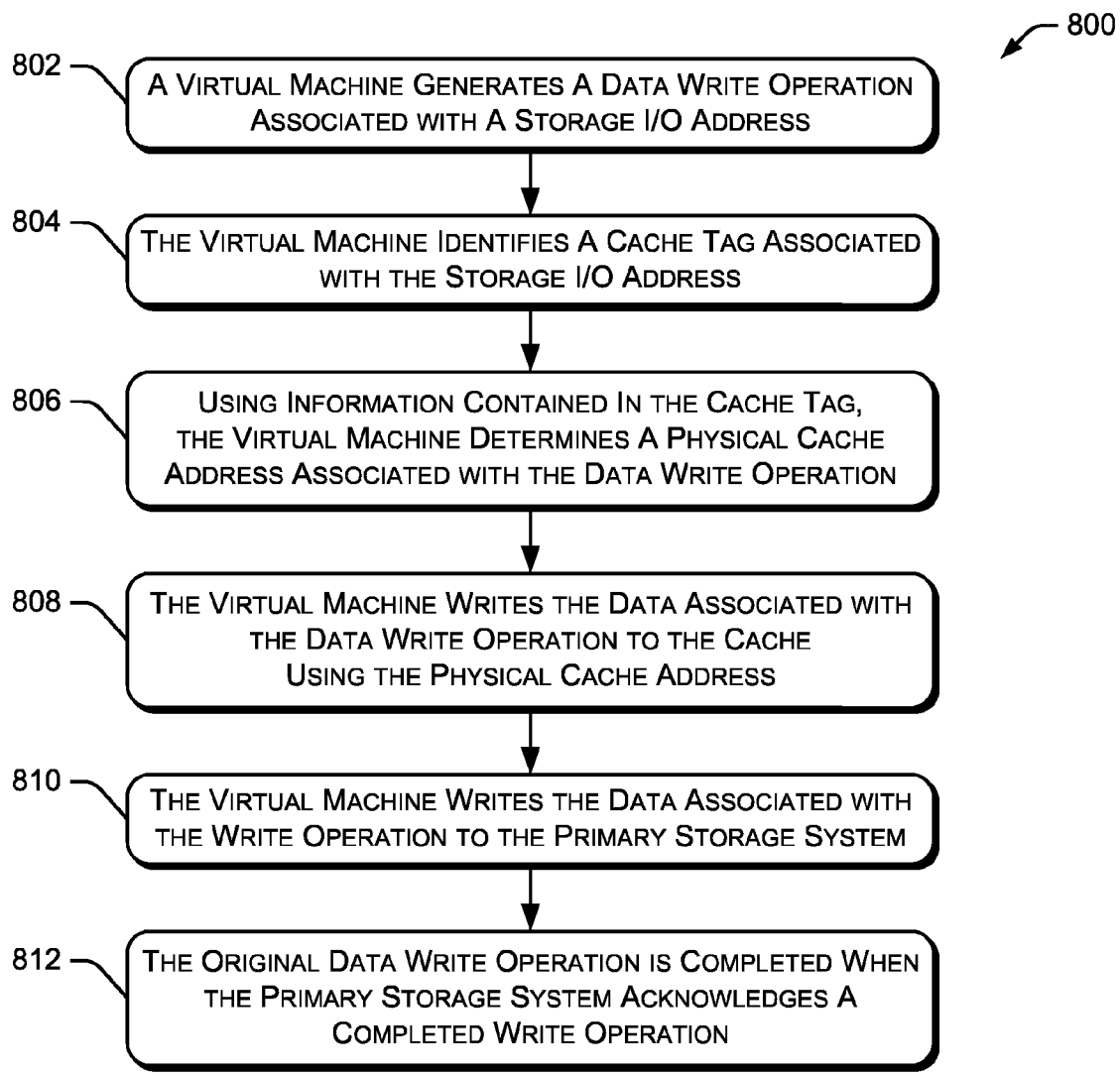
FIG. 8 is a flow diagram illustrating an embodiment of a procedure for implementing a data write operation.

FIG. 8 is a flow diagram illustrating an embodiment of a procedure 800 for implementing a data write operation. Initially, a virtual machine generates a data write operation associated with a storage I/O address (block 802). As discussed herein, the storage I/O address is translated to a physical address in the cache device using the cache tags stored within the cache management system of the virtual machine. The virtual machine identifies a cache tag associated with the storage I/O address (block 804). Using the information contained in the cache tag, the virtual machine determines a physical cache address associated with the data write operation (block 806).

Next, the virtual machine writes the data associated with the data write operation to the cache using the physical cache address (block 808). The virtual machine also simultaneously writes the data associated with the data write operation to the primary storage system (block 810). The original data write operation is completed when the primary storage system acknowledges a completed write operation (block 812).

In a particular implementation, the cache discussed herein is a write-through cache. This type of cache writes data to both the primary storage system and the cache. A write completion is acknowledged after the write operation to the primary storage system is completed, regardless of whether a corresponding write operation to the cache has completed. In specific embodiments, cache write operations can be queued and completed as the cache speed allows. Thus, a cache with a slow write speed (or a queue of pending write operations) does not degrade performance of the overall system. Cache tags associated with incomplete or queued write operations are identified as "pending." After the write operation completes, the associated cache tag is identified as "valid". When the cache tag is identified as "pending," any attempted read of the data associated with the cache tag results in a cache miss, causing retrieval of the requested data from the pending memory buffer associated with the I/O, or from the primary storage system.

As mentioned above, each cache tag stored in a virtual machine is associated with a particular cache page. Additionally, the systems and methods described herein are capable of dynamically allocating cache resources (e.g., cache chunks) to the virtual machines in a virtualized environment. Using the features of the present invention, the number of cache tags associated with a particular virtual machine can be increased beyond the number of cache pages actually associated with the virtual machine. In certain embodiments, a user changes the configuration of the cache management system and cache allocations by increasing the number of cache tags allocated such that a determination can be made whether a given number of cache tags will provide for efficient use of the cache by a particular virtual machine. This increase in cache tags allows the cache management system to determine whether increasing the number of cache pages assigned to the particular virtual machine will likely improve the cache hit rate for that virtual machine. In other words, the systems and procedures described herein assist in determining cache misses caused by limited cache storage capacity. Specifically, this allows us to determine cache capacity misses. In other embodiments, a module of the cache management system may dynamically change the configuration of the cache management system and cache allocations by increasing or decreasing the number of cache tags allocated such that a determination can be made whether a given number of cache tags will provide for efficient use of the cache by a particular virtual machine.

Figure 9:
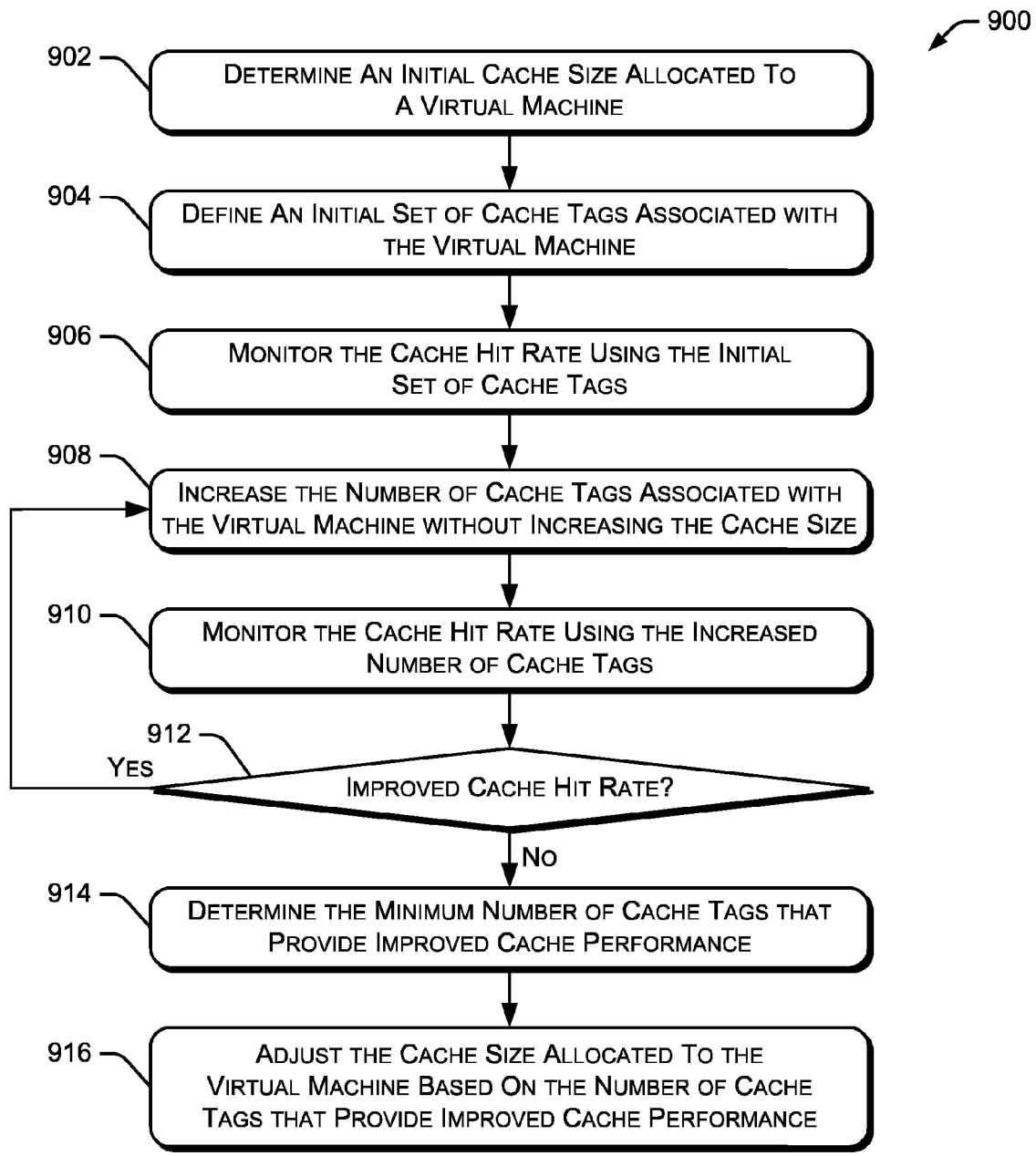
FIG. 9 is a flow diagram illustrating an embodiment of a procedure for allocating cache resources to a virtual machine.

FIG. 9 is a flow diagram illustrating an embodiment of a procedure 900 for allocating cache resources to a virtual machine. In a particular embodiment, procedure 900 is performed as part of a "profiler" process that analyzes data associated with a particular system. Initially, the procedure determines an initial cache size allocated to a virtual machine (block 902). The procedure then defines an initial set of cache tags associated with the virtual machine (block 904). The number of cache tags in this initial set corresponds to the initial cache size allocated to the virtual machine. The cache management system monitors the cache hit rate using the initial set of cache tags (block 906).

The procedure increases the number of cache tags associated with the virtual machine without increasing the cache size (block 908). For example, the procedure may increase the number of cache tags by an amount that corresponds to assigning an additional cache chunk to the virtual machine. However, the additional cache chunk is not actually assigned to the virtual machine at this point in the evaluation procedure. Next, procedure 900 monitors the cache hit rate using the increased number of cache tags (block 910). After monitoring the cache hit rate with the increased number of cache tags for a period of time, the procedure determines whether the cache hit rate has improved (block 912). If the cache hit rate has improved as a result of the additional cache tags, the procedure returns to block 908 to further increase the number of cache tags associated with the virtual machine.

The process of increasing the number of cache tags and monitoring the results continues until the increase in cache tags does not improve the cache hit rate. At this point, procedure 900 determines the minimum number of cache tags that provide improved cache performance (block 914). In an alternate embodiment, the procedure determines an optimal number of cache tags that provide optimal cache performance. The procedure then adjusts the cache size allocated to the virtual machine based on the number of cache tags that provide improved cache hit rate performance (block 916). Dynamic addition of cache chunks or capacity to a virtual machine is based on both the hit rate and other policy that handles cache resource provisioning to other virtual machines. The hit rate, IOPS improvements, and cache capacity are also adjusted using policy that can be controlled by the user or implemented algorithmically based on rules specified by the user.

In a particular embodiment, the number of cache tags added at block 908 is substantially the same as the number of the cache pages in a particular cache chunk. Thus, allocating additional cache resources to the virtual machine is performed by allocating a number of cache chunks that corresponds to the minimum number of cache tags that provide improved cache performance.

FIG. 10 illustrates example clock hand data values 1000 associated with a cache tag over time. The clock hand data values utilize two bits of information for each clock hand. In the example of FIG. 10, which includes two clock hands, a total of four bits are used. Thus, the memory usage to store these bits of data is considerably less than other systems that use pointers and other data structures requiring significant amounts of storage space.

Each clock hand has a different time interval. In the example of FIG. 10, one clock hand has a time interval of ten minutes and the other clock hand has an interval of one hour. The time interval associated with each clock hand indicates the frequency with which the clock hand "sweeps" the clock hand data bits. For example, a clock hand with a time interval of ten minutes clears one of the two clock hand data bits every ten minutes. Each time a cache page is accessed (a cache hit), all clock hand bits associated with the cache page are reset to a value of "1".

As shown in FIG. 10, all clock hand bits are initially set to "1" (e.g., at time 00:00). After the first ten minute clock sweep, Bit 2 of clock hand 1 is cleared to "0". The clock hand bits associated with the one hour clock hand are unchanged because the one hour clock sweep has not yet occurred. In this example, the ten minute clock sweep occurs at time 00:08, which is less than ten minutes. This occurs because the initial time (00:00) is not necessarily aligned with a clock sweep time.

After a second ten minute clock sweep without any access of the cache page, the Bit 1 of clock hand 1 is cleared, leaving a clock hand value of "00". At this time, the cache page associated with this example is identified as a "steal" candidate; i.e., the cache page is a candidate for removal from the cache due to a lack of access of the cache page data. A separate table or other listing is maintained for cache pages in which both clock hands have been cleared. Cache pages with both clock hands cleared are top candidates for "steal" prior to cache pages with only one clock hand cleared.

As shown in FIG. 10, if a cache page data access occurs at time 00:22, all clock hand bits are set to "1". At time 00:31, the one hour clock hand sweeps, causing the clearing of Bit 2 of clock hand 2. That bit is set (along with setting all other clock hand bits) at time 01:04 due to a cache page data access. Although the particular example of FIG. 10 uses two clock hands with ten minute and one hour intervals, alternate embodiments may use any number of clock hands, each having any time interval.

Figures 11, 12:
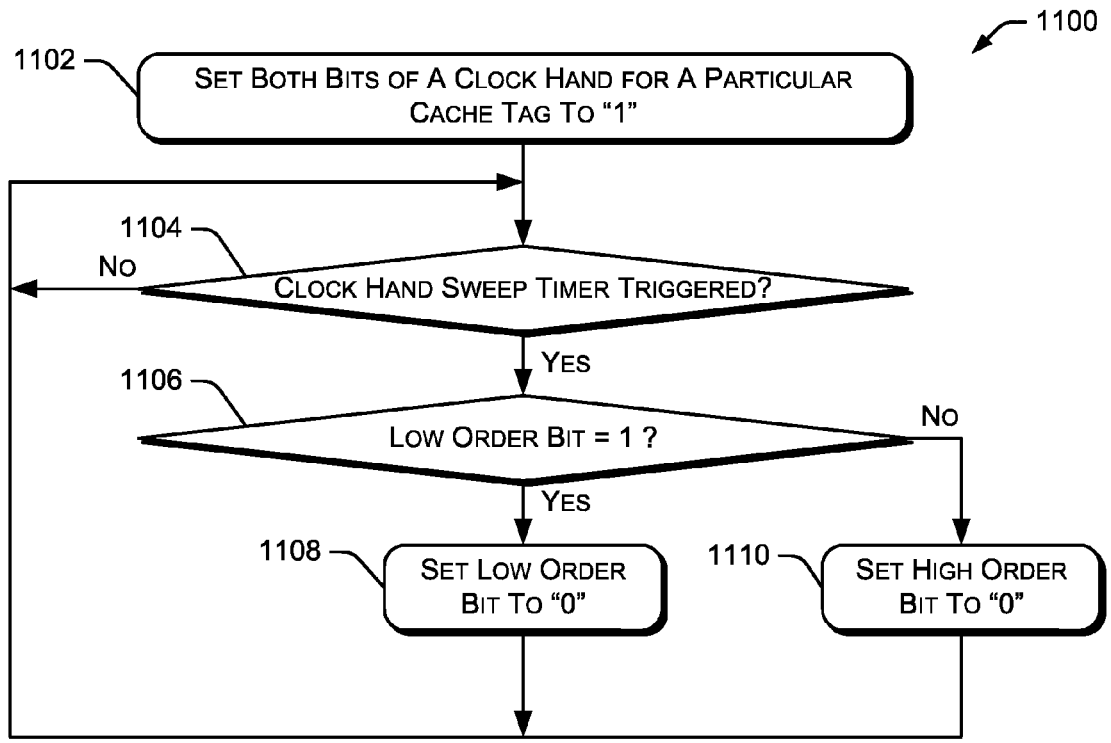
FIG. 11 is a flow diagram illustrating an embodiment of a procedure for managing clock hand data associated with a cache tag.
FIG. 12 illustrates an example cache tag data structure.

FIG. 11 is a flow diagram illustrating an embodiment of a procedure 1100 for managing clock hand data associated with a cache tag. In a particular embodiment, procedure 1100 is performed by each virtual machine in a host. Initially, both bits of a clock hand for a particular cache tag are set to "1" (block 1102). The procedure continues by determining whether a clock hand sweep timer has triggered (block 1104). In a particular embodiment, a separate thread is dedicated to the clock hand sweep. That thread has an associated timer that triggers at each clock sweep interval. If a clock hand sweep timer triggers, the procedure determines whether a low order bit associated with the clock hand is "1" (block 1106). If so, the low order bit is set to "0" (block 1108). If, at block 1106, the low order bit was already set to "0", the procedure branches to block 1110, which sets the high order bit to "0". Procedure 1100 then returns to block 1104 to continue monitoring for the triggering of the clock hand sweep timer.

FIG. 12 illustrates an example cache tag data structure. The size of several fields in the cache tag are dynamic. Thus, the entire cache tag data structure size is dynamic. A cache tag provides a translation between a storage I/O address and a physical address in the cache. The cache tag data structure shown in FIG. 12 includes a next cache tag index that is fixed in size which is used to link cache tags in the hash table. In operation, the next cache tag index is converted to a memory address to find the next cache tag linked to the current cache tag. A state field is fixed in size and identifies a current state of the cache tag. Example state transition diagrams are discussed below with respect to FIG. 13. The clock hands field is a dynamic field and indicates the number of clock hands (e.g., the number of time intervals) associated with the cache tag. The checksum field is a dynamic field that varies in size based on the size of the cache page and the level of integrity desired by the user. A user can determine the strength of the checksum. For example, a user can obtain a higher level of integrity for the checksum by allocating more bits of memory to the checksum.

Finally, the cache tag data structure includes a valid unit map field is a dynamic field that identifies which units in a page are cached. An example of a unit within a cache page is a sector. For example, a particular page may have one or more sectors that are missing or no longer valid. The valid unit map identifies the status of all units associated with a particular cache page to prevent accessing data in units that is not valid.

Figure 13:
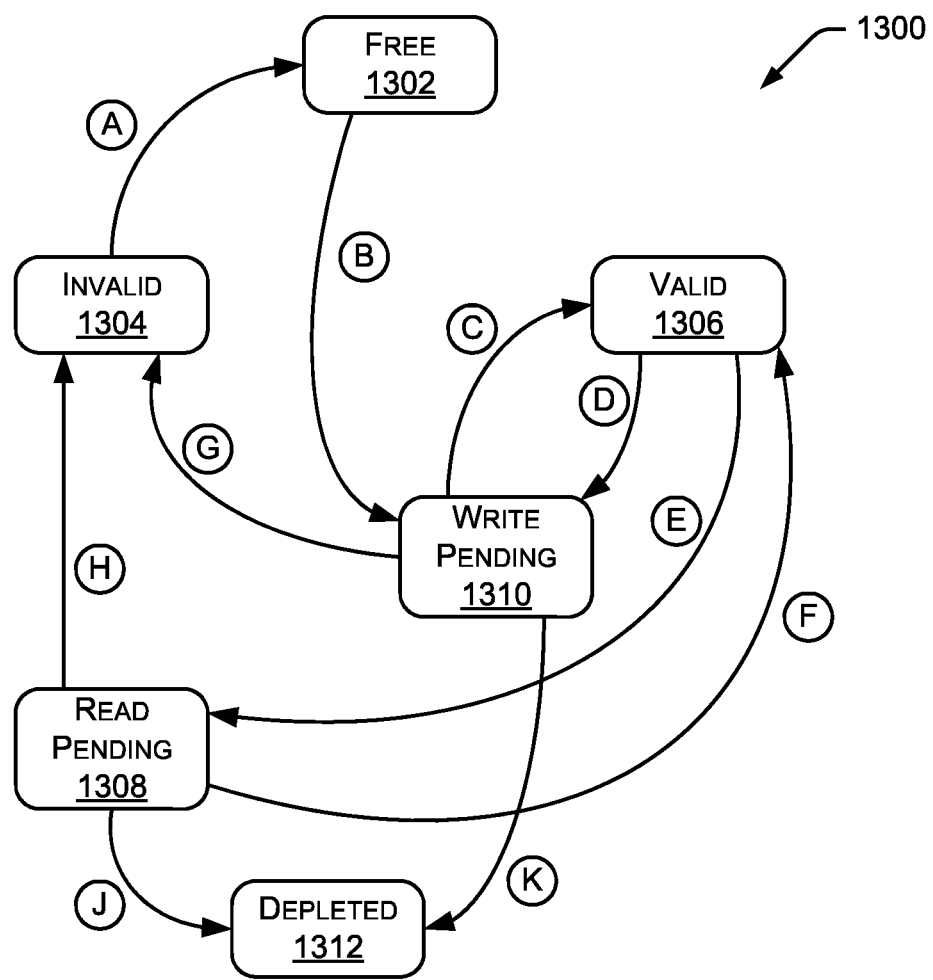
FIG. 13 illustrates an example state transition diagram.

FIG. 13 illustrates an example state transition diagram 1300 associated with the operation of the systems and methods described herein. State transition diagram 1300 includes multiple states: a Free state 1302, an invalid state 1304, a valid state 1306, a read pending state 1308, a write pending state 1310, and a depleted state 1312. In one embodiment, these various states 1302-1312 are associated with data stored in a cache. The transitions between states 1302-1312 are identified by letters (illustrated in circles) in FIG. 13. Transition B (from free state 1302 to write pending state 1310) occurs upon initiation of a cache write operation or a cache read update (a write to the cache caused by a read miss for the cache). Transition C occurs when a cache write or cache read operation is completed successfully. Transition D occurs upon initiation of a cache write operation or a cache read update. Transition E occurs upon initiation of a cache read operation. Transition F occurs upon successful completion of a cache read operation. Transition G occurs when a concurrent write operation occurs before an earlier cache write operation or cache read update completed. Transition H occurs when a concurrent write operation occurs before an earlier read operation completes. Transition A (from invalid state 1304 to free state 1302) occurs when the first cache write or read update is completed successfully. Transition J occurs when a cache read operation fails. Transition K occurs when a cache write operation or a read update fails.

As discussed above, cache chunks (and corresponding cache tags) are allocated dynamically among multiple virtual machines. The allocation is dynamic due to changes in data storage requirements, changes in applications executing on the virtual machines, and the like.

In a particular implementation of the systems and methods described herein, the cache supports multiple page sizes. Different applications executing in the virtual environment may require different page sizes to function properly. For example, some applications always perform 32K data I/O operations. For these applications, it is desirable to use a large cache page size, such as 16K or 32K, to minimize the number of data I/O operations necessary to handle the 32K of data. For example, if the cache page size is 4K and the application performs a 32K data I/O operation, eight cache pages must be accessed to read or write the 32K of data. Performing eight separate I/O operations to accommodate the 32K of data is a burden on system resources and dramatically increases the number of I/O operations that must be processed by the system. In contrast, if the cache page size is 16K, only two I/O operations are required to process the 32K of data. Thus, the larger cache page size reduces I/O operations and the corresponding burden on system resources.

Using larger cache page sizes also reduces the number of cache tags, thereby reducing the memory space required to store the cache tags. For example, in a one terabyte cache having 4K cache pages, 256 M cache tags are necessary to provide a single cache tag for each cache page. In the same system using 16K cache pages, 64 M cache tags are needed. Thus, the larger cache page size reduces the number of cache tags and the memory resources needed to store the cache tags.

Although larger cache page sizes can reduce I/O operations and reduce the number of cache tags, in certain situations a larger cache page size can result in underutilized cache resources. For example, if a system is using a 32K cache page size and an application performs a 4K I/O operation, only a small fraction of the 32K page is used (28K of the page is not needed). This situation results in significant unused cache resources. Therefore, the systems and methods described herein support multiple cache page sizes to improve utilization of system resources, such as I/O resources and cache storage resources.

Different applications have different data storage characteristics. Applications can be characterized as having "sparse address spaces" or "dense address spaces". Sparse address spaces tend to have scattered data with significant gaps between different groupings of data. In contrast, dense address spaces tend to have data that is more compact with fewer (or smaller) gaps between different groupings of data. When selecting cache page sizes for a particular virtual environment, it is important to consider the data storage characteristics (e.g., sparse or dense address spaces) associated with applications executing in the virtual environment. There can be exceptions where a sparse address space may comprise groups of contiguous data where the groups are sparsely located. In such cases one can use large pages even though the address space is sparse.

In a particular embodiment, data associated with existing applications can be analyzed prior to implementing a system or method of the type described herein. This prior analysis allows the system to be "tuned" based on typical application data. After the systems and methods are implemented, the dynamic nature of the system allows for adjustments to cache page sizes, cache allocations, system resources, and other parameters based on changes in the operation of the application.

In a particular implementation, a cache is divided into multiple sections such that each section supports different cache page sizes. Because application I/O workloads can vary a particular cache page size for one application may be more efficient than for another application. One objective in using different cache page sizes is to minimize the number of I/O requests that cross over a cache page boundary in order to make the I/O operations as efficient as possible. For example, a cache may be divided into four sections, two of which support 4K cache pages, one that supports 16K cache pages, and one that supports 32K cache pages. The cache pages in these different sections are allocated to different applications based, for example, on the data storage characteristics of the applications.

In one embodiment, a different hash table is used for each different cache page sizes. Each hash table has its own associated hash function that identifies a particular hash slot in the table based on an address provided to the hash function. When using multiple hash tables, such as a 4K hash table and a 16K hash table, the systems and methods perform a lookup operation for each hash table. Performing a lookup in both hash tables is necessary because a 4K address could be contained within a 16K entry in the 16K hash table. To enhance the lookup process, the systems and methods described herein apply one or more algorithms based on a percentage of cache hits associated with different cache page sizes, a success rate associated with different hash tables, and other factors to weight the lookup between the different hash tables and thereby improve the lookup efficiency.

In a particular implementation, an algorithm uses both the percentage of cache hits associated with cache page sizes and the success rate associated with different hash tables to search for data in a cache.

In other embodiments, the systems and methods use a single hash table associated with the smallest cache page size, such as 4K and still presents the feature of a virtual machine using multiple different page sizes. Although the cache supports multiple cache page sizes, the hash table uses a 4K page size exclusively. This approach eliminates the need to perform a lookup in multiple hash tables associated with different cache page sizes. In this scheme a 16K page I/O would require four hash table lookups in the single has table and groups of cache tags are managed as one.

In certain situations, it is desirable to prevent one or more cache pages from being stolen or usurped by another virtual machine. This is accomplished in the systems and methods discussed herein by "pinning" the cache tags associated with the cache pages that are to be protected from being stolen. Cache tags are pinned by setting the state bit to "pinned state" in the cache tag.

Pinning cache tags is used in a variety of situations. For example, a system may "freeze" a group of cache tags associated with a virtual machine and move the cache tags to a persistent storage device to preserve the virtual machine's working set. Later, when the virtual machine "warms up", the cache tags are retrieved from the persistent storage device, actual data is read back from the primary or shared storage, thereby recreating the working set. This allows the virtual machine to resume operation immediately with a fully functioning working set, rather than taking a significant period of time recreating the working set.

Pinning cache tags are also useful to lock a range of addresses in the cache. For example, a user can pin specific data within the cache to prevent the data from being replaced or modified. The user may know that the specified data is critical to the operation of the virtual machine and wants to ensure that the data is always available in the cache.

In certain situations, a portion of data associated with a read operation is available in the cache, but a portion is not available (or not valid) in the cache. This condition is referred to as a partial cache hit or a partial cache miss. In these situations, the system must decide whether to retrieve all of the data from the primary storage system or retrieve a portion from the cache and the remainder from the primary storage system. The decisions involving what's available in the cache can result in more than one I/O to primary or shared storage (which may be more efficient when doing sequential I/Os).

In certain embodiments, the cache management system 220 is configured to manage a partial cache miss as efficiently as possible to minimize the number of I/O requests forwarded on to the primary storage. In addition to managing partial cache miss I/O requests, the cache management system 220 mitigates the amount of fragmentation of I/Os to primary storage based on I/O characteristics of the I/O requests. Fragmentation of I/Os (also known as I/O splitting) refers to an I/O request that crosses a cache page boundary or is divided between data that resides in the cache and data that resides on the primary storage. The I/O characteristics may include whether the I/O is contiguous, the size of the I/O request, the relationship of the I/O request size to the cache page size, and the like. In affectively managing partial cache hits and fragmentation of I/O requests, the cache management system 220 may coalesce I/O requests for non-contiguous address ranges and/or generate additional I/O requests to either the cache or the primary storage.

In a particular embodiment, a checksum is calculated for each cache page. When calculating the checksum, the system only performs the calculation on the valid data, based on a valid unit map (e.g., the valid data sectors). When a write operation is performed that increases the number of valid data sectors, the checksum is recalculated to include the new valid data sectors.

Figure 14:
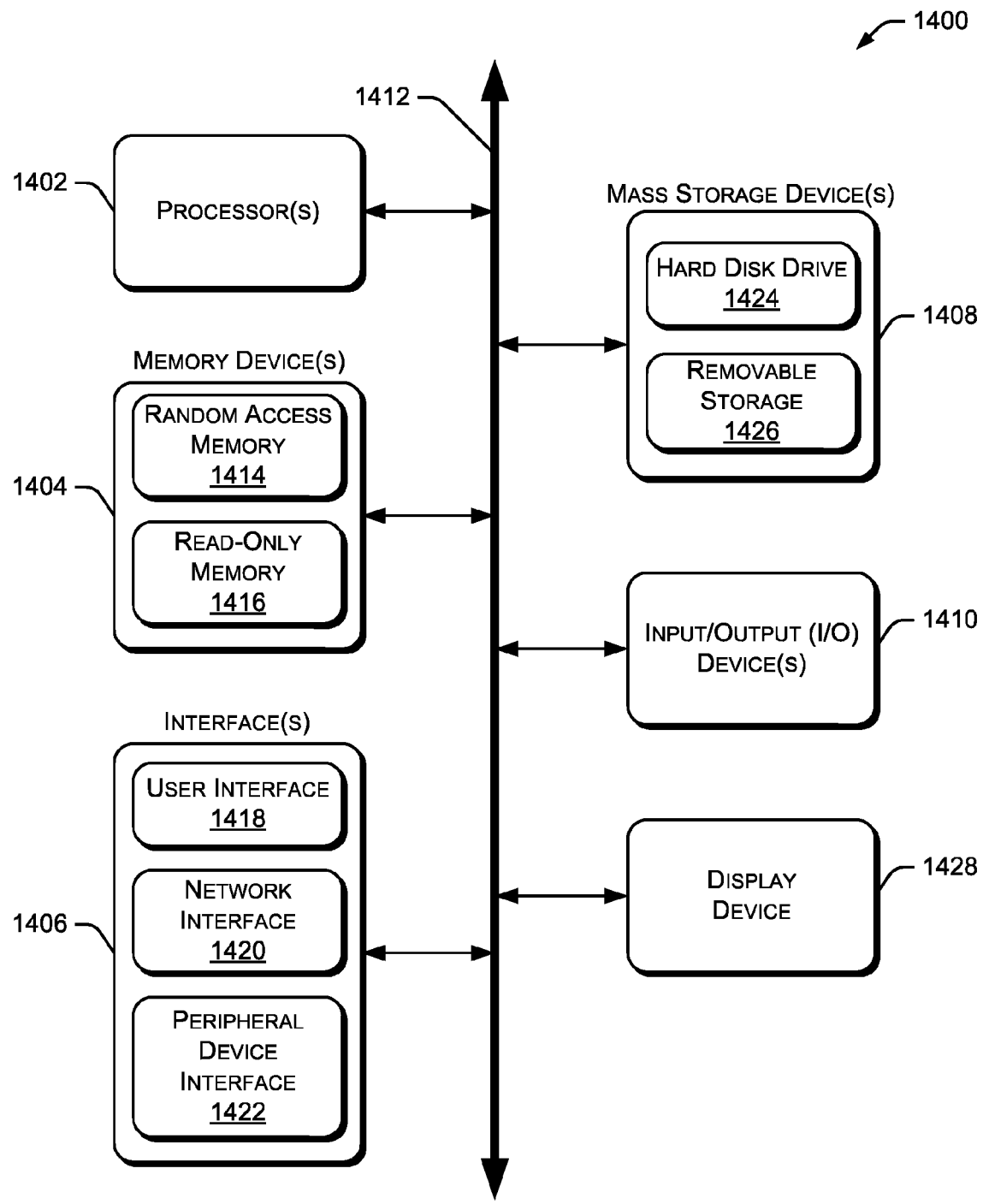
FIG. 14 is a block diagram illustrating an example computing device.

FIG. 14 is a block diagram illustrating an example computing device 1400. Computing device 1400 may be used to perform various procedures, such as those discussed herein. Computing device 1400 can function as a server, a client, or any other computing entity. Computing device 1400 can be any of a wide variety of computing devices, such as a desktop computer, a notebook computer, a server computer, a handheld computer, and the like.

Computing device 1400 includes one or more processor(s) 1402, one or more memory device(s) 1404, one or more interface(s) 1406, one or more mass storage device(s) 1408, one or more Input/Output (I/O) device(s) 1410, and a display device 1428 all of which are coupled to a bus 1412. Processor(s) 1402 include one or more processors or controllers that execute instructions stored in memory device(s) 1404 and/or mass storage device(s) 1408. Processor(s) 1402 may also include various types of computer-readable media, such as cache memory.

Memory device(s) 1404 include various computer-readable media, such as volatile memory (e.g., random access memory (RAM)) 1414 and/or nonvolatile memory (e.g., read-only memory (ROM)) 1416. Memory device(s) 1404 may also include rewritable ROM, such as Flash memory.

Mass storage device(s) 1408 include various computer readable media, such as magnetic tapes, magnetic disks, optical disks, solid state memory (e.g., Flash memory), and so forth. As shown in FIG. 14, a particular mass storage device is a hard disk drive 1424. Various drives may also be included in mass storage device(s) 1408 to enable reading from and/or writing to the various computer readable media. Mass storage device(s) 1408 include removable media 1426 and/or non-removable media.

I/O device(s) 1410 include various devices that allow data and/or other information to be input to or retrieved from computing device 1400. Example I/O device(s) 1410 include cursor control devices, keyboards, keypads, microphones, monitors or other display devices, speakers, printers, network interface cards, modems, lenses, CCDs or other image capture devices, and the like.

Display device 1428 includes any type of device capable of displaying information to one or more users of computing device 1400. Examples of display device 1428 include a monitor, display terminal, video projection device, and the like. Interface(s) 1406 include various interfaces that allow computing device 1400 to interact with other systems, devices, or computing environments. Example interface(s) 1406 include any number of different network interfaces 1420, such as interfaces to local area networks (LANs), wide area networks (WANs), wireless networks, and the Internet. Other interfaces include a user interface 1418 and a peripheral device interface 1422.

Bus 1412 allows processor(s) 1402, memory device(s) 1404, interface(s) 1406, mass storage device(s) 1408, and I/O device(s) 1410 to communicate with one another, as well as other devices or components coupled to bus 1412. Bus 1412 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1400, and are executed by processor(s) 1402. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In another embodiment, an issue of compatibility that occurs within virtual systems is addressed. In certain virtual systems, some of the processes make certain assumptions about the environment in order to properly operate.

In a single host, there typically will be multiple virtual machines operating in the host. Each virtual machine will have its own separate I/O drivers and also separate cache management module to manage local storage operations from the perspective of each particular virtual machine. Each virtual machine needs to share the local storage cache and each virtual machine will have its own unique demand for space on the local storage cache during its operation. Multiple virtual disks may be created on the local cache storage, and these can be exposed to the local virtual machines. During operation of the various virtual machines, the demand can vary among the different virtual machines. As a result, capacity in the local cache may not be efficiently utilized by the virtual machines, and cache capacity may be wasted.

In one example, a thin provisioned storage is provided, such as a thin provisioned cache, for dynamic allocation of storage space among multiple virtual machines within a host. Since virtual machines are dynamic in nature, their demand for storage space may vary. If they share actual storage space with other virtual machines, the use of the storage space by a group of virtual machines may conflict. For example, if one or more virtual machines experience a higher than normal I/O traffic rate, their operations may become bogged down, causing lags in output. Other machines may experience a lower than normal I/O traffic rate at the same time, leaving their allocated storage space unutilized. Thus, in some cases, the higher I/O virtual machines' use of actual storage space may be unnecessarily restricted by rigid or inefficient allocation schemes. Virtual machines may be transferred from one host to another, may become inactive or offline for some period of time, may power down or rest on a host that needs to power down, or its demand for storage space may change up or down during operation. Thus, it would be useful if the storage space allocated to the group of virtual machines could be dynamically allocated and balanced, where actual storage space allocated to any one machine can be apportioned more intelligently. As such, dynamic allocation of storage space could serve to reduce lag time for virtual machines that demand more space and I/O transfers by provisioning more space when other virtual machines associated with the same storage demand less space. The embodiment provides such solutions in an elegant manner.

In typical virtual machine environments, shared storage is utilized among multiple hosts that have equal access to the common storage space. The shared storage may be a clustered file system, a virtual machine file system (VMFS), where the system provides correctness and consistency among the various virtual machine hosts using file based locking and other methods.

One common feature in virtual machine systems is the ability to move a virtual machine from one host to another host. VMWare™ has a product called VMotion™ that enables virtual machines to move from one host to another, where the main storage of the moving virtual machine is maintained on storage that is shared among two or more hosts. The virtual machine may be a live operating virtual machine located on one host, and the desire is to be able to move the virtual machine from one host to another without interruption in the virtual machine during relocation. This is possible because the multiple hosts see and share the common data storage system. Thus, the virtual machine may move from one host to another without shutting down or rebooting the virtual machine, the move is transparent to the moving virtual machine.

When a virtual machine boots up and begins to run, it communicates with its available resources, such as storage devices, network devices, etc., similar to a physical machine. It may send out Small Computer System Interface (SCSI) inquiries out to connected storage devices to determine what resources are available, and it discovers what storage is available to the virtual machine. The storage available to the virtual machine is virtual storage that is encapsulated in a file. The encapsulated file is the main storage space for the virtual machine. Thus, the storage for the virtual machine is now instantiated in a file and becomes a virtual hard drive. In prior art devices, this file is stored in the common data storage system shared among multiple hosts.

According to one embodiment, it is desired to store the virtual disk of the virtual machines hosted on a single host in local storage, such as the cache storage. In such a system, if a virtual machine existed that stores its main drive storage on the local cache storage located on the host, a virtual machine would not be able to move from one host to another host. Again, in prior art systems, the virtual disk of the virtual machines is located on storage that is shared among the host that are physically separate but commonly connected to the shared storage system.

A virtual disk's block number zero translates to offset zero in the file encapsulating the virtual disk. In response to the virtual machine sending out inquires to define its storage, the system replies that the virtual machine has a virtual storage. As that layer begins to receive reads and writes as SCSI (Small Computer System Interface) traffic it will convert this into file I/O and read and write to the shared file. Thus, a seed of a virtual disk is created on the shared storage that may be visible by the separate hosts. As a result, once the virtual machine moves from one host to another, the virtual machine may continue to operate because it can communicate with the original virtual disk associated with the virtual machine that was moved to the second host just as it did from the prior host. Therefore, in order to move a virtual machine from one host to another, there must be shared storage.

Once provisioned, each virtual machine expects to have access to predetermined and contiguous storage space for which it has the cache tags (discussed above). In one embodiment, a dynamic provisioning approach is provided to divide the cache storage into chunks that can be dynamically provisioned to the separate virtual machines according to their demand for space. According to one embodiment, a cache provisioner is encapsulated in a virtual logical unit number (VLUN) driver, provided to manage the chunks of storage data that is allocated to each virtual machine. A LUN is a misnomer of an acronym known in the art as a place where a machine can read and write a block of data, for example an array of storage disks or other storage devices. In a system, storage devices or arrays publish storage space as addressed that do not necessarily identify a particular storage device or individual storage disks. According to one embodiment, a VLUN disk is a virtual storage space allocated to a virtual machine. Since multiple virtual machines will typically be operating on a single host, the chunks of storage space that come available will likely be located in different physical areas of the cache storage. A VLUN device driver creates a VLUN disk that is assigned to the virtual machine.

In virtual systems, the virtual operating systems run processes and manage operations within the system with fundamental assumptions that allow different processes within the virtual system to properly operate and not conflict with other processes. In one example, virtual operating systems operate with the assumption that each separate virtual machine operates with a fixed amount of storage space that typically does not change. Thus, an operating system may react adversely or may not operate properly if there is sudden atypical change in storage space size for a virtual machine operating within a host or other device. Thus, it may be important for a virtual machine to appear to have a fixed allotment of storage space, such as cache storage space. According to one embodiment, this is achieved by allocating a limited amount of physical storage space to any one virtual machine as needed by the particular machine's needs. And, to avoid any potential conflict with a virtual operating system that expects to detect a fixed storage space allocated to a particular virtual machine, a virtual amount of space is allocated to each virtual machine that is equal to a set amount of space that a virtual machine's operating system expect to detect. Thus, in operation, the virtual operating system will detect the set amount of virtual storage space that is allocated, and it will appear to the operating system that that amount of space is constant and consistent. However, in actual operation, the space allocated to a particular virtual machine may vary according to the machine's demand for storage space. And, the overall space will be traded among the virtual machines accessing storage cache to ensure that each virtual machine has no more cache storage than it actually needs, while the operating system is essentially fooled to thinking that each virtual machine has a fixed amount of cache storage space allocated to it.

Thus, the VLUN manager is configured to manage the dynamic allocation of the available chunks to the virtual machines that need them. The storage is thus physically managed in chunks by the VLUN driver that provides each virtual machine with the notion of contiguous chunks of storage space. The VLUN driver thus in a sense translates the allocation from the virtual space into the underlying physical chunks allocated to each virtual machine by the VLUN driver. As a result, the embodiment allows the system within the host to divide up the cache storage into chunks that it can allocate on the fly to the various virtual machines using virtualization of the storage space allocated to the individual virtual machines. In operation, the VLUN driver maintains mapping of the virtual space of each virtual machine to actual physical storage space located in the cache storage. This allows the VLUN to dynamically increase and decrease the size of the allocated storage space of each virtual machine.

Figure 15:
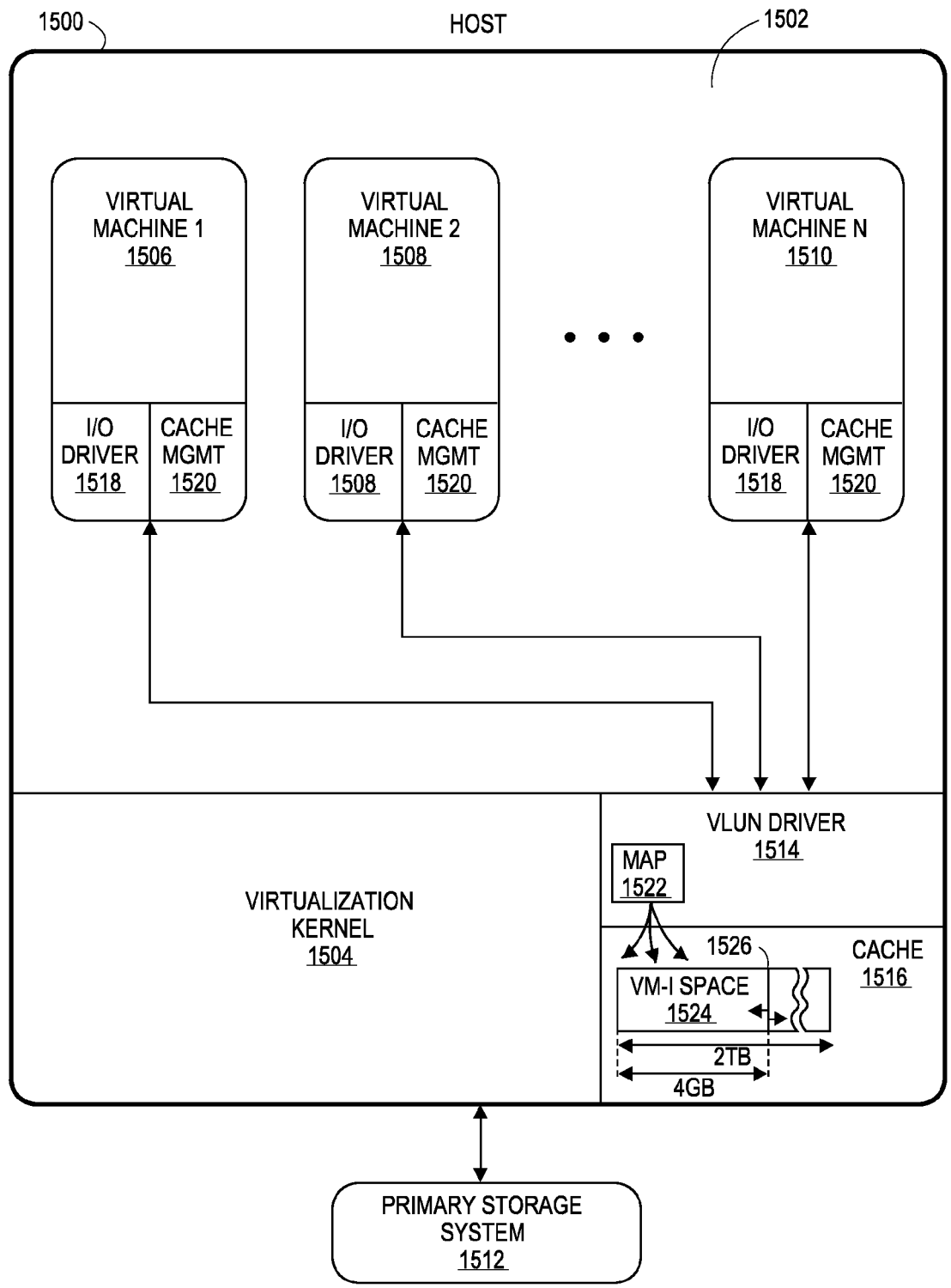
FIG. 15 is a block diagram of one embodiment of a host comprising a plurality of virtual machines and a VLUN driver.

Referring to FIG. 15, a block diagram is shown illustrating example components of a host 1500 operating in a virtualized environment, with further details regarding VLUN operations. Similar to systems discussed above, host 1500 includes a user space 1502 and a virtualization kernel 1504. User space 1502 includes multiple virtual machines 1506, 1508 and 1510. Each virtual machine communicates with a VLUN driver 1514 that communicates with cache storage 1516. Each virtual machine has individual I/O drivers 1518 and cache management modules 1520 for managing the communications with the VLUN driver and cache. The cache memory utilized in one embodiment is Flash storage, but may be other types of storage devices. Flash memory is an expensive resource that should be used efficiently and sparingly to keep costs of devices down. In one embodiment, the amount of physical storage that is allocated to any one virtual machine may be varied. This would allow a relatively small cache storage space to dynamically allocate storage space to a number of virtual machines without having to allocate a fixed storage space for each virtual machine. If done properly, virtual machines may be serviced with varying amounts of storage space as they each need them according to their actual demand for cache storage space, and space may be allocated to increase allocations to some virtual machines and decrease allocations to others to keep the net amount of space required for a group of virtual machines to a minimum. Fixed space allocations for each virtual machine would require allocating the maximum capacity needed by each virtual machine. Thus, allowing for variable allocations of space allows for device designs to have a smaller overall flash storage required compared to a device that sets a fixed amount for each virtual machine.

Map module 1522 may be configured within the VLUN to map the virtual space allotted to each virtual machine to physical space existing in the cache storage. Since the actual physical space allocated to a particular virtual machine may not be the same as the virtual cache storage space of the host, the two need to be reconciled so that the virtual machine can properly store and retrieve data (read and write data) stored in the physical cache storage.

For example, cache space allocated for Virtual Machine-1 1506 is illustrated diagrammatically as space 1524 in cache 1516. The virtual space allocated to this virtual machine in this example is two terabytes (2 TB), and the physical cache storage space that is actually allocated to this virtual machine in this example is four gigabytes (4 GB). As discussed above, in one embodiment, a virtual machine is configured to have an allocated physical storage space appear to its operating system as a fixed amount (2 TB in this example), but to have an actual physical storage allocation that is necessary for the particular virtual machine's operation (4 GB in this example). The actual physical storage space for any particular virtual machine may be more or less than that which appears to the operating system. Thus, the virtual barrier 1526 between a particular host's actual allocated physical space and virtual physical space may be different and may vary dynamically as groups of virtual machines that share common cache storage operate.

Figure 16:
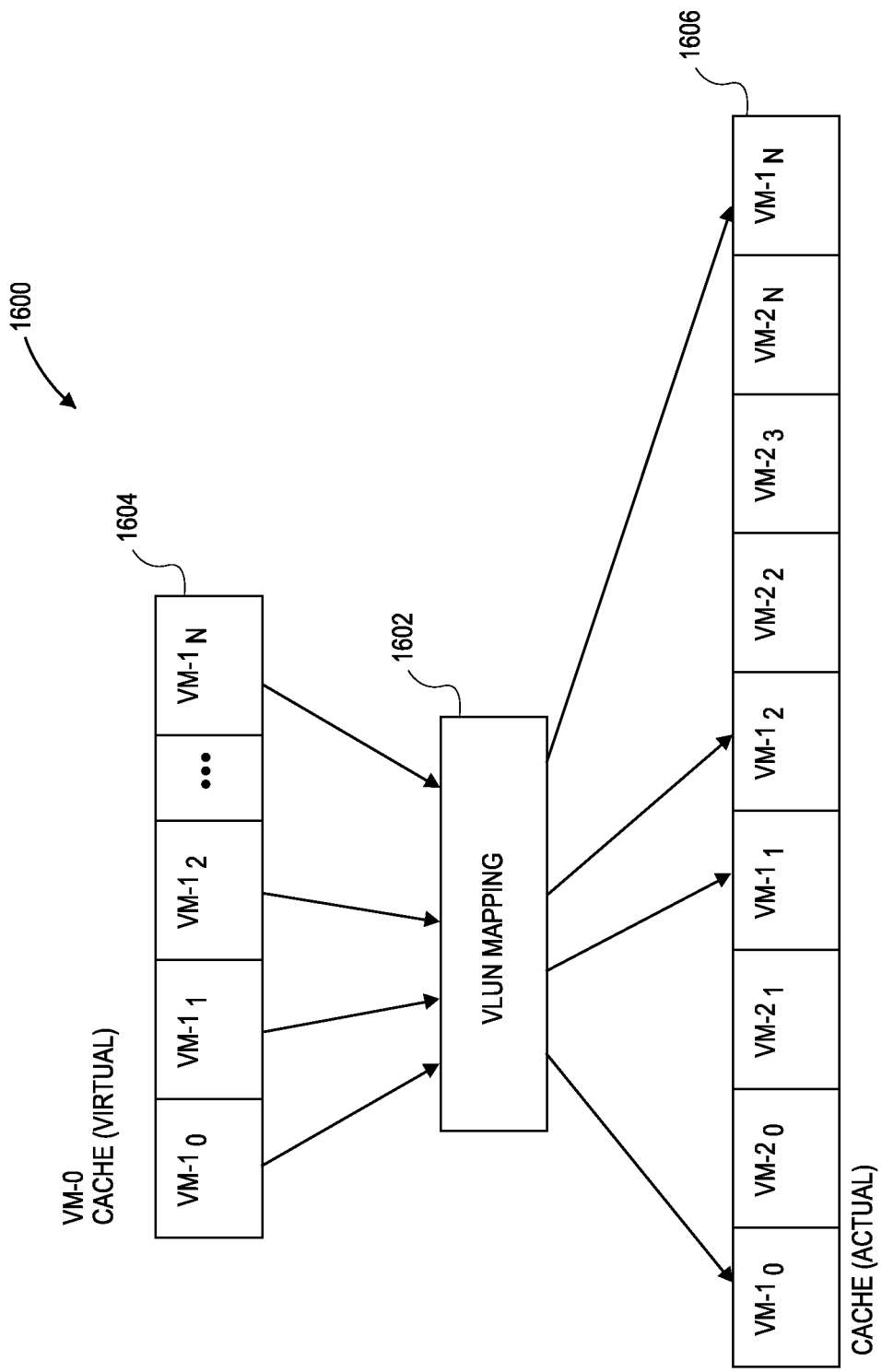
FIG. 16 depicts an exemplary VLUN cache address mapping.

Furthermore, the chunks of storage space allocated to a particular virtual machine may be disbursed within the physical cache space 1516 in an incongruous manner, where the physical storage locations of data for one virtual machine may be interleaved with the storage locations of another virtual machine. This is a result of a configuration where chunks of physical cache storage space are allocated dynamically. The VLUN driver may usurp space from other machines that are not utilizing all of their allocated space and allocate the space to other virtual machines that need more allocated space in cache storage. Referring to FIG. 16, a diagram 1600 illustrating the mapping function 1602 of a VLUN driver is shown. The allocated space 1604 of a virtual cache for a virtual machine is shown as spaces VM-$1_0$, VM-$1_1$, VM-$1_2$, VM-$1_n$, are shown as consecutive. The actual cache space 1606 shows the corresponding locations in actual cache space, where the locations of actual cache storage space is interleaved and in different order among another virtual machine's space, VM-$2_0$, VM-$2_1$, VM-$2_2$, VM-$2_3$, VM-$2_n$. In practice, with multiple virtual machines sharing a common cache, the interleaving of allocated space used by the various machines can become quite complex, particularly as space gets allocated dynamically according to the need of the various virtual machines sharing the actual physical space of the common cache storage. Also, though the illustration in FIG. 16 shows some of the different locations in some physical order, in practice, the spaces allocated may be located in other orders including random order, where space is allocated as available. Thus, the VLUN driver is configured to manage the allocation of the different chunks of physical storage space within cache storage.

Figure 17:
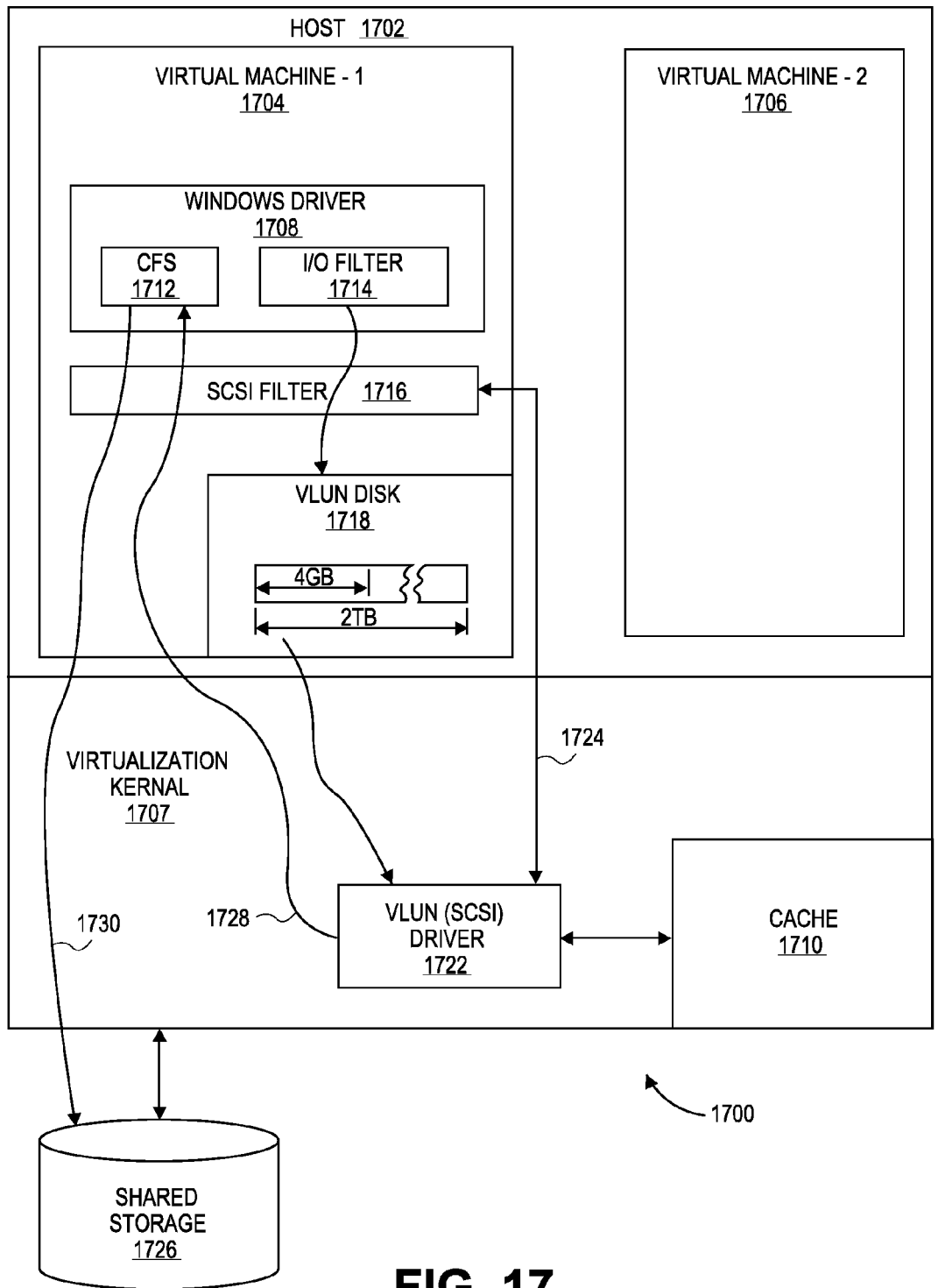
FIG. 17 is a block diagram of another embodiment of a host comprising a VLUN driver, and a virtual machine comprising corresponding VLUN disk.

Further Referring to FIG. 17, a diagrammatic system 1700 is shown to illustrate an example of a unique and novel process for changing cache capacity at run time. This is done by dynamically provisioning the amount of space a given virtual machine is allocated according to its current needs. As discussed above, from the view of applications outside a virtual machine, there is a fixed amount of cache storage space allocated to a virtual machine, and it may or may not be the same for each virtual machine. Since multiple virtual machines may exist in a particular host machine, the different machines may have varying demands for storage space, and managing the allocations of space to the various virtual machines is greatly desired in order to optimize the use of the cache space. The VLUN driver 1514, therefore, represents to the operating system that a large fixed amount of space is allocated to the virtual machine, even though a lesser amount is actually allocated to any one virtual machine. Thus, it appears fixed for the virtual machine to appear as having fixed space similar to hosts within conventional virtual systems. According to one embodiment, though this appearance of a fixed amount of allocated cache space is reported, the actual cache space allocated to a particular virtual machine may be dynamically provisioned by a VLUN driver according to of each virtual machine.

The host system 1702 illustrated in FIG. 17 includes one or more virtual machines 1704, 1706, and each includes its own SCSI filter 1716 that is incorporated into the virtual machine OS SCSI stack. Each windows driver includes a cache file system (CFS) 1712 that is configured to operate a cache storage device 1710 in the manner of a file system. The CFS may have components that are distributed between the virtual machine and other components of the system, but the individual CFS 1712 serves to manage data transfers between the virtual machine 1704 and various storage devices. An input/output (I/O) filter 1714 cooperates with the CFS 1712 to service I/O requests directed toward primary storage either directly from the primary storage or from cache storage 1710 located within the host device 1702. The primary storage may comprise a physical storage device located within the host device 1702 or a virtual disk defined on shared storage 1726. The virtual disk may be available only to a single virtual machine while the shared storage 1726 may be accessible by a number of virtual machines. A lower level filter, the small computer system interface (SCSI) filter 1716 is configured to manage transfers between the CFS 1712 and I/O filter 1714 and the various storage devices. Traditionally, SCSI has been used for transferring data between computers and peripheral devices, but the SCSI filter 1716 in this embodiment is configured to manage the transfer of data among physical and virtual entities within the system 1700. Within the virtual machine, the SCSI filter is configured to determine which disk is a VLUN disk, and to manage capacity changes that occur in a virtual disk that is allocated to the particular virtual machine. A VLUN disk 1718 is a virtual storage space, which provides raw storage capacity for the CFS 1712. In some embodiments, the guest operating system recognizes the existence of the VLUN disk 1718. As mentioned above, the size of the VLUN disk 1718 is reported as larger than the actual raw storage capacity being made available by the VLUN driver 1722 so that the actual storage capacity can change dynamically without causing an error in the guest operating system. The SCSI filter 1716 is configured to manage the actual raw capacity of the VLUN disk 1718 and other applications in the guest operating system are unaware of the existence of the VLUN disk 1718. In one embodiment, the VLUN disk 1718 is presented to the guest operating system as a read-only storage device. Consequently, the guest operating system prevents other applications of the guest operating system from writing data to the VLUN disk 1718.

As discussed above, in operation, though the actual storage space that is allocated to a particular virtual machine is one value, another value is represented to the operating system so that the system as a whole operates in a stable manner. Thus, a virtual machine may have 4 GB of actual cache storage space allocated to it, but it may appear to the operating system by the virtual machine's representations that it has 2 TB of storage space allocated to it. Within the host there is a user space where the virtual machines reside, and there is a virtualization kernel 1707 where a VLUN (SCSI) driver 1722 resides and is configured to allocate the actual space that is allocated to each virtual machine in cache storage 1710. In order for the SCSI filter 1716 and CFS 1712 to properly operate and manage I/O operations, they both need to be informed of the actual storage space that is allocated to the virtual machine 1704 within the cache 1710, and they need to not be "fooled" that there is more space allocated to the virtual machine than has actually been provisioned to the virtual machine. There is a communication link 1724 that communicates separately from the I/O data traffic between the VLUN driver 1722 and SCSI filter 1716 that informs CFS 1712 and I/O filter 1714 via the SCSI filter 1716 of the actual cache storage space allocated to the virtual machine 1704. Thus, asynchronous out of band messages may be sent between the VLUN driver 1722 and the SCSI filter 1716 to inform the Windows driver 1708 of actual space allocated to the virtual machine 1704 in the system. The information reaches CFS 1712 so that CFS manages the cache tags used to manage the data stored in the allocated cache storage space within cache storage 1710. Thus, the cache is a thin provisioned cache, where the operating system perceives the appearance of a large amount of space, such as 2 TB for example, but each virtual machine actually gets allocated the amount of storage space it actually needs, 4 GB for example. The communication path 1724 allows the ability to inform the Windows driver, particularly CFS 1712, of cache storage capacity changes when actual cache storage space that is allocated to the virtual machine 1704 changes.

Thus, in underlying operation, each virtual machine is actually allocated an amount of actual cache storage space that may vary over time as each virtual machine's storage needs change or in the event of power on/off events and also events where virtual machines move from one host to another, while the operating system perceives another set value that appears to not change from the perspective of the operating system. The VLUN driver 1722 manages this deception to the operating system together with the SCSI filter 1716. For example, assume for a moment that virtual machine 1704 had 4 GB of actual cache storage space located in cache storage 1710 allocated to it.

Figure 18:
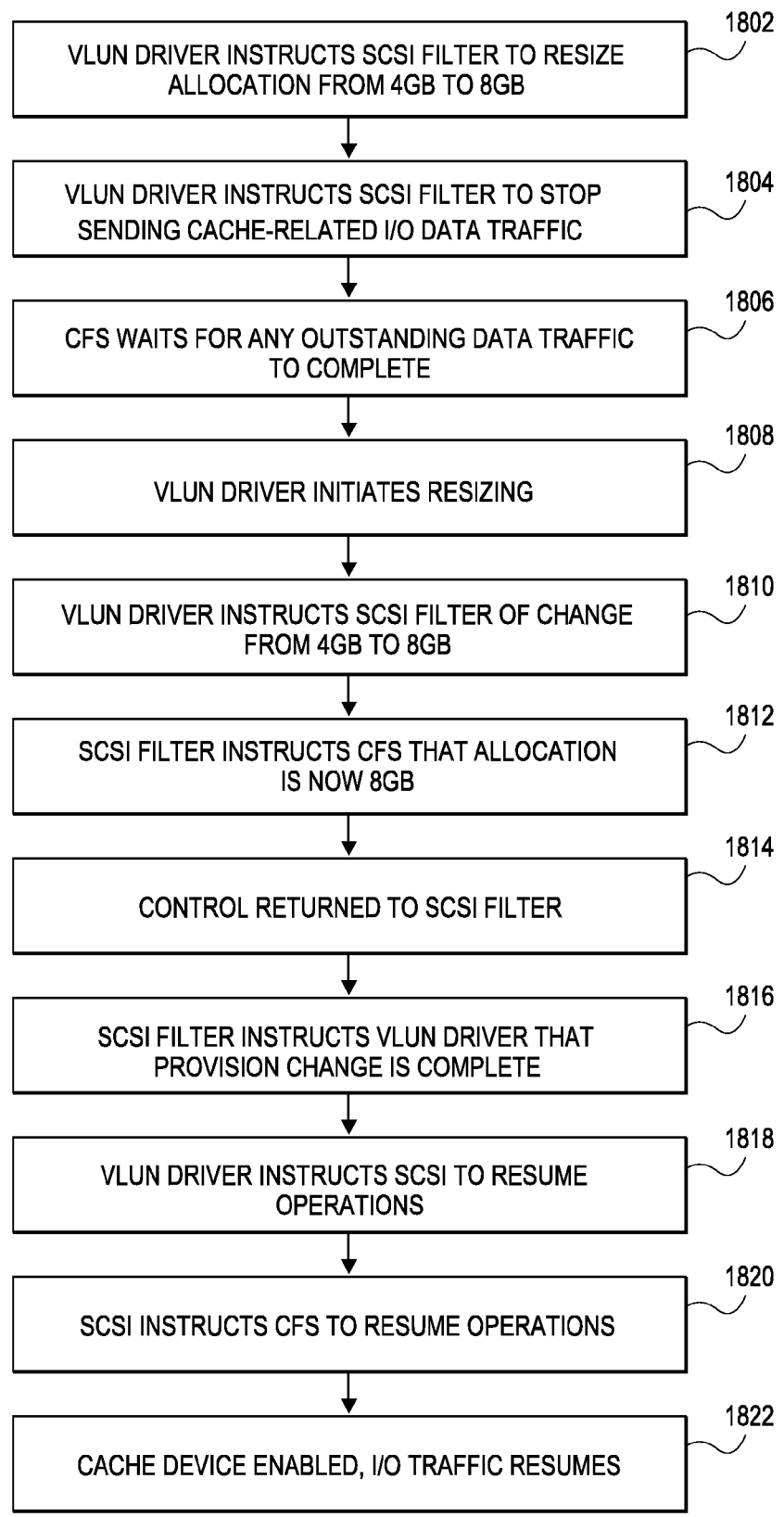
FIG. 18 is a flow diagram of one embodiment of a method for changing cache space allocation.

During operation, a virtual machine's needs for cache storage may increase, and it thus needs more cache storage space allocated to it. According to one embodiment, the virtual machine may have its allocated cache storage space changed as its needs for cache storage changes. Referring to FIG. 18, a process flow chart 1800 of a change in allocation of cache storage space is shown, and will act as a process guide in conjunction with the system diagram of FIG. 17 to illustrate how cache storage space is allocated when the cache storage needs of a virtual machine changes. As with other processes described herein, certain of these specific process steps may be combined with other steps or other steps may be added in particular applications, but this would not depart from the spirit and scope of the invention as defined in claims, as the processes described herein are intended as merely illustrative. Assume that virtual machine 1704 needs an increase to 8 GB of cache storage as an example. The VLUN driver 1722, a SCSI type device that monitors and manages use and allocations of cache storage space for each virtual machine causes the SCSI filter 1716 to resize allocated cache storage space from 4 GB to 8 GB in this example. In step 1804, the VLUN driver instructs the SCSi 1716 filter to stop sending I/O data traffic relating to the caching of data during the dynamic provisioning or re-provisioning of cache storage space. The SCSI filter 1716 instructs CFS 1712 that a resize is about to take place, so stop sending I/O data traffic to the cache storage device 1710. Alternatively, the instruction from the VLUN driver 1722 may communicate to CFS 1712 through the SCSI filter 1716 via path 1728 to stall I/O operations to the cache storage 1710. In one embodiment, while CFS stalls, it does not mean that applications communicating with the operating system stop working or stop performing I/O operations. Rather, the I/O data traffic continues to communicate between the CFS 1712 and shared storage 1726 via path 1730 through SCSI filter 1716 and virtualization kernel 1707 (but not through VLUN Disk 1718) so that application I/O operations in the virtual machine continue uninterrupted but will not benefit from use of the cache storage device 1710 during this brief period of re-provisioning of actual storage capacity in the cache storage device 1710. Thus applications such as Iometer™, Microsoft Office™, SQL Server™, and other applications can continue to operate and the I/O traffic destined to the shared storage 1726 continues. CFS 1712 may also invalidate pertinent cache tags when application write operations occur during this process. CFS 1712 waits for any outstanding I/O data traffic to and from the cache storage to complete in step 1806. In step 1807, CFS 1712 notifies the VLUN driver that I/Os are complete. Once the outstanding I/O transfers complete, a CFS stall is engaged. Thus the VLUN driver initiates the resizing from 4 GB to 8 GB in step 1808 and instructs the SCSI filter 1716 that the new allocation of cache storage space is 8 GB in step 1810. In step 1812, the SCSI filter 1716 then instructs CFS to resize the allocation of storage space to 8 GB. In one embodiment, when this is done, CFS maintains the previously allocated 4 GB of cache storage space and simply adds the newly allocated space to its operations. Thus, CFS 1712 can maintain the cache tags and metadata associated with the previously allocated 4 GB of cache storage space, and allocates the additional 4 GB of cache storage space and assigns new cache tags as needed. In step 1814, control is returned to SCSI filter 1716, and in step 1816 the SCSI filter 1716 instructs VLUN driver 1722 that the provision change of cache storage space for virtual machine 1704 is completed. In step 1818 the VLUN driver instructs SCSI filter to resume operations. In step 1820, the SCSI filter instructs CFS to resume operations. In step 1822, the cache storage device is enabled, and I/O data traffic can resume to the cache storage device, and the virtual machine can continue to send I/O data traffic to either the cache storage device 1710 or the shared storage 1726.

Thus, a thin provisioned cache device is provided, where the limitation of a fixed disk capacity requirement in conventional virtual systems has been addressed. Thus, the operating system can essentially be deceived into thinking that a fixed amount of cache storage has been allocated so that applications in the operating system have no impact. And, the actual cache storage space allocated to any virtual machine may be resized on the fly without impacting other system operations. The result is an intelligent and optimized utilization of cache storage, where the available cache storage space is more efficiently utilized. Multiple virtual machines are dynamic in nature and their data flow and cache storage needs change dynamically. A virtual machine substantially reduces its demand for cache storage in different modes or circumstances. For example, it may power off or go into sleep mode, it may stall while moving from one host to another, and its needs will necessarily change when these operational changes occur. A virtual machine may alternatively increase its demand for cache storage in other modes or circumstances, such as when it wakes up from a sleep mode, arrives at a new host after moving, or simply experiences an upsurge in usage operations. This embodiment gives the host system the flexibility to dynamically change and optimizes the use of cache storage at the same time. Accordingly, the amount of cache storage designed in a host system can be minimized, substantially saving costs in a host system or device. The cache device, which is commonly implemented in expensive flash memory, is itself virtualized in this embodiment, and its operations are intelligently managed in a way that optimizes the use of its storage space, allocating cache storage to the various virtual machines according to their needs.

One fundamental precept of virtual systems is that shared storage must be secured among the different virtual machines. This is important because the different virtual machines may store confidential information in the various storage chunks in cache storage that possibly could be accessed by other virtual machines in the dynamic provisioning process. For example, a person's confidential financial and identity information may be stored by one virtual machine in one chunk of allocated cache data storage, and that machine's allocated cache storage may be resized as a result of low demand. The virtual machine may then give up allocated cache storage space to another machine in the dynamic allocation process, also giving the second virtual machine that acquires the data chunk having the person's confidential information stored in that chunk. This is thus a security risk, and the dynamic allocation process that has been designed to optimize the use of the cache storage may cause a problem when resizing cache space of particular machines and allocating cache storage chunks from one virtual machine to another. One embodiment of the invention addresses this security risk in an elegant manner without substantial impact to the work flow within the system while dynamically provisioning cache storage chunks.

Figure 19:
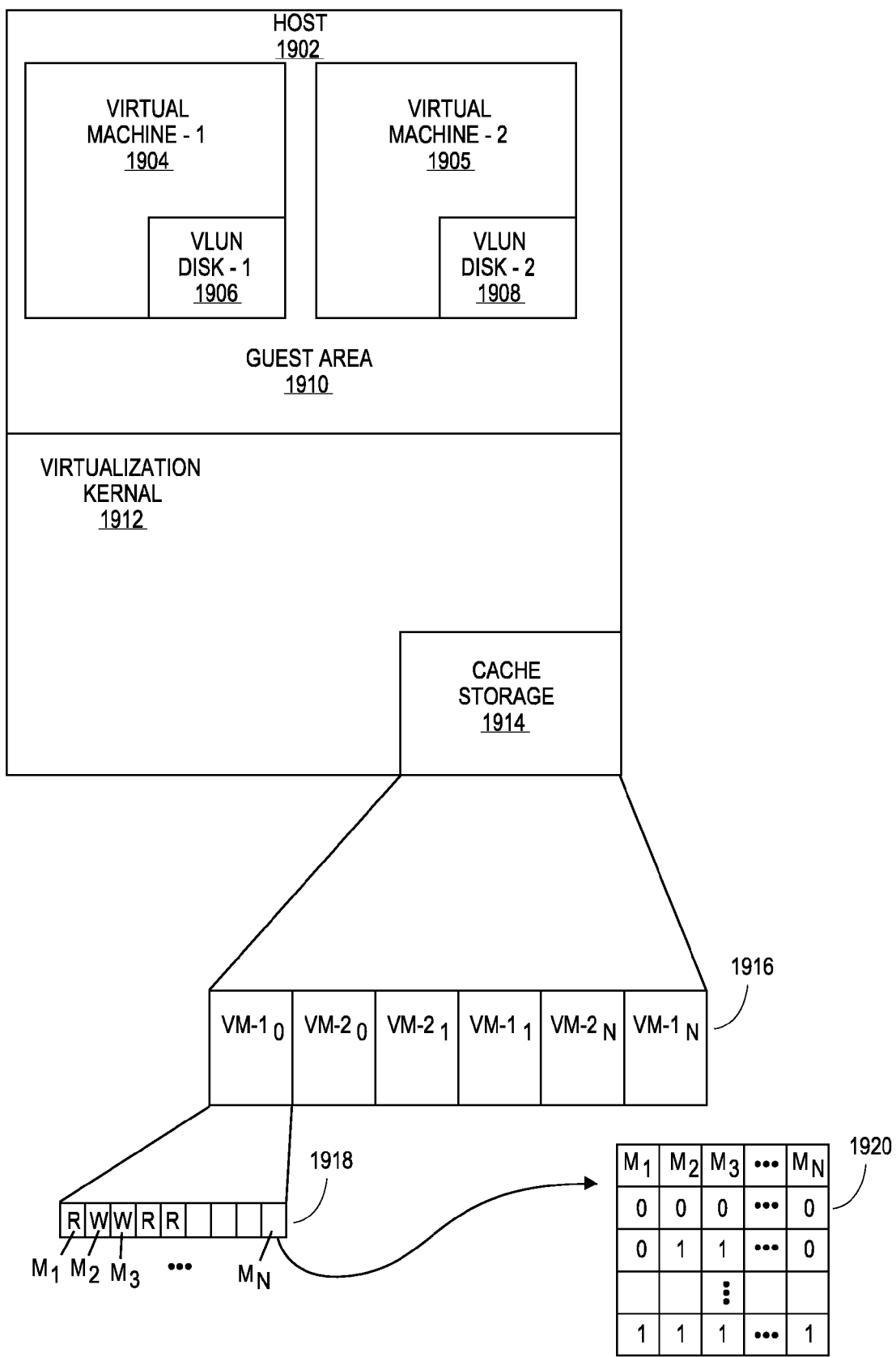
FIG. 19 is a block diagram of another embodiment of a host comprising virtual machines accessing cache storage through respective VLUN disks.

Referring to FIG. 19, a virtual system 1900 is illustrated showing a host 1902 having virtual machines 1904, 1905 and corresponding VLUN disks 1906, 1908 all located within guest area 1910. The virtualization kernel 1912 has a cache storage 1914 that is divided up into physically identifiable chunks 1916, where the chunks shown are showing chunks allocated to virtual machine-1 1904 as VM-$1_0$, VM-$1_1$ and, VM-$1_n$ and chunks allocated to Virtual Machine-2 as VM-$2_0$, VM-$2_1$ and VM-$2_n$. In operation, the individual chunks must be properly handled when being allocated from one virtual machine to another in the dynamic provisioning process, where the subsequent virtual machine acquiring a new chunk of cache storage space is ensured not to ever gain access to any leftover information from any prior virtual machine remaining in the chunk.

One way to address this issue is to erase or overwrite all prior information from any chunk that is allocated from one virtual machine's cache space to another, ensuring that the data is deleted or otherwise rendered inaccessible to any subsequent virtual machine that gains access to the chunk. Though this is an attractive option that provides definiteness to securing information in reallocated chunks of cache storage, it has drawbacks. One primary drawback is that this option requires I/O data transfers to zero out or otherwise delete the stored information, causing a burden on the system. In a dynamic allocation process, this would require that all chunks of data storage that are to be transferred for use by a different dynamic machine to be deleted prior to the transfer by writing zeros into the chunks' space, which adds no value to the virtual system. One characteristic of cache storage devices that are made up of flash memory is that writing takes a long time to perform compared to reading. Thus, such overhead may cause unacceptable increases in latency during dynamic provisioning such that such an option is undesirable in certain embodiments.

Another approach is to use a new primitive I/O operation that flash memory storage device vendors refer to as TRIM. However, not all vendors of flash memory support the TRIM command, and the contents of a data block that have been trimmed are undefined, and could potentially be available to another virtual machine. Thus, there may be no guarantee that the old data that is in the reallocated chunk has been deleted (and/or is inaccessible).

Yet another approach is to monitor the chunk provisioned to a virtual machine to ensure that the virtual machine acquiring the chunk does not gain access to the old data written by another virtual machine. In certain embodiments, chunks allocated to a virtual machine may come from a pool of previously erased media, (in certain embodiments the pool may include virgin storage media). If the chunk comprises virgin media or has been erased by the cache storage device 1710 and has received no I/O write operations, the chunk can be provisioned to the virtual machine without any further monitoring. As used herein such a chunk is referred to as an "unused chunk." A used chunk refers to a chunk that has been previously allocated to a virtual machine and thus has the potential to contain, and may in fact contain, data that needs to be protected from a virtual machine that is subsequently allocated the chunk.

While the state of a chunk being monitored may be persisted for use after a power cycle event in certain embodiments, in one embodiment of the present invention the VLUN driver 1722 monitors whether a particular chunk is written to or otherwise modified (referred to herein as a "used chunk" or "dirty chunk") after being allocated to a previous virtual machines during a current power cycle. In one such embodiment, a bit mask is used to prevent reading of data in a used chunk by a virtual machine allocated the used chunk. Preferably, reading of portions of the used chunk is prevented until the portions are written to by the virtual machine now allocated the used chunk. In one embodiment, each 4 kb sub portion of the used chunk is monitored to determine whether there has been a read or a write in each 4 kb sub portion. This is determined at the time the subsequent virtual machine accesses the used chunk, and is performed only when necessary to prevent the reading of old data by the acquiring virtual machine. After the provisioning of the used chunk to a virtual machine, each sub portion of the chunk is tested prior to any read operation on the used chunk by the acquiring virtual machine.

Figure 20:
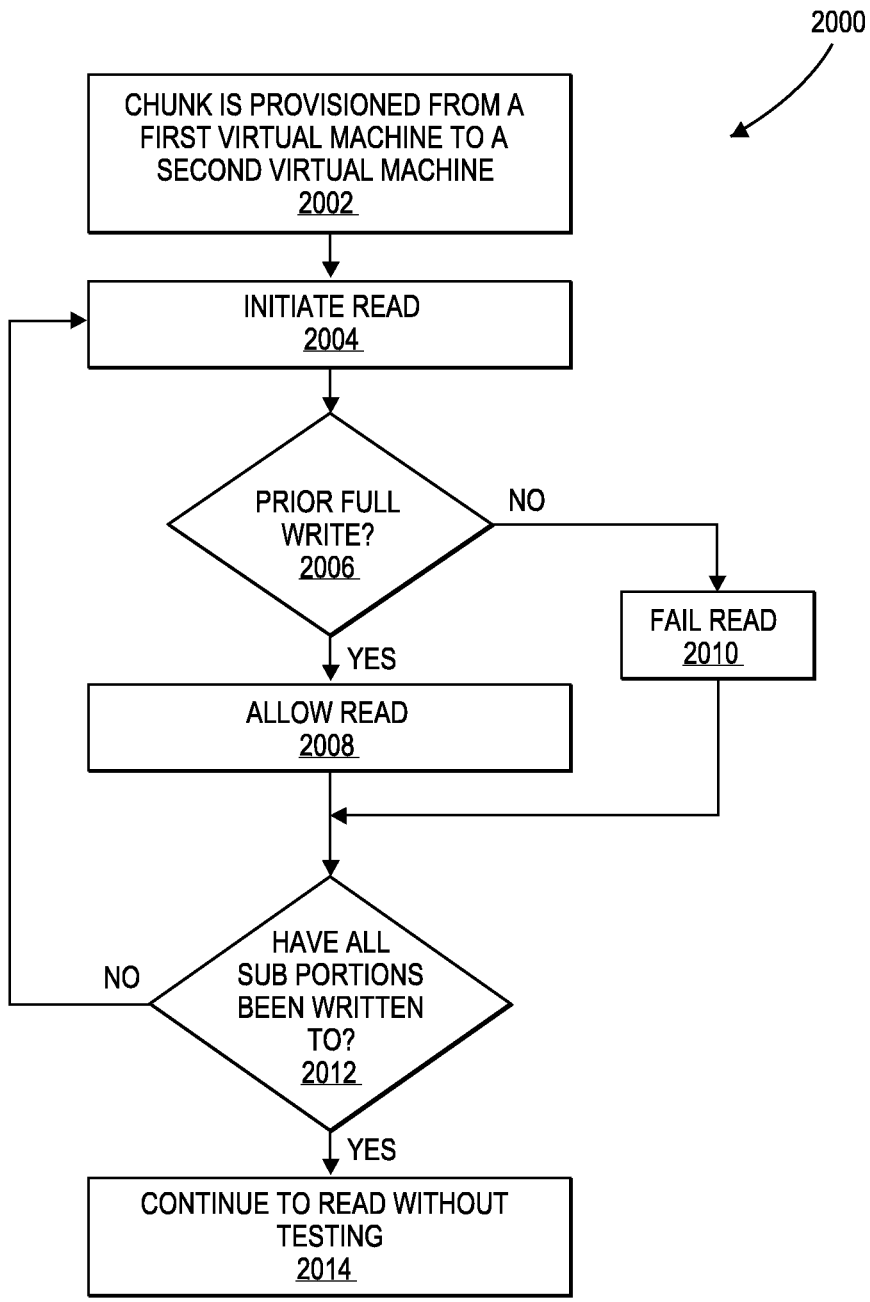
FIG. 20 is a flow diagram of one embodiment of a method for reading cache data from a shared cache.

Referring to FIG. 20, a process flow chart illustrates an example of such a testing operation that may be used in conjunction with the read operations of a virtual machine. The process for securing old data is called a "read before write" protection. This means that read operations for the old data are prevented until the address for old data has received a write operation (an overwrite from the virtual machine allocated the newly provisioned chunk). Thus, if any sub portion is read by a virtual machine that has acquired a chunk from one or more virtual machines, it is presumed that the chunk has old data and that it must not be accessed by the later acquiring virtual machine. Here, a chunk is provisioned from a first virtual machine to a second virtual machine, for example chunk VM-$1_0$ having subdivided spaces $m_1$ through $m_n$, 1918. In step 2002, a read is initiated by the second virtual machine. Next it is determined whether there was a prior full write to entire space $m_1$ by the second virtual machine.

In step 2002, a read is initiated. The process then proceeds to step 2004, where it is determined whether all pages were written to in the chunk at least once by the second virtual machine, and in particular whether this has occurred since the chunk was provisioned to the second virtual machine. If yes, then the need for this security test is obviated, and the reads to this chunk by the second virtual machine may resume in step 2008 without further testing. If all pages of the chunk in question have not been fully written over by the second virtual machine, then the reads resume in step 2006 with testing and continues on an as needed basis until each page is fully written over at least once, so long as the second virtual machine continues to be allocated the chunk in question and continues to initiate reads into the chunk's pages. In step 2006, it is determined whether there was a full write of the page that covers any possible old data. This determination may be done in various ways. In one embodiment, an indication of whether a particular page is partially written to or completely written over may be indicated by a bit that is on or off, logic 1 or logic 0 for example. This bit may be recorded in a table, such as table 1920. This may be in the form of a type of bit mask that can be stored in cache or other storage location. The indication of whether a page is entirely written over may be indicated by a single bit that is toggled to a binary "1" when a full write over occurs. When a partial write occurs to the page of a chunk, the VLUN driver 1722 converts the partial write to a full write by filling in zeros for the data space that is not covered by the partial write from CFS 1712. Any other write to a page while the very first write is in progress will be returned with error. If a read occurs before a write, then a test would show that a full write has not occurred, and the binary bit should be "0". As the chart 1920 shows, the table may start out as all logical "0", indicating that the individual pages have not been fully written over since being allocated to the second virtual machine. As full write over occurs in each page, the full write indicator bits eventually become more populated across the array, eventually ending up over time with all logical "1" bits, indicating that each and every page has been written over by the second virtual machine at least once.

If there was a prior full page write, then the read is allowed in step 2008, otherwise the read is failed and not allowed in step 2010. This process is an intelligent and efficient process for preventing read before write security breaches, and substantially reduces the amount of I/O traffic and latencies. Using the bit indicator approach, the trade off is the use of some memory space for the indicator bits for each sub portion and the use of processor resources to perform the testing, but the valuable security and the minimization of unnecessary I/O traffic in the process makes this read before write testing process valuable and useful.

Figure 21:
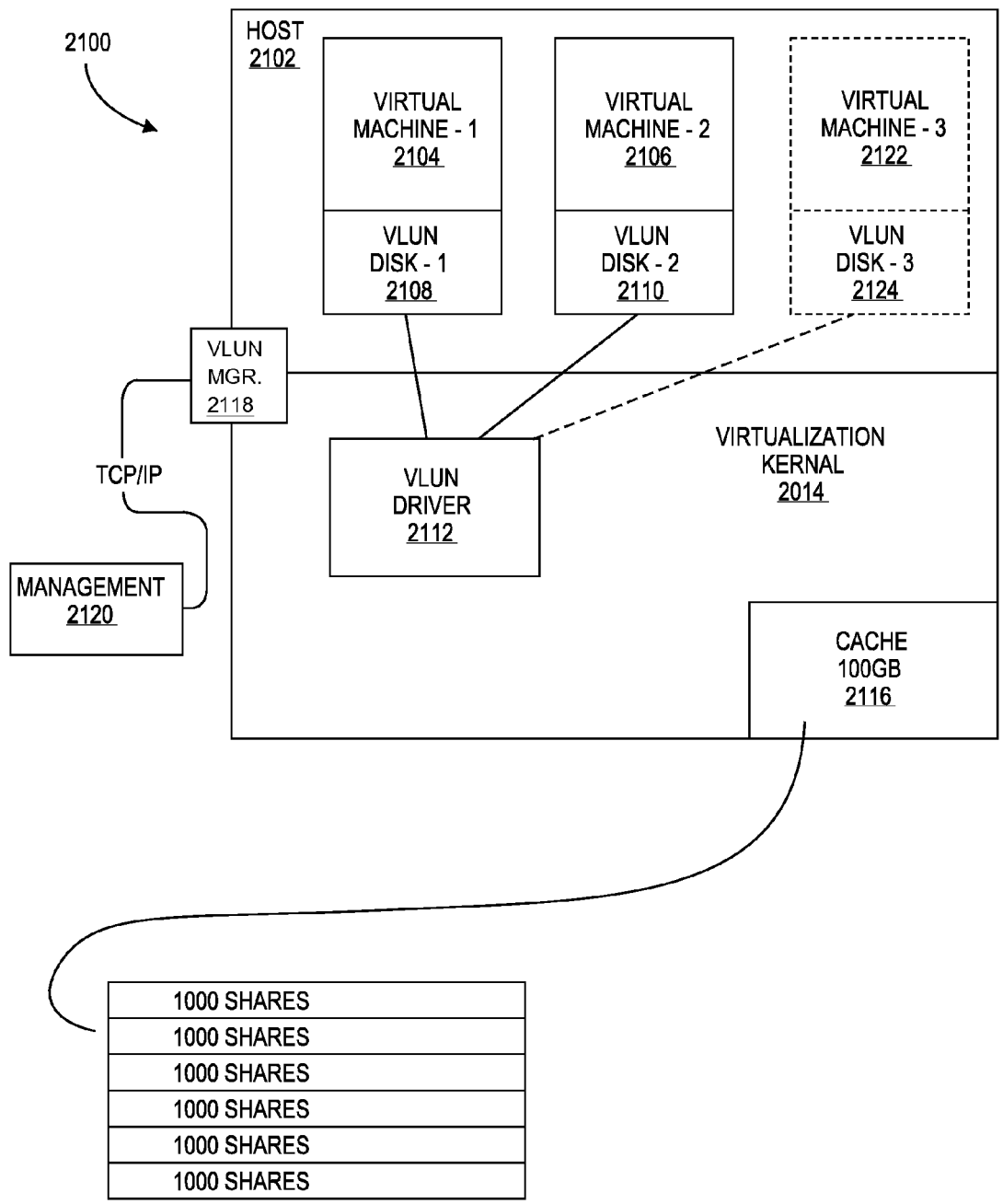
FIG. 21 is a block diagram of one embodiment for allocating cache storage between a plurality of virtual machines.

Referring to FIG. 21, a virtual system configured for cache allocation management is shown, where a host 2102 includes virtual machines 2104, 2106 and corresponding VLUN disks 2108, 2110, located within a guest area and that communicate with common VLUN driver 2112 located within the virtualization kernel 2014. Cache storage 2116 is configured to store data from the virtual machines as allocated by VLUN driver 2112. The system further includes a VLUN manager 2118 that communicates between host 2102 and management module 2120 via a TCP/IP protocol connection.

The VLUN Manager 2118 is a user space daemon that configures the provisioning of the portions of the cache storage among the different virtual machines. This is an application that runs on the host to parcel out the cache storage device fairly and efficiently among the virtual machines residing on the host. When a management module 2120 is establishing allocations for virtual machines. This sets the relative proportions allocated among the various virtual machines. Shares of storage space are then defined for each virtual machine, for example:

Virtual Machine 1—1000 shares
Virtual Machine 2—3000 shares
Virtual Machine 3—2000 shares These shares are used as an abstract definition of proportions of cache storage that is allocated to particular machines without regard to actual size and space that is allocated to a particular virtual machine. This way, the definition and system works with any size cache storage space or device, whether it is flash memory or other type of memory, and the shares can be divided up and allocated among multiple virtual machines as they are added or subtracted from the system, as further cache memory is added, and as the system changes over time. The shares allow for a relative dynamic percentage for each virtual machine as the system usage demands change. Thus, for each virtual machine (VM), the amount of cache storage it receives can be calculated as follows:

Capacity of VM-1 shares=(VM-1 shares/total active VM shares)Cache Capacity where the total "active" VM shares are the total number of shares allocated to total number of powered-on virtual machine. Thus, for virtual machines that are not up and running, their shares are not accounted for in the capacity equation. Thus, for the example in FIG. 21, and given the allocated shares set forth above, since only Virtual Machine-1 and Virtual Machine-2 are active, and given the example of a 100 GB cache storage capacity, the following capacities may be calculated:

VM1 Capacity=(1000/4000)100 GB=25.0 GB

VM2 Capacity=(3000/4000)100 GB=75.0 GB

The different virtual machines may be powering on and off, vMotionting/migrating away and back to the host, so the capacity allocations can change over time. At the time Virtual Machine-3 (for example virtual machine 2122 having VLUN disk-3 2124 in FIG. 21) comes on line, the capacity of each host would be calculated as follows:

VM1 Capacity=(1000/6000)100 GB=16.7 GB

VM2 Capacity=(3000/6000)100 GB=50.0 GB

VM3 Capacity=(2000/6000)100 GB=33.3 GB

Thus, the current percentage may be calculated based on current allocations. In performing this transition of VM3 online and being allocated its percentage or shares of cache storage, VM3 must be allocated its percentage shares, and virtual machines VM1 and VM2 must relinquish storage space. This is accomplished by the methods discussed above in connection with FIGS. 17 and 18. Each machine must stall operations, change capacity, and then resume operations. Thus, for each machine, VM2 must shrink from 75% to 50%, VM1 must shrink from 25% to 17%, and VM3 can then be given its 33.3%, which is taken from the relinquished storage space from VM1 and VM2. Thus, the embodiment provides a dynamic provisioning of cache using a virtual disk approach.

Additionally, to the extent virtual machines can be provisioned storage space according to the shares concept, IOPS capacity can also be allocated among the virtual machines. Thus, for each machine, VM1 Capacity=(1000/6000)100 k IOPS VM2 Capacity=(3000/6000)100 k IOPS VM3 Capacity=(2000/6000)100 k IOPS In one embodiment, the VLUN driver 1722 manages the cache device 1710 such that each VM receives its allocated shares of IOPS capacity. Typically, a cache device 1710 operates at a single IOPS rate for each request that it services. Consequently, the VLUN driver 1722 in one embodiment manages IOPS shares amongst VM1, VM2, and VM3 by giving each VM an opportunity to use the cache device 1710 in a given time period. In other words, each VM gets a time slice within a given time period to use the cache device 1710. In this manner, the IOPS capacity between VMs can be managed. In some embodiments, the IOPS rate of a VM may be throttled to allow other VMs to access the cache device 1710 in accordance with IOPS share allocation therebetween.

One feature that is desired in virtual systems is the ability to move virtual machines from one host to another without powering down or taking the virtual machine offline in the process.

In conventional systems, since hosts are usually connected to shared storage, this process is well defined and seamless. However, in systems configured according to the various embodiments described above that utilize local cache storage rather than shared storage for certain virtual system operations, such as a thin provisioned cache, there are conflicts that result from exercising certain features common in virtual systems such as moving virtual machines from one host to another.

In conventional virtual systems, a virtual machine may be moved from one host to another by utilizing shared storage. However, moving virtual machines from one host to another while utilizing the various embodiments described herein, problems would occur with the transfer, and critical data and virtual systems operations may be compromised. In some virtual systems, the move simply would not be allowed—such as by VMWare™ virtual system products for example.

According to one embodiment, the issues related to the transfer of a virtual machine from one host to another without the aid of shared storage are addressed in an elegant manner, and transfers of virtual machines from one host to another is made seamless while also utilizing the various embodiments described herein. According to one embodiment, the virtual system may be configured to deceive the system into thinking that the local cache storage located in or communicating with the host device is essentially a shared device.

Figure 22A:
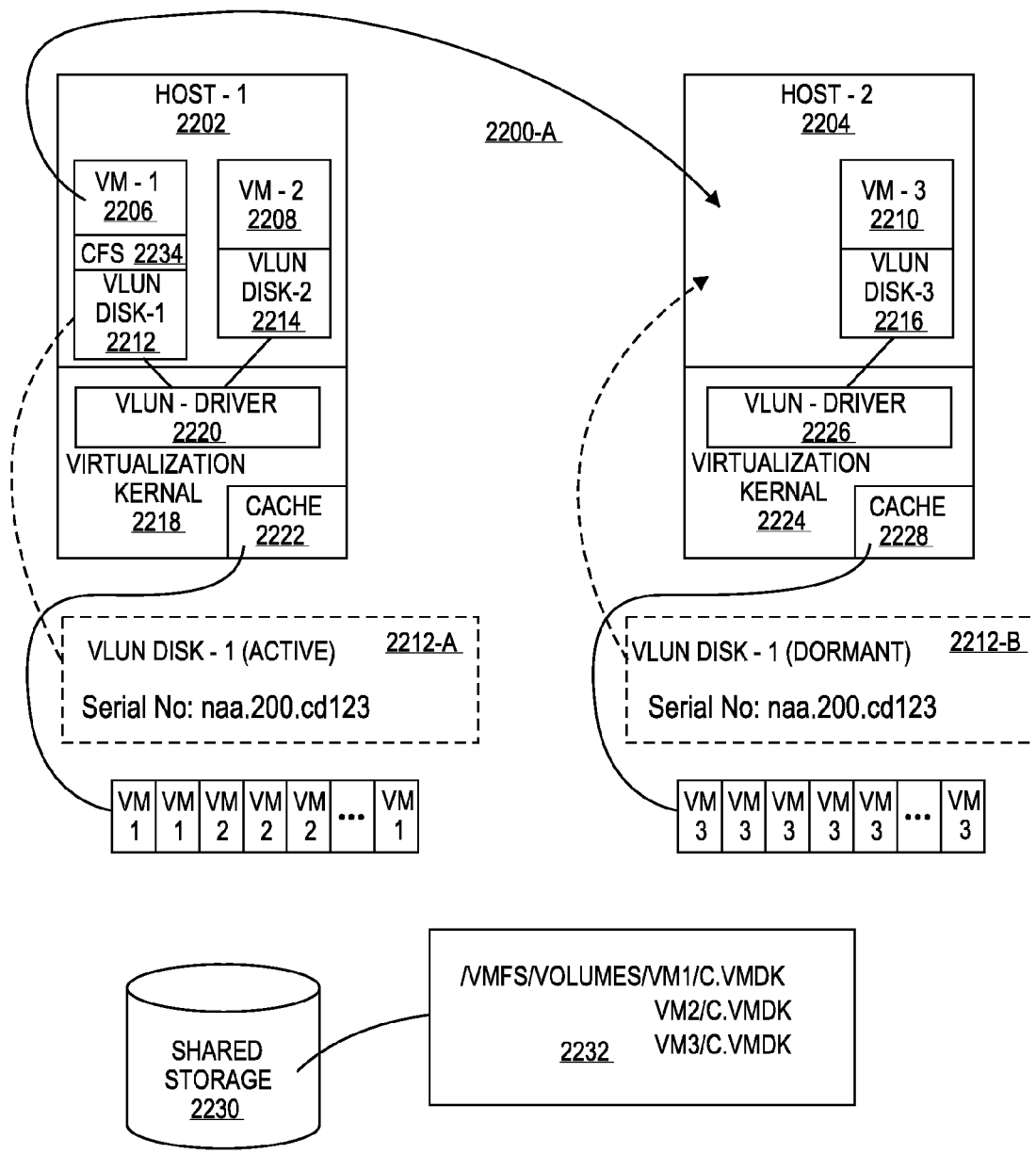

In one embodiment, in establishing a virtual system and adding virtual machines on separate hosts without shared storage, copies of the VLUN disks may exist on two or more different host in anticipation that the virtual machines may be moved from one host to another. Referring to FIG. 22A, one example of such a configuration is illustrated in a system 2200-*a* that includes two hosts Host-1, 2202 and Host-2, 2204, where Host-1 includes instances of two virtual machines, VM-1 2206 and VM-2 2208, that have VLUN disks 2212 and 2214 respectively. Host-2 includes virtual machine VM-3 2210 having VLUN disk-3 2216. Host-1 further includes virtualization kernel 2218 and VLUN driver 2220 instantiated therein, as well as cache storage 2222 for storing cache data from the virtual machines 2206, 2208. Each cache storage may be divided up into chunks as discussed above, where the chunks are identified as holding either VM-1 or VM-2 data in Host-1, and VM-3 data in Host-2. Host-2 includes its own virtualization kernel 2224, VLUN driver 2226 and cache storage 2228. In one embodiment, the system is configured to allow a transfer of one or any virtual machine, such as VM-1 for example, from Host-1 to Host-2, and to do so substantially seamlessly without the need to completely shut down.

In conventional virtual systems, shared storage 2230 may store the instances of the primary virtual disks 2232 of the virtual machines located among different hosts. These primary virtual disks 2232 are accessible to virtual machines operating on hosts that have shared access to the shared storage 2230. In order to enable the transfer of virtual machines from one host to another, the virtualization kernel 2218 requires that the source host (e.g. Host-1) and the destination host (e.g. Host-2) both have shared access to each storage device of the transferring virtual machine.

Embodiments of the present invention allow transfer of virtual machines between hosts, even though each host does not have access to all physical storage devices of the transferring virtual machine. For example, Host-1 and Host-2 both have access to shared physical storage 2230, but Host-2 does not have access to the physical storage device serving as the cache device 2222. Similarly, Host-1 does not have access to the physical storage device serving as the cache device 2228.

According to one embodiment, virtual machine transfers from one host to another is accomplished by instantiating the VLUN disk 2212-A in an active state on Host-1 and also instantiating a corresponding VLUN disk 2212-B in a dormant state on Host-2. In certain embodiments, these instantiations are performed before the virtual machines power on. In some embodiments, during a configuration phase, the VLUN driver 2220 instantiates a dormant VLUN disk 2212C-N on each host a user may desire to use for transferring of virtual machines, for example each host in a cluster of hosts.

The VLUN disk 2212A-N having the same serial number, either active or dormant, on each host satisfies the requirements of the virtualization kernel 2218 requires that the source host (e.g. Host-1) and the destination host (e.g. Host-2) both have shared access to each storage device of the transferring virtual machine.

For example, an instantiation of VLUN disk-1 2212-A having a serial number of "naa.200.cd123." An identical instantiation may be made in on Host-2, including the same serial number, but it is dormant, where VM-1 does not actively use the copy 2212-B, but rather uses it as a type of holding place for VM-1 when, and if, VM-1 transfers from Host-1 to Host-2. In response to the transfer, the "naa.200.cd123" disk on Host-1 becomes dormant, and the corresponding disk on Host-2 becomes active.

In a system of multiple host computers that each have multiple virtual machines, multiple VLUN disks may be instantiated on the different host computers to aid in transferring virtual machines from one host to another, with the VLUN disk of the source host transitioning to a dormant state and the VLUN disk of the destination host transitioning to an active state.

It has been observed that, in typical computing systems with peripheral and other system devices such as virtual computing systems for example, SCSI operations serve as interfaces for devices within a system and can be utilized to fool the virtualization kernel 2218 into believing that the cache storage devices located in individual host devices are actually accessible by each host in the cluster. When an operating system communicates to components within the system and discovers devices within the purview of operating system, such as storage disks, VLUN disks, and other devices, it initiates queries when a device is found to learn the device's identity and relevant operating information. It questions who the manufacturer is, what the model number is, what the capacity is, and importantly for this embodiment: what the serial number is. The serial number is configured to be globally unique within the system. Thus, in a virtual system, the operating system queries discovered devices such as disks to identify them and to derive a serial number that will be used by the operating system to identify the storage device. For virtual machines, the operating system in conventional virtual systems identifies shared storage devices, and derives a unique serial number to identify it within the virtual system. Once the virtual machines are created, the conventional virtual systems identify each virtual machine as a shared storage device by using this unique serial number assigned to the shared storage.

According to the embodiments discussed herein however, cache storage devices are not shared among different hosts, but are local to the hosts and shared among virtual machines within the hosts. In operation, conventional virtual systems require that the virtual machines are assigned to shared storage in order to enable a transfer of a virtual machine from one host to another. According to one embodiment, fictitious shared storage is created and exported to the host as a Fibre channel or SAS device. Thus, the Fibre channel or SAS device is artificially recognized as a shared storage device with a unique serial number and is instantiated when a VLUN disk is created. VLUN disk devices are fictitious shared storage spaces that are associated with actual storage space in the local cache storage devices. Once created, these VLUN disks are treated as actual devices from the perspective of the operating system. The unique serial numbers for VLUN disks instantiated within the local cache devices, such as "naa.200.cd123", are derived by the virtualization kernel from the serial number of the shared local storage, and each are unique and associated with a particular VLUN disk. Thus, when the VLUN disk is created, it is created with the unique serial number, and these are recognize by the operating system as legitimate entities, but are fictitious shared storage. This derived serial number is also used to create another VLUN disk in Host-2, such as VLUN disk-1 2212-B, so that a virtual machine such as VM-1 will have a corresponding VLUN disk in the other host to communicate to and continue its I/O data traffic after being transferred to Host-2.

Figure 23:
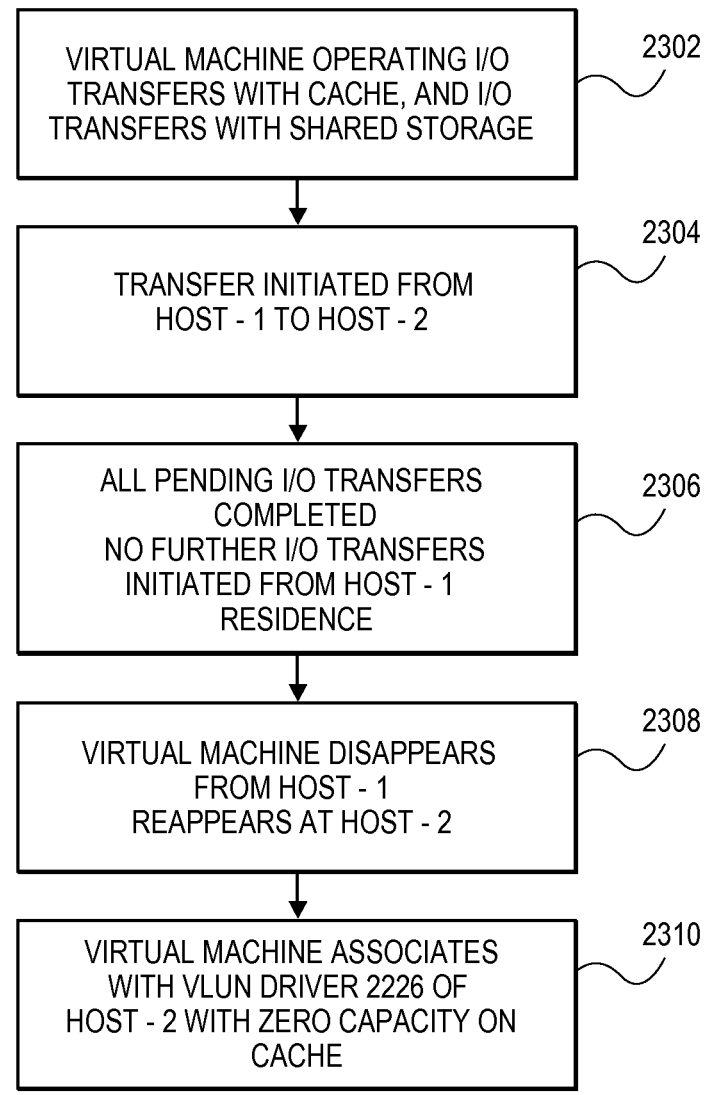
FIG. 23 is a flow diagram of one embodiment of a method for relocating a virtual machine.

While running in Host-1 prior to moving, VM-1 through CFS 2234 believes it has some amount of data stored in the cache storage 2222, having chunks designated VM 1 in this illustration, and these chunks of data storage are not resident in Host-2 after the move. Prior to the move, and referring together with FIG. 23, a flow chart 230-showing general steps of a transfer process, in step 2302, CFS is operating, it is actively caching data and issuing I/O data transfers to and from the cache storage in normal operation. CFS is doing read operations to the designated chunks of data storage prior to the move. Once the move is initiated in step 2304, and then in step 2306 the hypervisor first completes VM-1's initiated I/O transfers to the cache and any shared storage, and then stops these I/O transfers for a small period of time prior to the transfer of the virtual machine. In step 2308, the VM-1 then stops operating and essentially disappears from Host-1, and then reappears on Host-2 and begins operations.

Once a virtual machine moves from one host to another, the data is left resident on the prior host, Host-1 for example, and when the virtual machine arrives at the destination host, Host-2 in this example, the data is left behind. Again, this breaks the design assumption of conventional virtual systems that requires and assumes the existence of having the I/O data transfers associated with the virtual machine to be available to the virtual machine when it transfers, which is typically located on remote shared storage that is shared among different hosts. Having copies of the VLUN disks of the different virtual machines is an approach used to essentially deceive existing virtual systems into believing that each virtual machine is storing I/O data transfers in remote shared storage.

Figure 24:
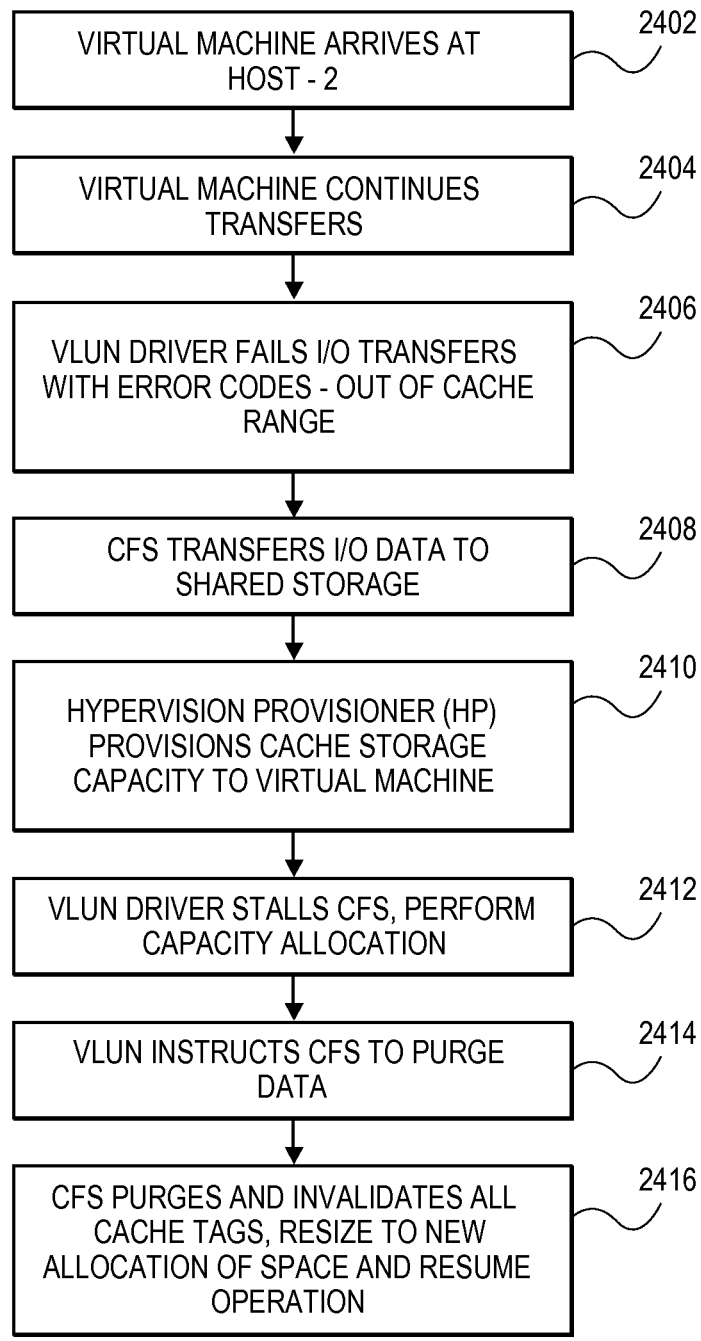
FIG. 24 is a flow diagram of another embodiment of a method for relocating a virtual machine.

In conventional systems, the hypervisor stalls I/O transfers to the remote storage device prior to transferring from one host to another. The virtual machine is then transferred to another host, instantiated on that host, and operations resume. In this embodiment, however, there is not only remote shared storage for operations, but also local storage. After the transfer, in step 2310, VM-1 is associated with VLUN driver 2226 and Cache 2228, which does not have the former cached data, and VM-1 has essentially zero capacity in the local cache 2228. Referring to FIG. 22B, the post-move system is illustrated, with VM-1 2206 appearing in Host-2, VLUN disk 2212 associating with VLUN driver 2226, and VLUN disk-1, now designated as 2212-B and being in the active state, with identical serial number naa.200.cd123. After the move, CFS 2234 of VM-1 still registers that it has 4 GB of data, and that it has data chunks stored in the cache 2222, but is now located in Host-2 without access to that cache storage with that capacity and also without access to that stored data that is still resident in cache storage 2222. Thus, VM-1 is essentially not aware that the move has occurred. Referring back to FIG. 22A, prior to the move Host-2 has only VM-3 that has the entire capacity of Cache 2228 (Note: In a typical system, multiple virtual machines VM-1, VM-2, ... VM-n, exists in a host, and there is a complex mapping of shared cache storage. For simplicity of discussion and to avoid obscuring the description of the embodiments, only these three virtual machines are illustrated). When VM-1 arrives in Host-2, VM-3 has substantially the entire capacity of Cache 2228, and VM-1 needs to get acclimated and acquire capacity in resident cache storage 2228. FIG. 24 shows an example acclamation process 2400.

After arriving in Host-2 in step 2402, CFS 2234 will continue to send I/O requests to the VLUN driver 2226 in step 2404, the new VLUN driver. The VLUN driver 2226 will fail the I/O requests in step 2406 with errors (traveling up the storage stack) to the CFS 2234 that cache addresses assigned to VM-1 are out of VM-1's range, it has no capacity. The error code is interpreted and recognized by the SCSI filter 2238 within VM-1. The SCSI filter 2238 will fail the I/O requests to the CFS 2234, and request that CFS 2234 invalidate the cache tags associated with the I/O requests. Thus, there is a small period of time after the transfer from Host-1 to Host-2 when there is no cache storage capacity of Host-2 being used by VM-1. The small number of I/O requests that are issued are failed, and the cache tags are invalidated.

The CFS 2234 will then reissue the I/O requests that failed to primary virtual disk storage, typically stored on shared storage 2230 in step 2408. Later, VLUN Manager 2240 recognizes the arrival of VM-1 in Host-2 and the VLUN driver 2226 provisions cache storage capacity for VM-1 in step 2410 according to an allocation of shares, as discussed above. Subsequent IO requests will benefit from local cache storage 2228 once CFS 2234 acquires capacity in local cache storage 2228. The VLUN driver stalls CFS 2234 as discussed above to perform capacity allocation.

In step 2414 the VLUN driver instructs the CFS 2234 to purge its data related to the I/O data transfers, because CFS 2234 essentially thinks that it has stored data in the cache storage and 4 GB in space, but that is all left behind in Host-1's local cache storage 2222. This is different than the capacity allocation as discussed above, because the resize that occurs after a transfer from one host to another leaves the data behind, and the stored data in the allocated space is not the same data that CFS registers as the stored data, because it is left behind and does not exist in Host-2's cache storage 2228. Thus, this is a unique resize and allocation of cache space. In step 2416, CFS will invalidate all cache tags, resize to new allocation of space and resume operation. Also, the allocation will utilize the bit mask processes described above to protect against VM-1 reading any old data that may have been written by VM-3 or any other virtual machine. Thus, VM-1 would need to write to the chunks of allocated cache storage space before it can read, or the read requests will get a fail error. Thus, this embodiment allows the VLUN driver to essentially fool the virtual system to believe that shared storage exists among the hosts involved in the virtual machine transfer, then allow a virtual machine to move from one host to another, then because VM-1 has a SCSI filter 2226, the SCSI filter 2226 can talk to the VLUN driver 2226 to account for the transfer between hosts, initially failing the I/O's to the VLUN device with an error, invalidate all past cache tags, allocating space to VM-1, and resuming operation of VM-1. Also the VLUN manager 2242 of 22B will allocate the space relinquished by VM-1 to virtual machines that are local to Host-1. Thus, virtual machines may be moved around to different hosts for non-destructive upgrades, balancing among hosts, failure recovery, and other operations that aid the virtual system.

Figure 25:
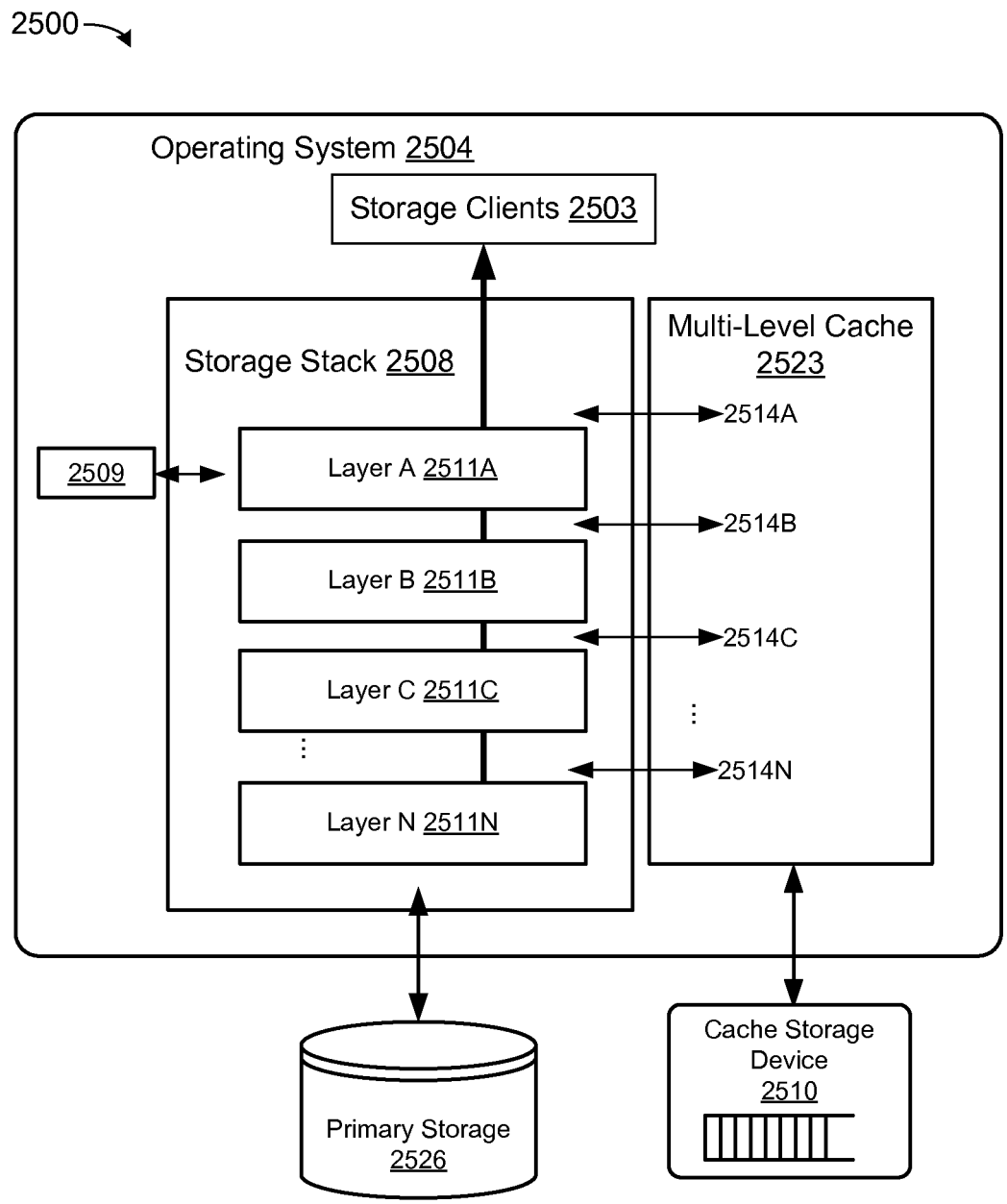
FIG. 25 is a block diagram of one embodiment of a system for caching I/O request data in a multi-level cache.

FIG. 25 is a block diagram depicting one embodiment of a system 2500 for caching I/O request data in a multi-level cache 2523. The system 2500 comprises a storage stack 2508 to service storage requests from one or more storage clients 2503, which may include, but are not limited to: user-level applications, operations system processes (e.g., a file manager), servers (e.g., database servers, directory servers, etc.), or the like. In some embodiments, the storage stack 2508 defines a storage architecture in which storage services, such as file system drivers, volume drivers, disk drivers, and the like, may be deployed. Storage services may be deployed within respective layers 2511A-N of the storage space. The storage services may be configured to interoperate by issuing and/or consuming I/O requests between various layers 2511A-N of the storage stack 2508. In some embodiments, the layers 2511A-N are organized into a hierarchical structure corresponding to different I/O request granularities (e.g., a hierarchy comprising file, volume, disk, and so on). In some embodiments, I/O requests are communicated through the storage stack 2508 according to the hierarchical structure of the layers 2511A-N.

Figure 26A:
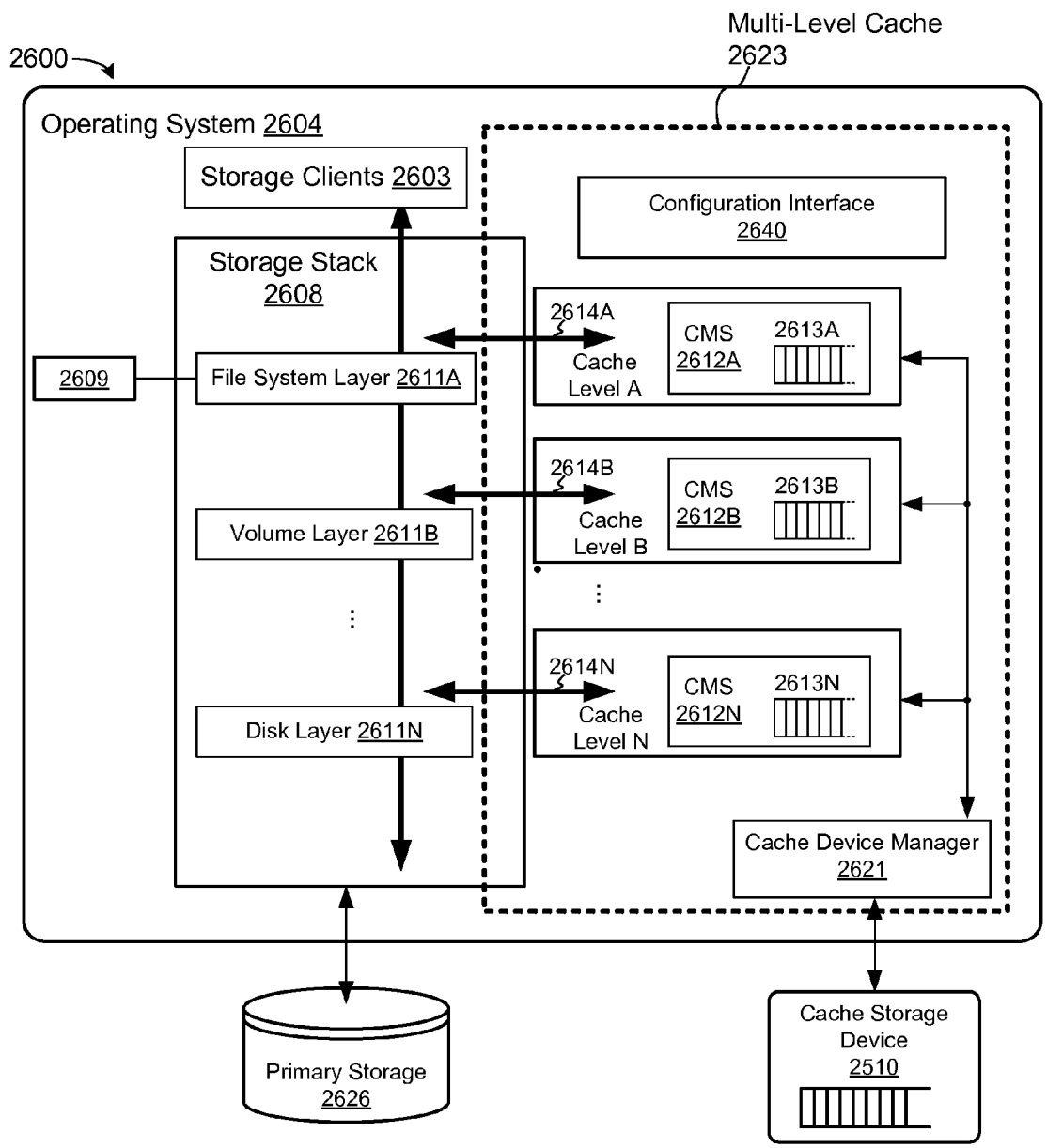
FIG. 26A is a block diagram of another embodiment of a system for caching I/O request data in a multi-level cache.
Figure 26B:
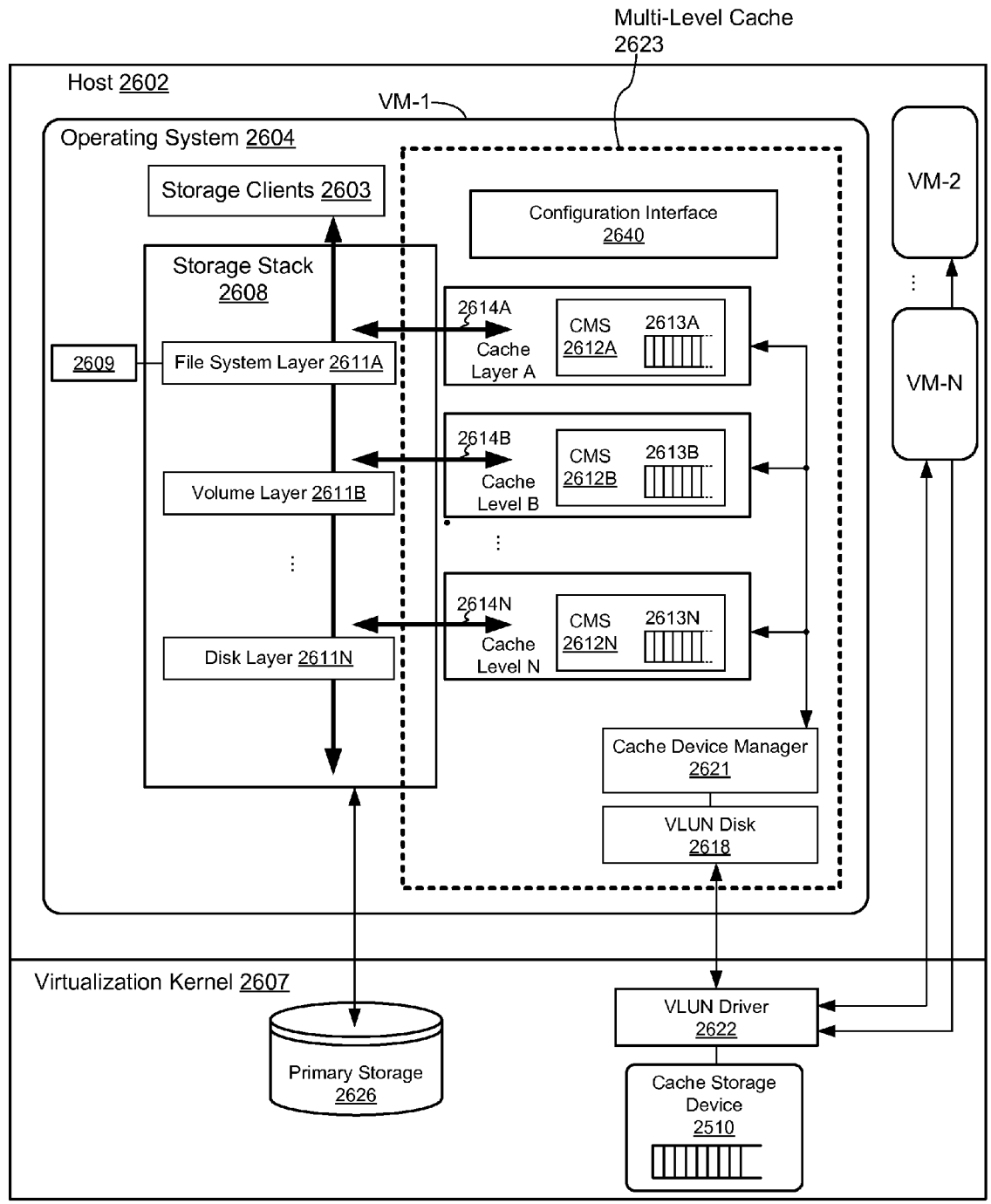
FIG. 26B is a block diagram of another embodiment of a system for caching I/O request data in a multi-level cache.

The operating system 2504 may be a host operating system operating on a "bare metal" computing device and/or may be a guest operating system operating within a virtual machine on another host as shown in FIG. 26B. The storage stack 2508, the I/O request monitors 2514A-N and/or cache device manager 2516 (and/or other modules described in this disclosure) may be configured to operate on a processor of a computing device and/or may be embodied as one or more computer-readable instructions on a non-transitory, computer-readable storage medium, such as the primary storage 2526.

The storage stack 2508 may be configured to service I/O operations of the operating system 2504 and/or storage clients 2503. The storage stack 2508 may comprise a storage system of the operating system 2504, such as an I/O manager, the I/O driver 1518 of FIG. 15, and/or the Windows Driver 1708 described above in conjunction with FIG. 17. The disclosure is not limited in this regard, however, and could be adapted to operate in any suitable storage and/or I/O management system of any suitable operating system 2504 including, but not limited to: Microsoft Windows NT®, Microsoft Windows Server 2008®, UNIX®, LINUX, Solaris®, or the like.

The storage stack 2508 may comprise one or more storage stack layers 2511A-N, which may include, but are not limited to: a file-system layer (e.g., a file system driver), a volume layer, a disk layer, and so on. For example, a file system driver of a file stack layer A 2511A may be configured to maintain file system data on one or more primary storage devices 2526. The primary storage device 2526 may comprise one or more non-volatile storage devices (e.g., hard disks) that are accessible via a bus, network, or other suitable communication mechanism.

The system 2500 may comprise a multi-level cache 2523 that is configured to cache I/O request data on the cache storage device 2510. In certain embodiments, the cache storage device 2510 may comprise a volatile cache (e.g., a cache storage device implemented using volatile memory), a non-volatile cache (e.g., a cache storage device implemented using non-volatile storage media such as for example a hard drive, battery-backed volatile memory, solid-state storage media), or the like. The cache storage device 2510 may be separate and/or independent of an existing cache 2509 of the storage stack 2508.

The multi-level cache 2513 may cache I/O request data within one or more different "cache levels." As used herein, a cache level refers to a cache directed to I/O requests of a particular type and/or granularity (e.g., cache data identified and services at a particular stack layer 2511A-N). For example, a file-level cache may be configured to cache I/O request data at a file-level of granularity; a volume-level cache may be configured to cache I/O request data at a volume level of granularity; a disk-level cache may be configured to cache I/O request data at a disk-level of granularity; a SCSi-level cache may be configured to cache data at a SCSi-level of granularity; and so on. Each cache level may be configured to identify cacheable I/O request data using respective selection criteria of the cache level, as discussed below. Although particular caching levels are described herein, the disclosure is not limited in this regard and could be adapted to cache data at any suitable level of granularity and/or pertaining to any type of I/O request or operation. In some embodiments, the multi-level cache 2523 may comprise cache levels that do not correspond to a particular storage stack layer 2508 but instead correspond to another level of granularity where caching is desirable. For example, the multi-level cache 2523 may comprise an object-level cache that is configured to cache object data of a storage client 2503. The object-level cache may comprise an I/O request monitor (e.g., an object monitor), that is configured to monitor I/O requests pertaining to object I/O requests within the storage client 2503, operating system 2504, or other storage system or subsystem. Similarly, the multi-level cache 2523 may comprise an application-level cache (or storage client level cache), that is configured to monitor and/or cache I/O requests of a particular application or storage client 2503.

The multi-level cache 2523 may comprise a plurality of I/O request monitors 2514A-N, each of which is configured to monitor or filter I/O requests at a particular layer 2511A-N of the storage stack 2508 (e.g., I/O requests of a particular type or granularity). As used herein, an I/O request refers to any type or granularity of I/O request at any layer 2511A-N of the storage stack 2508 including, but not limited to: a read I/O request, a write I/O request, a modify I/O request, a truncate I/O request, etc.; a file-related I/O request, such as file open, close, write, truncate, delete, modify, etc.; a volume-related I/O request, such as mount, unmount, etc.; a disk-related I/O request; SCSi-related I/O requests (e.g., I/O requests at a SCSi protocol layer); and so on. The monitored I/O requests may be examined by one or more cache levels of the multi-level cache 2523 to identify cacheable I/O requests. As used herein, a cacheable I/O request refers to an I/O request that may be serviced by the multi-level cache 2523. Data of a cacheable I/O request may be stored on the cache storage device 2510 subject to cache policy, cache directives, availability of cache resources, cache-level specific policies, cache admissions policies, cache-level specific admissions policies and/or other considerations. A non-cacheable I/O request refers to an I/O request that may be ignored by the multi-level cache 2523 (e.g., not cached in the cache storage device 2510). Each I/O request monitor 2512A-N (described below) may be configured to monitor and/or identify cacheable I/O requests. The multi-level cache 2523 may be configured to service the cacheable I/O requests using the cache storage device 2510. As used herein, "servicing" an I/O request using the cache storage device 2510 refers to performing any suitable cache-related I/O operation, which may include, but is not limited to: reading data from the cache storage device 2510 (e.g., servicing a read I/O request), writing data to the cache storage device 2510 (e.g., servicing a write I/O request), modifying data on the cache storage device 2510, truncating data on the cache storage device 2510, deleting and/or trimming data on the cache storage device 2510 (e.g., issuing a delete or TRIM command), performing one or more I/O operations on the primary store 2526 in relation to a cache-related I/O operation, or the like.

Each cache level of the multi-level cache 2523 may be configured to apply cache level-specific policy, such as for example selection criteria, to distinguish cacheable I/O requests from non-cacheable I/O requests. As used herein, selection criteria refers to any criteria for distinguishing I/O request data that may be cached from I/O request data that should not be cached. As discussed below, selection criteria may be cache-level specific (e.g., a file-level cache may comprise file-selection criteria, a volume-level cache may comprise volume selection criteria, and so on). The selection criteria may be determined by a user (through a configuration interface, such as the interface 2640 of FIGS. 26A and B), may be determined by storage clients 2503, may be determined by the multi-level cache 2523 (e.g., predefined selection criteria, determined or adapted automatically, according to performance constraints), or the like.

The multi-level cache 2523 may be further configured to apply cache size constraints to I/O requests. The multi-level cache 2523 may be configured to prevent caching data lager than a maximum size (e.g., 1 MB) and/or smaller than a minimum size (e.g., less than 4 k). The cache size limits may be used to prevent cache pollution and/or fragmentation of I/O request data within the cache. Alternatively, or in addition, the multi-level cache 2523 may be configured to implement a cache admission policy to prevent cache poisoning. In some embodiments, the cache admission policy comprises detecting sequential I/O requests, applying application-specific criteria, or the like.

In some embodiments, the storage stack 2508 may comprise an existing cache manager 2509 to improve the performance of I/O operations. For example, the storage stack 2508 may comprise buffered or cached I/O operations using the existing cache manager 2509. The existing cache manager 2509 may comprise and/or be communicatively coupled to a volatile memory cache (not shown). As described below, the systems and methods described herein may be used to extend the existing cache manager 2509 using the cache storage device 2510. The system 2500 may leverage the cache storage device 2510 without modification to the storage stack 2508 and/or existing cache manager 2509.

The multi-level cache 2523 may operate within a non-virtual, bare-metal system, or may operate within a virtual machine, as described above.

FIG. 26A depicts another embodiment of a system 2600 for caching I/O request data. The system comprises storage clients 2603, an operating system 2604, a storage stack 2608 (and file system driver 2611), an existing cache manager 2609, and a cache storage device 2610, as described above.

The multi-level cache 2623 may comprise one or more cache levels A-N. As described above, each cache level may be configured to cache I/O request data of a different respective type and/or granularity. For example, a first cache level A may be a file-level cache that is configured to cache file I/O request data at a file-level of granularity (e.g., cache file I/O requests); a second cache level B may be volume-level cache that is configured to cache volume I/O request data at a "volume" level of granularity; another cache level C may be a disk-level cache that is configured to cache I/O request data at a "disk" level of granularity; other cache levels may include a SCSi-level cache that is configured to cache I/O request data at a SCSi-level of granularity, a network cache configured to cache network data; and so on. Although particular caching levels A-N are described herein, the disclosure is not limited in this regard and could be adapted to cache I/O request data at any suitable level of granularity and/or pertaining to any type of I/O request or operation.

As described above, the storage stack 2608 may comprise a plurality of layers 2611A-N. In the FIGS. 26A and B example, the storage stack 2608 comprises a file system layer 2611A, a volume layer 2611B, and a disk layer 2611N. The disclosure is not limited in this regard, however, and could be adapted to use any storage stack comprising any number and/or types of different storage layers 2611A-N.

Each cache level A-N may comprise a respective I/O request monitor 2614A-N, which may be configured to monitor storage requests of a particular type and/or granularity, as described above. In some embodiments, and as depicted in FIG. 26A, the storage stack 2608 may provide an interface (e.g., API) through which the I/O request monitors are notified of I/O events or requests at a particular layer 2611A-N. The I/O request monitors 2614A-N may comprise filter drivers, such as file-filter drivers, volume-filter drivers, disk-filter drivers, SCSi filter drivers, or the like. The I/O request monitors 2614A-N may, therefore, comprise kernel-mode drivers operating within the operating system 2604. Alternatively, one or more of the I/O request monitors 2614A-N may be implemented in a user- or application-space of the operating system 2604.

Each cache level A-N may further comprise a respective cache management system (CMS) 2612A-N. Each CMS 2612A-N may act as a separate and independent cache, maintaining its own respective cache metadata 2613A-N (e.g., cache tags, as described above). A cache device manager 2621 may allocate cache storage space to each of the cache management systems 2612A-N (e.g., each CMS 2612A-N may be allocated one or more chunks or portions within the cache storage device 2610). The cache device manager 2621 may allocate storage locations directly (e.g., using an addresses of the cache storage device 2610) and/or through a virtual storage device (e.g., VLUN disk or virtual disk), a cache device driver (not shown) such as a virtual storage layer (VSL), or the like.

The I/O request monitors 2614A-N may be configured to monitor or filter I/O requests within the storage stack 2608. In some embodiments, the I/O request monitors 2614A-N register with the storage stack 2608. Each I/O request monitor 2614A-N may register at a different respective layer 2611A-N of the storage stack 2608. Accordingly, each I/O request monitor 2614A-N may be configured to monitor I/O requests of a different respective granularity (and/or at a different hierarchical layer) within the architecture defined by the storage stack 2608.

The I/O request monitors 2614A-N may be configured to monitor I/O requests of a particular storage stack architecture or implementation. For example, in a Microsoft Windows® operating system, the I/O request monitors may may be configured to monitor (e.g., intercept) I/O request packets (IRP) passing through the storage stack. The disclosure is not limited in this regard, however, and could be adapted to monitor I/O requests of any suitable type, in any suitable storage stack and/or storage architecture.

The I/O request monitors 2614A-N may be configured to monitor I/O requests of a particular type or granularity. For example, the I/O request monitor 2614A of a file level cache A may be configured to monitor I/O requests pertaining to file storage operations. Accordingly, the I/O request monitor 2614A may comprise a file-filter driver, or the like. Other I/O request monitors 2614B-N of other cache levels may be configured to monitor I/O requests of different types or granularities. For example, a second I/O request monitor 2614B may be configured to monitor volume-level I/O requests, another I/O request monitor 2614N may be configured to monitor disk-level I/O requests, other I/O request monitors (not shown) may be configured to monitor SCSi-level I/O requests, such a SCSi protocol traffic (e.g., using a SCSI filter 1716 of FIG. 17), and so on. Although particular examples of different I/O request types and/or granularities are described herein, the disclosure is not limited in this regard. The I/O request monitors 2614A-N could be configured to monitor any type or granularity of I/O request using any suitable monitoring and/or filtering mechanism.

As described above, each cache level A-N may comprise a separate, independent cache, comprising a respective CMS 2612A-N. Each CMS 2612A-N may maintain respective cache metadata 2613A-N, which may comprise a set of cache tags in accordance with the portion of the cache storage device 2610 allocated to the CMS 2612A-N by the cache device manager 2621.

Each I/O request may comprise a respective source identifier, in accordance with the type and/or granularity thereof. As used herein, a "source identifier" refers to an identifier pertaining to the source of an I/O request. For example, the source identifier of a file I/O request may comprise a file identifier, such as a file name (e.g., "a.txt"), file name and path, a unique file identifier, or the like; the source identifier of a volume I/O request may comprise a volume identifier, such as a volume name (e.g., "c:\"), a unique volume identifier, or the like; a disk I/O request may comprise a disk identifier, such as a disk name, unique disk identifier, disk address (e.g., "Disk 0, block address length 12"), or the like; and so on. Alternatively, or in addition, a source identifier may correspond to a storage location of a file (or other storage entity) on the primary storage 2626. For example, a source identifier may comprise a block address, disk block address, logical block address, or the like.

In some embodiments, the cache metadata 2613A-N maintained by each CMS 2612A-N may associate the source identifier of an I/O request with a respective cache storage location (e.g., cache address or cache page address) comprising data of the I/O request. Accordingly, the cache tag data structure of FIG. 12 may comprise a source identifier field and/or cache address field. FIG. 27 depicts one example of a cache tag data structure comprising a source identifier field 2710. In some embodiments, the source identifier field 2710 comprises a storage location of data on the primary storage device 2626 (e.g., a block address, disk block address, logical block address, disk address, or the like). The data structure 2700 may further comprise a state field, clock hands field, checksum, and valid unit map, as described above.

Referring back to FIG. 26A, in some embodiments, the cache management systems 2612A-N may index the cache tags by source identifier, disk address (e.g., disk block address on the primary storage 2626), cache storage location, a combination of these, or the like, to enable fast cache tag lookups. In some embodiments, cache tags may be arranged in a hashtable data structure, a tree data structure, or the like. Alternatively, or in addition, the cache tags may be arranged in contiguous memory storage locations, as described above.

The multi-level cache 2623 may be configured to monitor I/O requests (using the I/O request monitors 2614A-N), identify cacheable I/O requests based upon a cache policy of a respective CMS 2612A-N, and to service cacheable I/O requests using the respective CMS 2612A-N, as described above. In some embodiments, each cache management system 2612A-N comprises a respective cache policy, which is used to identify cacheable I/O requests. The cache policy of a cache level A-N may comprise cache level-specific selection criteria, which, as discussed above, may be used to identify cacheable I/O requests. The selection criteria may be specific to a particular cache level. For example, the cache selection criteria of a file-level cache may comprise file selection criteria configured to identify I/O requests pertaining to cacheable files; an object-level cache may comprise object selection criteria to identify cacheable object I/O requests; a volume-level cache may comprise volume selection criteria configured to identify cacheable volume I/O requests; a disk-level cache may comprise disk selection criteria to identify cacheable disk I/O requests; a SCSi-level cache may comprise SCSi-selection criteria to identify cacheable SCSi I/O requests; and so on.

The selection criteria of the cache levels A-N may be defined by one or more of a user, a storage client 2603, the operating system 2604, the multi-level cache 2623, a particular cache level A-N, or the like. In some embodiments, the multi-level cache 2623 comprises a configuration interface 2640 through which the multi-level cache 2623 may be configured. A user (or other entity such as a software tool) may define selection criteria for one or more of the cache levels A-N through the configuration interface 2640. The configuration interface 2640 may comprise an API through which storage clients 2603 (or other entities) may programmatically configure the multi-level cache 2623 (e.g., define selection criteria for one or more of the cache levels A-N).

As described above, the storage stack 2608 may comprise an existing cache manager 2609 that is used to cache or buffer I/O request data. In some embodiments, the storage stack 2608 may issue "non-paging" I/O requests pertaining to cached or buffered I/O, which may be serviced using the existing cache manager 2609. The storage stack 2608 may issue "paging" I/O requests pertaining to operations that are directed to the primary storage 2626, such as misses in the existing cache manager 2609, flushes of the existing cache manager 2609, or the like. In one embodiment, the multi-level cache 2623 may be configured to ignore non-paging I/O requests and to monitor and/or service paging I/O requests exclusively. Accordingly, the multi-level cache 2623 may extend caching benefits of the existing cache manager 2609 transparently (e.g., without modifying the storage stack 2608 and/or cache manager 2609).

In some embodiments, the multi-level cache 2623 is further configured to ignore particular types of I/O requests. For example, the storage stack 2608 may comprise "direct I/O" requests, which are configured to bypass the existing cache manager 2609 to access the primary storage 2626 directly (e.g., provide unbuffered I/O). The multi-level cache 2623 (e.g., I/O request monitors 2614A-N) may be configured to ignore these "direct I/O" requests, in certain embodiments.

In some embodiments, the cache storage device 2610 may have a larger storage capacity than the existing cache manager 2609 and/or may be configured with a different cache policy or configuration. Accordingly, the multi-level cache 2623 may act as a type of "victim cache" for the existing cache manager 2609. In the event of a miss in the existing cache manager 2609, one or more of the cache levels A-N may be used to service the I/O storage request, rather than the primary storage 2626, which may significantly improve performance.

In another example, and in response to an I/O request that is a "miss" in each of the cache levels A-N, data may be accessed from the primary storage 2626. The I/O request data may be cached in the cache storage device 2610 (in conjunction with the appropriate cache level A-N). Due to space constraints of the existing cache manager 2609, certain previously requested data may be evicted. However, due to increased storage space in the cache storage device 2610, the I/O request data may be retained for a longer period of time. A subsequent I/O request for the data may result in a miss in the existing cache manger 2609, but a hit in the cache storage device 2610. The I/O request may be serviced using the cache storage device 2610 (rather than slower primary storage 2626). Servicing the I/O request may comprise repopulating the existing cache manager 2609 with the previously evicted data.

In another instance, the multi-level cache 2613 may be configured to cache I/O request data in response to a write I/O request. The existing cache manager 2609 may not cache the data (due to capacity limitations or policy constraints). Alternatively, the existing cache manager 2609 may cache the data, but the data may be evicted before being requested in a subsequent I/O request. In response to the subsequent I/O request, the data may be accessed from the cache storage device 2610 rather than primary storage 2626. Accordingly, the cache storage device 2610 may transparently extend the existing cache manger 2609 (e.g., act as a type of victim cache, or cache extension, for the cache manager 2609) and increase overall I/O performance.

In some embodiments, the I/O request monitors 2614A-N may monitor (and cache) "overlapping" I/O requests. For example, an I/O operation pertaining to a file (e.g., "a.txt") may result in file-layer I/O requests, volume-layer I/O requests, disk-layer I/O requests, SCSi-layer I/O requests, and so on, each of which may be monitored and/or cached by a different cache level A-N. As result, a particular file "a.txt" could be redundantly cached in more than one cache level A-N. Accordingly, in some embodiments, each cache level A-N may implement cache policy comprising one or more exclusion rules. As used herein, an "exclusion rule" refers to cache policy information that is configured to prevent redundant monitoring and/or caching of I/O request data. Exclusion rules may be maintained by each cache management system 2612 (e.g., in cache metadata 2613A-13N) and may be enforced by the I/O request monitors 2614A-N and/or cache management systems 2612A-N. For example, an exclusion rule may configure a file-level cache A to ignore file I/O requests that will be monitored and/or cached by another cache level B-N, such as a volume cache, disk cache, or the like. Exclusion rules may be enforced when the cache management systems 2612A-N are configured. For example, at configuration time, an exclusion rule may prevent a file-level cache A from being configured to cache files that will be cached according to the configuration of another cache level B-N. Alternatively, or in addition, exclusion rules may be implemented during run-time (e.g. during operation of each of the cache management systems 2612A-N). The exclusion rules may allow configuration-time redundancy and may enforce the exclusion rules dynamically, at run time. For example, file-level cache A may be configured to cache data of "a.txt" even though another cache level B-N is also configured to cache data of "a.txt." During runtime, exclusion rules of the cache levels A-N may be enforced such that only one of the cache levels A-N actually caches the data of "a.txt." For example, the file-level cache A may cache data of "a.txt" when the other cache level B-N does not cache the data (e.g., due to cache policy, availability, or other constraints) or vice versa.

In some embodiments, the exclusion rules of the multi-level cache 2623 may be defined through the configuration interface 2640. Exclusion rules may be defined by a user, storage client 2603, the multi-level cache 2623, one or more cache levels A-N, or the like.

The cache device manager 2621 may be configured to allocate cache storage space between one or more of the cache levels A-N (e.g., cache management systems 2612A-N). In some embodiments, the cache management systems 2612A-N may be allocated cache storage (e.g., one or more chunks of the cache storage device 2610, as described above). The allocation may refer to cache addresses of the cache storage device 2610 and/or may reference a virtual address space of a virtual storage device, such as the VLUN disk 2618 of FIG. 26B, or a virtual storage layer).

The cache device manager 2621 may allocate cache storage using "shares," as described above. Alternatively, or in addition, the cache device manager 2621 may allocate cache resources according to a "ratio" between cache levels A-N, in which each cache level A-N may be allocated a proportional share of the cache storage device 2610. Referring to FIG. 26B, in some embodiments, the multi-level cache 2623 operates within a guest operating system 2604 of a virtual machine (VM-1). The cache storage device 2610 may be shared among a plurality of virtual machines VM-1-N. A VLUN driver 2622 may allocate portions (e.g., chunks) of the cache storage device 2610 to one or more of the virtual machines, and the multi-level cache 2623 may access the cache storage device 2610 through a VLUN disk 2618, as described above in relation to FIGS. 17, 21, and 22. In some embodiments, the multi-level cache 2623 may comprise a SCSi I/O filter (or monitor 2514A-N), which may be configured to identify the VLUN disk 2618, receive capacity changes from the VLUN driver 2622, and/or manage commands between the multi-level cache 2623 and the virtualization kernel 2607, as described above.

Although FIGS. 26A and 26B depict a multi-level cache comprising separate I/O request monitors 2614A-N, the disclosure is not limited in this regard. In some embodiments, the multi-level cache 2613 may not comprise a one-to-one association between I/O request monitors 2614A-N and cache management systems 2612A-N. For example, in some embodiments, the multi-level cache 2623 may comprise a single monitoring module configured to monitor I/O requests for each of the cache levels A-N (e.g., monitor I/O requests at a plurality of different layers within the storage stack 2608). Moreover, the multi-level cache 2623 is not limited to monitoring I/O requests using a storage stack 2608 and could be adapted to monitor I/O requests using any suitable mechanism.

In some embodiments, the cache device manager 2621 allocates cache capacity to the cache levels A-N of the multi-level cache 2623 according to an allocation pattern. The allocation pattern may correspond to the "share" or "ratio" allocated to each cache level A-N. The cache device manager 2621 may be configured to allocate cache space in accordance with user preferences, the requirements of different cache levels, and/or the like. The cache device manager 2621 may not allocate cache space to cache levels A-N that are unused and/or inactive. The cache device manager 2621 may be configured to dynamically adjust the allocation ratio in response to cache levels A-N being activated and/or deactivated, in response to changing demand conditions, updated configuration, and so on. In some embodiments, the cache device manager 2621 holds cache storage space in reserve. The reserved cache storage space may be held in reserve and unused until required by a cache level A-N (e.g., in response to a cache level A-N being activated, etc.).

The allocation pattern may be configured to maintain the share or ratio allocation between cache levels A-N despite changes to the overall cache capacity allocated to the virtual machine of the multi-level cache 2623 (e.g., VM-1). As discussed above, the cache storage device 2610 may be shared between a plurality of VMs 1-N, each of which may comprise a respective cache (e.g., multi-level cache 2623). The cache space that is allocated to a particular virtual machine may change depending upon the requirements of other virtual machines on the host 2602. As the allocated cache space changes, the allocation pattern implemented by the cache device manager 2621 may maintain the allocation share or ratio between the cache levels A-N.

FIG. 28A depicts one example of a cache allocation pattern within a cache address space 2800. In the FIG. 28A example, a virtual machine is allocated cache space 2851. A cache device manager (e.g., cache device manager 2621) may allocate portions of this cache space 2851 to each of a plurality of cache levels A, B, and C according to a one (1), one (1), two (2) ratio in which, for every cache chunk allocated to A and/or B, C is allocated two (2) cache chunks. The virtual machine may initially be allocated cache space 2851 comprising sixteen (16) chunks 0-15 in the cache address space 2800. As shown in FIG. 28A, the chunks 0-15 may be allocated according to the one (1), one (1), two (2) allocation ratio: cache level A (e.g., CMS 2612A) is allocated cache chunks 0, 4, 8, and 12; cache level B (e.g., CMS 2612B) is allocated cache chunks 1, 5, 9, and 13; and cache level C is allocated cache chunks 2, 3, 6, 7, 10, 11, 14, and 15. As illustrated in FIG. 28A, the chunks 0-15 may be allocated in an interleaved allocation pattern that maintains the allocation ratio between cache levels A, B, and C despite linear modifications to the cache space allocated to the virtual machine 2851. Other portions of the cache space 2853 may be inaccessible (e.g., unmapped in the VM).

The cache space allocated to the virtual machine 2851 may decrease from sixteen (16) to twelve (12) chunks. The allocation may be implemented linearly within the cache address space 2800 (from the front or rear of the address space 2800). FIG. 28B depicts the cache address space 2800 after this deallocation. As shown in FIG. 28B, the allocation pattern maintains the one (1), one (1), two (2) allocation ratio between cache levels A, B, and C. Moreover, the remaining chunks 0-11 may remain allocated to their respective cache levels A, B, and C (e.g., there is no need to reassign the remaining chunks). FIG. 28C depicts the cache address space 2800 after increasing the cache space allocated to the virtual machine 2851 to twenty (20) chunks. The increase in allocation may be linear, as described above. The newly allocated chunks may be allocated to the cache levels A, B, and C in accordance with the interleaved allocation pattern described above. The allocation increase may be made linearly within the address space 2800 without reassigning the chunks 0-11 (or 0-15) that were already allocated to the virtual machine. Although particular cache allocation patterns and allocation ratios are described herein, the disclosure is not limited in this regard. The systems and methods described herein could be adapted to implement any suitable allocation pattern for any suitable allocation ratio and within any suitable cache address space.

Although FIGS. 28A-C describe an allocation pattern configured to maintain a cache-level allocation ratio despite linear modifications to available cache space, the disclosure is not limited in this regard. In some embodiments, the cache device manager 2621 may be configured to allocate cache space to the cache levels A-N in a different type of allocation pattern (e.g., in contiguous chunks, non-linearly, or the like). In response to a change in the available cache space, the cache device manager 2621 (and/or VLUN driver 2622) may reclaim (or add) cache space "non-linearly" in the cache address space according to the cache-level allocation ratio. For example, cache space may be reclaimed from arbitrary chunks of the cache space allocated to each cache level A-N in accordance with the allocation ratio between the cache levels A-N.

Referring back to FIGS. 26A-B, in some embodiments, the cache device manager 2621 may be configured to allocate IOPS between cache levels. As described above, a VLUN driver (e.g., VLUN driver 1720) may be configured to balance IOPS requirements between virtual machines. The cache device manager 2621 may operate similarly. In some embodiments, the cache device manager 2621 balances IOPS between the cache layers and the cache storage device 2610 in accordance with a pre-determined cache level IOPS ratio. The balancing function of the cache device manager 2621 may prevent a particular cache layer A-N from using an inordinate amount of a limited I/O bandwidth between the multi-level cache 2623 and the cache storage device 2610.

In some embodiments, one or more of the cache levels A-N may be configured to compress I/O request data for storage on the cache storage device 2610. The I/O request data may be compressed according to a pre-determined compression ratio (e.g., 2×, 4×, 8×, etc.). The I/O request data may be compressed using an application programming interface of the storage stack 2608 (e.g., file compression provided by a file system driver 2611, or the like). For example, a file-level cache A may compress I/O request data using an LZNT1 compression algorithm provided by the operating system 2604 and/or storage stack 2608.

Compressing I/O request data may increase the effective storage capacity of a cache level A-N. Each cache level A-N may implement a different respective compression ratio and/or compression algorithm. In some embodiments, when a cache level A-N is configured to compress I/O request data, the cache device manager 2621 and/or VLUN disk 2618 may present a corresponding increase in logical cache space to the cache level A-N. For example, the cache space presented to a cache level A that is configured for 2× compression may appear to double; the cache space available to a cache level B configured for 4× compression may appear to quadruple, and so on. The physical cache capacity allocated to the cache level A-N is unchanged, however, there is a potential that the cache layer can store n times more data, where n=2, 4, 8, 16. Accordingly, the cache layer A-N provides more cache tags and accepts more data for caching before the cache layer is full and eviction of data is needed. The cache management systems 2612A-N may update cache metadata 2613A-N identifying the compression level (if any) of data in the cache storage device 2610.

The cache management system 2612A-N may track the apparent increase in cache storage space using cache metadata 2613A-B (e.g., by increasing the number of cache tags). For example, each cache tag and/or corresponding cache page may be "split" in accordance with the compression ratio (e.g., each cache tag and/or cache page may be capable of storing multiple pages of compressed data). Therefore, a particular cache page may be represented by two (2) or more cache tags depending upon the compression ratio implemented by the cache level A-N. The cache metadata 2613A-N may comprise additional cache tags (or a cache tag offset) to track the compressed I/O request data. The additional cache tags and/or corresponding cache pages may be represented in cache metadata 2613A-N.

Some types of I/O request data may be incompressible and/or may not be compressible to the compression ratio of a particular cache level A-N (e.g., the data may be capable of 2× compression, but not 4× compression). In response, the cache management system 2612A may represent the uncompressed data (or under compressed data) as "larger" compressed data for storage on the cache storage device 2610. For example, in a cache management system 2612A comprising 4 k cache pages and configured for 2× compression, 4 k of incompressible data may be stored on the cache storage device 2610 in association with two (2) cache tags, each cache tag corresponding to 2 k of raw storage space. In a 4× compression example, a 4 k segment of incompressible data may be stored on the cache storage device 2610 in association with four (4) cache tags, and so on. Alternatively, in such an embodiment, the incompressible data may be associated with a single tag identifying a first 4 k segment and the remaining 1-3 tags (depending on the compression ratio) for the remaining 4 k segments of the incompressible data may be reserved and simply identify the single tag identifying the first 4 k segment. In some embodiments, partial compression may result storing a data segment that is smaller than a page size (e.g., smaller than 4 k). In this example, the compressed data may be stored with padding data to fill out the remainder of the page (e.g., with zeros or other suitable padding).

In some embodiments, uncompressed data may be stored across a storage boundary (e.g., a page boundary). For instance, in a 4× compression example, a cache page may comprise three (3) pages of 4× compressed data. Another 4 k data segment to be stored within the remaining 1 k of the compressed page may be uncompressible. As such, the uncompressed data may be represented as 4 cache tags (e.g., 4 pages) of compressed data. A 1 k portion of the incompressible data may be stored on the current cache page (with the three (3) compressed pages for a previous IO operation), and the remaining 3 k may be stored on another page of the cache storage device 2610. Accordingly, reading and/or writing the incompressible data may comprise reading and/or writing two or more pages on the cache storage device 2610.

As described above, each cache level A-N may comprise a respective cache management system 2612A-N. Each cache management system 2612A-N may implement a respective cache policy. The cache policy may be used to determine cache admissions, cache evictions, and so on. In some embodiments, the cache policy comprises a clock sweep module to identify steal candidates (e.g., eviction candidates), as described above. The cache policy may further comprise cache size limits, such as a maximum cache size and/or minimum cache size and/or sequential I/O detection, as described above.

In some embodiments, the cache levels A-N may be configured to communicate information pertaining to a particular I/O request type and/or granularity to other cache levels A-N. For example, a volume-level cache B may be configured inform a file-level cache A that a particular volume has been unmounted. In response, the file-level cache may remove any I/O request data pertaining to files on the unmounted volume from the cache storage device 2610. In another example, a disk-level cache may inform a volume-level cache that a disk comprising one or more cacheable volumes has been removed. In response, the volume-level cache may remove cached data pertaining to the affected volumes. In some embodiments, removing data from the cache storage device 2610 may comprise invalidating cache tags of the data at one of the cache levels A-N (e.g. a message may be sent to a particular cache management system 2612A-N that was caching the data affected). Alternatively, or in addition, removing the data may comprise issuing a TRIM command (or other message) to inform the cache storage device 2610 that the data need not be preserved.

In embodiments, the cache levels A-N may be configured by bypass one or more levels of the storage stack 2608. For example, a file storage operation may result in separate I/O requests passed between layers of the storage stack 2608 including, but not limited to: file layer 2611A I/O requests, volume layer 2611B I/O requests, disk layer 2611N I/O requests, and so on. A cache-layer A-N may be configured to bypass one or more of these I/O request "layers" under certain, pre-determined conditions. For example, referring to FIG. 26B, a file-level cache A may monitor an I/O request pertaining to file data that is cached in the cache storage device 2610. The file-level cache A may service the I/O request directly through the cache storage device 2610 (and/or through a SCSi level cache N and/or the VLUN disk 2618), bypassing intervening volume-layer I/O 2611B request(s), disk-layer 2611C I/O request(s), and so on. In some embodiments, the file-level cache A may bypass subsequent I/O requests by "consuming" the I/O request within the storage stack 2608, such that the subsequent lower-level I/O requests are not passed on through the storage stack 2608. The disclosure is not limited in this regard, however, and could be adapted to use any suitable mechanism for bypassing storage layers 2611A-N.

Figure 29:
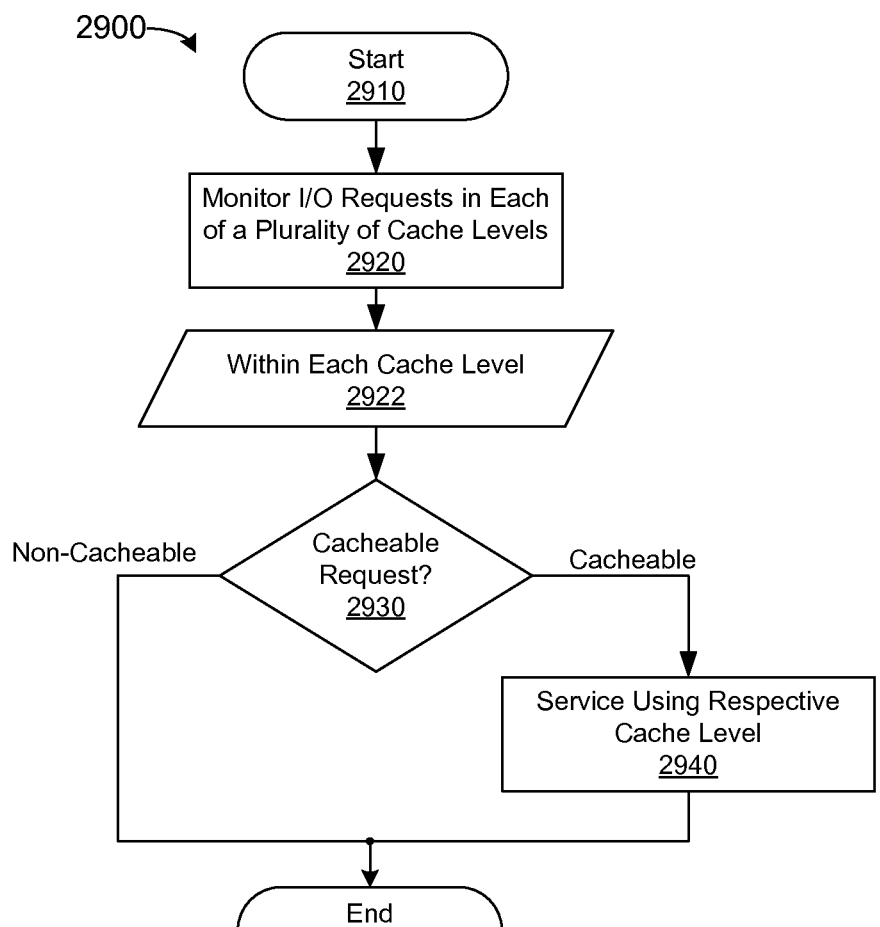
FIG. 29 is a flow diagram of one embodiment of a method for caching I/O request data on a multi-level cache.

FIG. 29 is a flow diagram of one embodiment of a method 2900 for caching I/O request data using a cache storage device. At step 2910, the method 2900 starts and is initialized. Step 2910 may comprise loading computer-readable instructions to implement one or more steps of the method 2900 from a non-transitory computer-readable medium, such as a hard disk, non-volatile memory, or the like. Step 2910 may further comprise accessing and/or initializing machine components tied to steps of the method 2900, such as processors, communication interfaces, computer-readable storage media, and the like.

Step 2920 comprises monitoring I/O requests for each of a plurality of different cache levels, each cache level configured to monitor I/O requests of a particular type and/or granularity (e.g., different layer 2611A-N of a storage stack 2608). The cache levels of step 2920 may comprise, but are not limited to: a file-level cache, a volume-level cache, a disk-level cache, a SCSi-level cache, or the like. Each cache level may be configured to monitor I/O requests of a different respective type and/or granularity, as described above. The monitoring of step 2920 may comprise one or more I/O request monitors monitoring I/O requests in a storage stack, such as the I/O request monitors 2614A-N described above.

In some embodiments, step 2920 comprises ignoring pre-determined types of I/O requests, such as non-paging I/O requests (e.g., buffered I/O requests), direct I/O requests, or the like.

In some embodiments, step 2920 may comprise configuring the multi-level cache (e.g., through a configuration interface 2640). Step 2920 may comprise defining cache policy, such as selection criteria of one or more cache levels, defining exclusion rules, and so on.

At step 2922, each of the plurality of cache levels may determine if the monitored I/O request is a cacheable request and, if so, service the I/O request using a respective cache management system (e.g., CMS 2612A-C). Although step 2922 depicts an iteration of cache level steps 2922-2940 in series, each cache level could implement steps 2930 and/or 2940 independently and/or in parallel.

Step 2930 comprises a respective cache level determining if a monitored I/O request is cacheable. Step 2930 may comprise applying a cache level policy to the monitored I/O request, such as file selection criteria, volume selection criteria, disk selection criteria, SCSi selection criteria, or the like. The selection criteria may be set via a configuration interface of the multi-level cache (e.g., user-defined selection criteria). Step 2930 may further comprise applying a cache admission policy, such as cache size constraints, a maximum and/or minimum size, etc. In some embodiments, step 2930 further comprises applying a cache admission policy to prevent cache poisoning, as described above.

If the I/O request is cacheable by a cache level, the flow may continue to step 2940; otherwise, the flow may end at step 2950 where the I/O request is serviced by primary storage. In some embodiments, step 2930 may comprise evaluating one or more exclusion rules to prevent redundant caching. As described above, other cache levels may be prevented from servicing an I/O request that has already been serviced by a cache level.

Step 2940 may comprise servicing the I/O request using one of a plurality of cache management systems (e.g., CMS 2612A-N). Step 2940 may comprise the cache management system maintaining cache metadata (e.g., cache tags) to associate source identifiers of I/O request data with storage locations of the cache storage device (e.g., cache addresses of the cache storage device 2610). In some embodiments, the cache addresses may reference virtual cache addresses of a VLUN disk (e.g., VLUN disk 2618).

In response to a read I/O request, step 2940 may comprise determining whether data of the I/O request is available on the cache storage device. Step 2940 may comprise using a source identifier and/or primary address of the I/O request to access a cache address in the cache metadata (e.g., access a cache tag, as described above). If data of the I/O request is available, step 2940 may further comprise accessing data on the cache storage device at a specified cache storage location. In some embodiments, the cache storage device may be accessed directly. Alternatively, the cache storage device may be accessed through a virtual storage interface, such as a VLUN disk 2618.

In response to a write I/O request, step 2940 may comprise storing data on the non-volatile storage device (e.g., cache storage device 2610). Step 2940 may further comprise acknowledging completion of the I/O request when the data has been written to primary storage, as described above. The non-volatile storage device may be accessed directly, through a VLUN disk, or the like.

Step 2940 may comprise servicing other types of I/O requests including, but not limited to: update, modify, truncate, delete, TRIM, or the like. Step 2940 may comprise servicing such requests by accessing the cache storage device directly and/or via a virtual machine interface, as described above.

In some embodiments, step 2940 comprises bypassing one or more layers of a storage stack. For example, when an I/O request can be serviced at a first cache level (e.g., a file-level cache), step 2940 may comprise bypassing other, lower-level I/O requests (e.g., volume layer I/O requests, disk layer I/O requests, etc.). In some embodiments, the other layers are bypassed by "consuming" the I/O request. However, the disclosure is not limited in this regard and could be adapted to bypass storage layers using any suitable mechanism. After servicing the I/O request in a cache layer, the flow ends at 2950.

Figure 30:
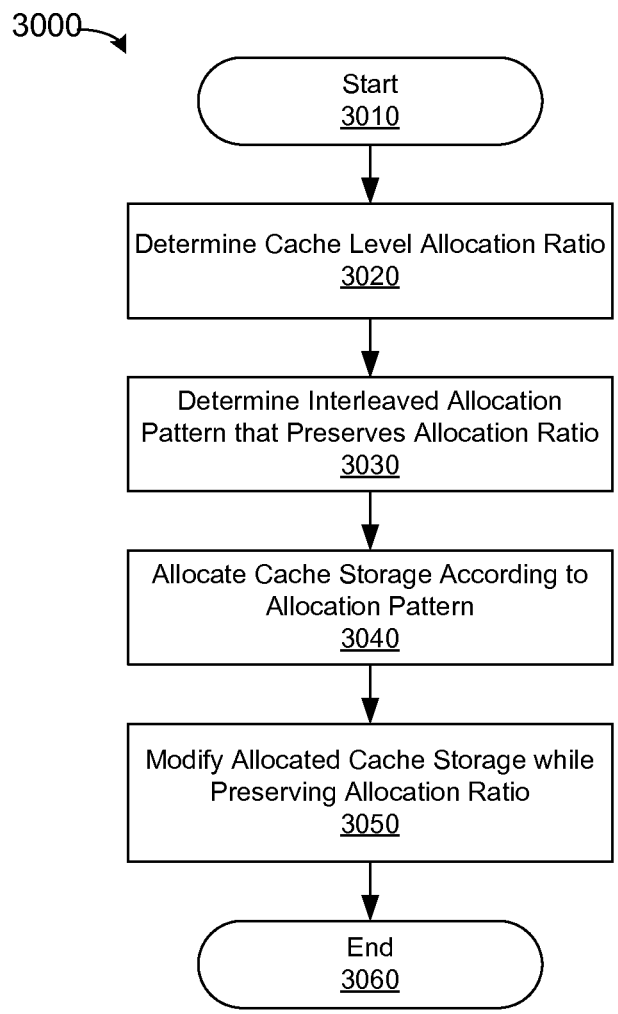
FIG. 30 is a flow diagram of one embodiment of a method for allocating data to cache levels of a multi-level cache.

FIG. 30 is a flow diagram of one embodiment of a method for caching I/O request data using a cache storage device. At step 3010, the method 3000 starts and is initialized, as described above.

Step 3020 may comprise determining a cache-level allocation ratio between a plurality of cache levels of a multi-level cache. The cache levels may correspond to different respective I/O request types and/or granularities, as described above. In some embodiments, the cache level ratio may be determined by a cache device manager, such as the cache device manager 2621, described above. The cache-level allocation ratio may be determined based upon user preferences set via a user interface, may be determined dynamically according to cache level requirements, or the like.

Step 3030 may comprise determining a cache-level allocation pattern that is configured to preserve the cache-level allocation ratio of step 3020 despite modifications to the cache space allocated to the cache levels (e.g., a linear modification, or other modification). Step 3030 may, therefore, comprise determining an interleaved allocation pattern, as described above. Alternatively, the allocation pattern may comprise a non-linear, interleaved allocation pattern.

Step 3040 comprises allocating cache storage according to the cache-level allocation pattern of step 3030. The allocation pattern may comprise a repeated, interleaved allocation pattern, as described above. In some embodiments, step 3040 may comprise the cache device manager allocating cache tags to each of the cache levels in accordance with the cache storage space allocated to the cache level.

Step 3050 comprises modifying the amount of cache storage space available to the multi-level cache while preserving the allocation ratio of step 3020. The modification of step 3050 may be made by the cache device manager 2621 and/or VLUN driver 2622, as described above. Step 3050 may comprise adding or removing cache storage space. In some embodiments, cache storage space may be modified linearly. The allocation pattern of steps 3030 and 3040 may preserve the cache-level allocation ratio of step 3020 despite the linear addition or removal of cache space. Alternatively, the allocation pattern may maintain the allocation ratios under other, non-linear allocation changes. When cache storage is added, step 3050 may comprise allocating the additional cache storage space to the cache levels in accordance with the interleaved cache allocation pattern determined at step 3020. When cache storage is removed, step 3050 may comprise removing storage space linearly within the cache address space that was allocated to the cache levels in accordance with the interleaved cache-level allocation pattern of steps 3020 and 3030. The method 3000 ends at step 3060 until the cache space is reallocated and/or modified.

Figure 31A:
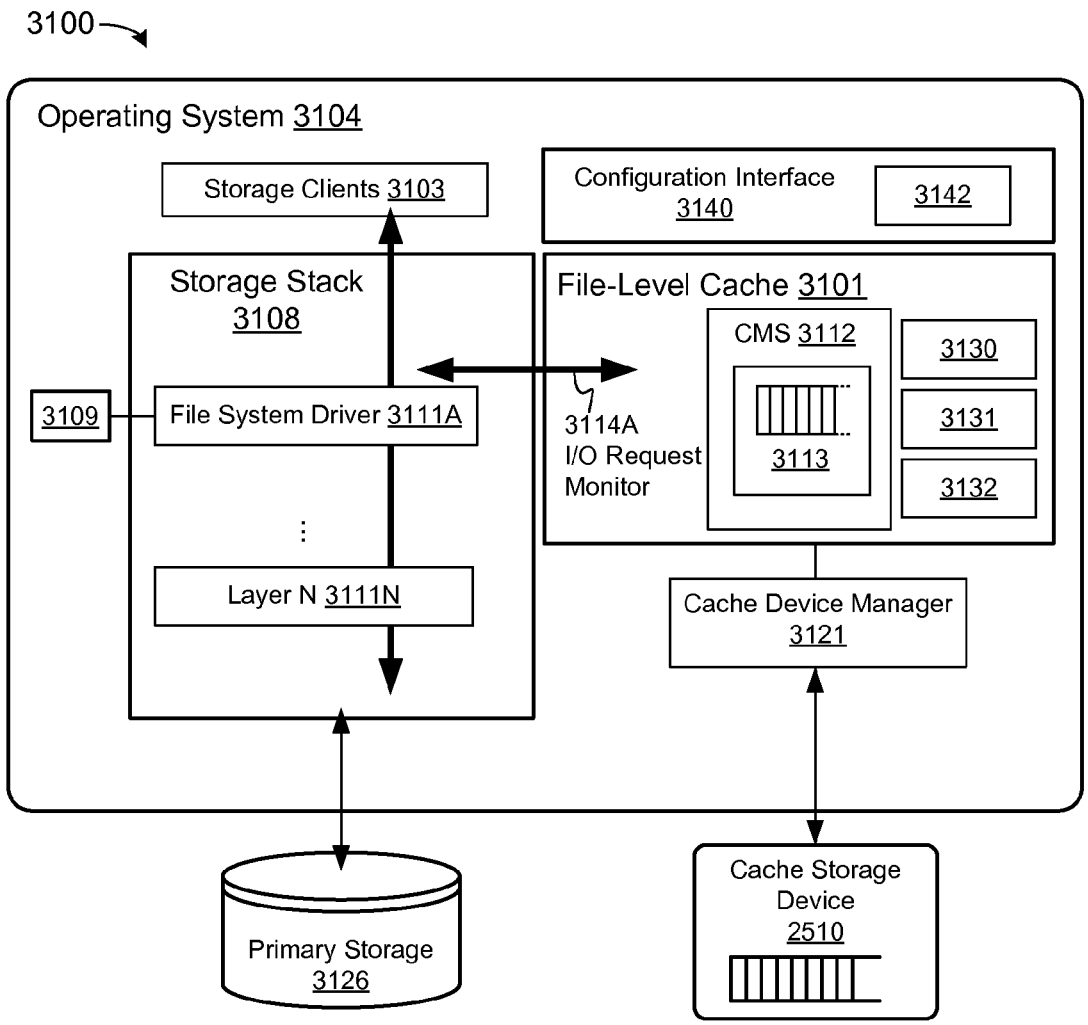
FIG. 31A is a block diagram of one embodiment of a system for caching I/O request data comprising a file-level cache.

FIG. 31A is a block diagram of one embodiment of a file-level cache 3101 comprising an I/O request monitor 3114A, a cache management system 3112, and cache metadata 3113. The file-level cache 3101 of FIG. 31A may be used as one or more cache levels A-N of FIGS. 26A-B.

Figure 31B:
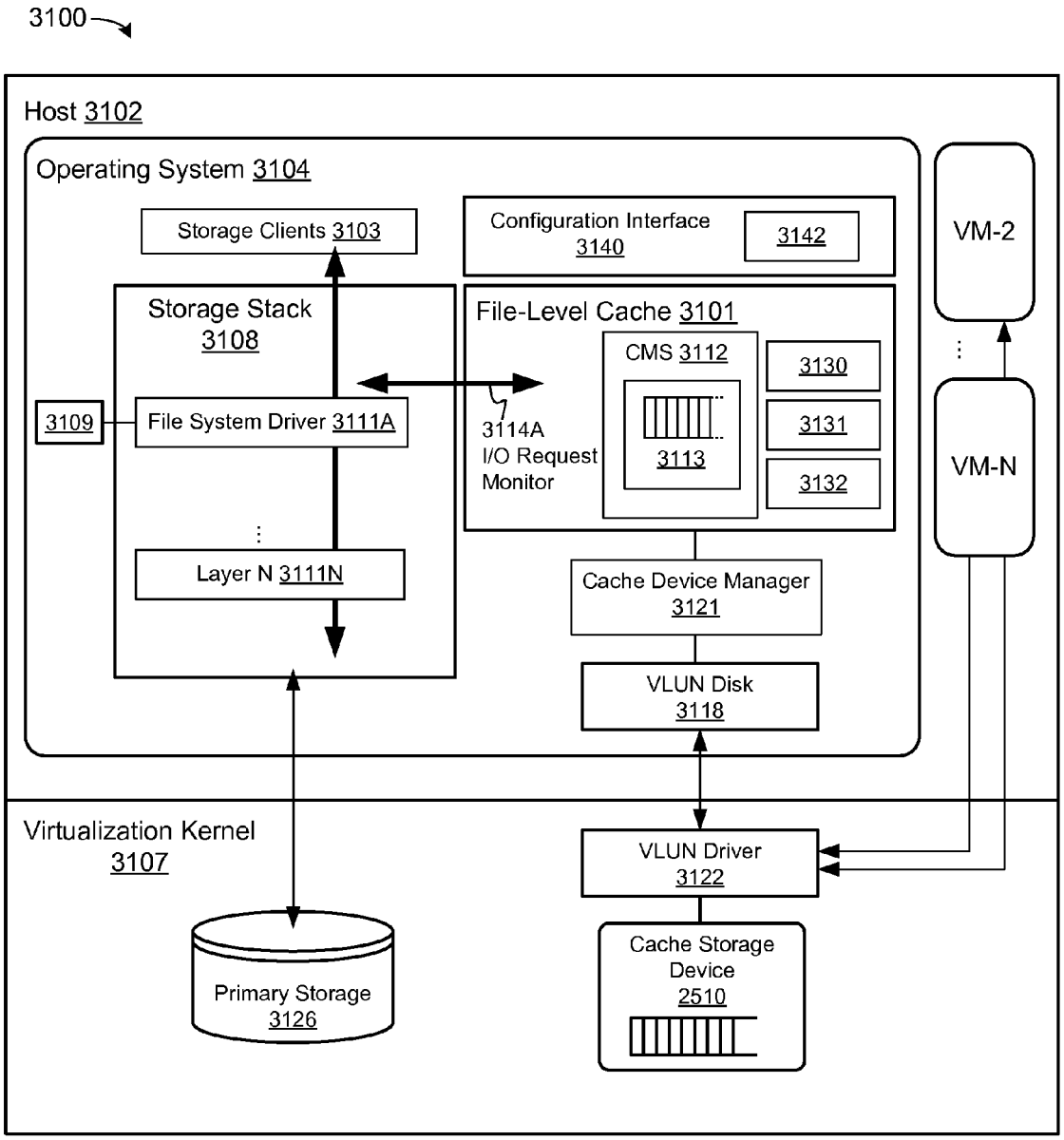
FIG. 31B is a block diagram of another embodiment of a system for caching I/O request data comprising a file-level cache.

The file-level cache 3101 may comprise and/or be communicatively coupled to a cache device manager 3121, which may manage the allocation of cache space to the file-level cache 3101. As depicted in FIG. 31A, the operating system 3104 may comprise a "bare metal" operating system operating directly on a computing device (not shown). Accordingly, the cache device manager 3121 and/or file-level cache 3101 may be configured to access the cache storage device 3110 directly, as described above. Referring to FIG. 31B, in some embodiments, the operating system 3104 may comprise a guest operating system of one of a plurality of virtual machines VM-1 to N operating on a host 3102. Accordingly, the cache device manager 3121 and/or file-level cache 3101 may be configured to access the cache storage device 3110 through a VLUN disk 3118 and/or SCSi filter (e.g., the SCSi filter 1716 of FIG. 17), as described above.

The file-level cache 3101 may comprise an I/O request monitor 3114A that is configured to monitor I/O requests in a storage stack 3108. As described above, the storage stack may comprise a plurality of layers 3111A-N, including a file system layer 3111A. The I/O request monitor 3114A may be configured to monitor I/O requests pertaining to file operations, such as file open, close, read, write, modify, and the like. The I/O request monitor 3114A may monitor other types of I/O requests, such as volume mount and/or unmount, disk mount and/or unmount, paging I/O, and so on. The I/O request monitor 3114A may monitor I/O requests using an interface provided by the operating system 3104, such as the storage stack 3108, as described above. Accordingly, the I/O request monitor 3114A may comprise a file-filter driver and/or other suitable monitoring and/or filtering modules.

The file-level cache 3101 may comprise a cache management system 3112 that is configured to maintain cache metadata 3113, such as cache tags, as described above. The cache management system 3112 may comprise a cache policy 3130, which includes file selection criteria 3131. The file selection criteria 3131 may comprise a plurality of rules and/or filters which may be used to identify cacheable files (e.g., distinguish cacheable files from non-cacheable files). As used herein, a cacheable file refers to a file that may be serviced by the cache management system 3112 (e.g., satisfies the file selection criteria 3131). Data of a cacheable file may be stored on the cache storage device 3110 so long as one or more other criteria are satisfied including cache policies, cache directives, availability of cache resources, and/or other considerations. A non-cacheable file may refer to a file that does not satisfy the file selection criteria and, as such, may not be serviced using the cache management system 3112. However, even if a particular file does not satisfy the file selection criteria, another cache level (not shown), such as a volume-level cache, disk-level cache, SCSi-level cache, or the like, may be configured to cache data of the file.

The file-level cache 3101 may be configured to transparently extend an existing cache manager 3109 of the operating system 3104, as described above. Accordingly, the file-level cache 3101 (e.g., I/O request monitor 3114A) may be configured to distinguish different I/O request types including, but not limited to: non-paging I/O requests, paging I/O requests, direct I/O requests, and the like. The file-level cache 3101 may be configured to ignore I/O requests, such as direct I/O requests that are expected to access primary storage 3126 directly and/or non-paging I/O requests pertaining to the existing cache manager 3109.

The file-level cache 3101 may identify cacheable I/O requests by applying the file selection criteria 3131 to monitored I/O requests. I/O requests pertaining to cacheable files may be identified as cacheable I/O requests, and I/O requests pertaining to non-cacheable files may be identified as non-cacheable I/O requests. In some embodiments, the I/O request monitor 3114A may track file I/O operations using metadata, such as an I/O request "context," or the like. The I/O request monitor 3114A may generate this context metadata in response to detecting an I/O request pertaining to a file operation, such as a file open, read, copy, delete, create, truncate, modify, write, or the like. The I/O request monitor 3114A may use the I/O request metadata (e.g., context) to associate the I/O request (and subsequent I/O requests) with a source identifier, such as file identifier, file name, volume identifier, disk identifier, or the like. In some embodiments, the I/O request monitor 3114A may include an indication of whether a particular file (and/or corresponding I/O request) is cacheable. The file-level cache 3101 may access this indication to determine whether subsequent I/O requests are cacheable, without re-applying the file selection criteria. Although a particular example of I/O request metadata is described herein, the disclosure is not limited in this regard; the systems and methods disclosed herein could be adapted to maintain I/O request metadata using any suitable mechanism.

In one example, a storage client 3103 may open a plurality of files, resulting in corresponding file open I/O requests. The I/O request monitor 3114A may associate the I/O requests with corresponding I/O request metadata, which may include a source identifier of the file, an indication of whether the file is cacheable, and so on. The storage client 3103 may perform I/O operations on the files, which may be serviced using the existing cache manager 3109. The I/O request monitor 3114A may ignore corresponding non-paging I/O requests, as described above. Later, in accordance with cache policy for the existing cache manager 3109, the existing cache manager 3109 may be flushed, resulting in a one or more paging I/O requests. The I/O request monitor 3114A may access the I/O request metadata (e.g., context) of the paging I/O requests to determine the source identifier (e.g., file name) associated with the requests, determine whether the I/O requests pertain to cacheable files, and so on. I/O requests that pertain to cacheable files may be serviced using the cache management system 3112, as described above. The I/O request metadata may comprise context data of an I/O request and/or may be maintained in a separate datastructure within the cache metadata 3113A. The I/O request metadata may be stored in any suitable datastructure (e.g., table, hashtable, map, tree, etc.), and may be indexed by source identifier, file name, or the like.

As discussed above, the file-level cache 3101 may identify cacheable files using selection criteria (e.g., file selection criteria 3131), which may comprise any suitable criteria for selecting cacheable files. The file selection criteria 3131 may allow a user (or other entity) to specify files to be cached using the cache storage device 3110. Accordingly, the file selection criteria 3131 may allow a user to control the operation of the file-level cache 3101 at a file-level of granularity (e.g., specify particular files to be cached).

In some embodiments, the file selection criteria may comprise matching rules, such as a file name match (e.g., cache files named "name*.dat"), file extension match (e.g., cache all ".dat" files), regular expression match, file path match (e.g., cache all files in the "c:\dat\" directory), file application association (e.g., cache all files associated with application X), and so on. The file selection criteria 3131 may be set by a user (or other entity) via the configuration interface 3140. Alternatively, or in addition, file selection criteria may be defined another entity, such as a storage client 3103, operating system 3104, or the like. For example, a storage client 3103 may configure file selection criteria 3131 to cache certain predetermined files that are critical to the performance of the storage client 2603. In some embodiments, the file-level cache 3101 may be configured to automatically identify files for caching (e.g., by profiling file I/O requests, etc.). Files may be identified based upon access frequency, time or the like. The file-level cache 3101 may automatically configure the file selection criteria 3131 to cache the identified files.

In some embodiments, the configuration interface 3140 may comprise one or more exclusion rules 3142. As described above, the exclusion rules 3142 may be configured to prevent the file-level cache 3101 from caching I/O request data that other cache levels (not shown) are configured to service. A user (or other entity) may define exclusion rules 3142 that allow redundant caching between cache levels and/or allow run-time evaluation of exclusion rules 3142, as described above.

In some embodiments, file selection criteria 3131 may be used to tune the behavior of the file-level cache 3101 at a file-level of granularity. For example, file selection criteria 3131 may indicate a relative priority of a file. The cache management system 3112 may be configured to admit (and/or retain) higher priority files into the cache storage device 3110 in lieu of lower-priority files. For example, some operating systems 3104 may utilize a page file in support of a virtual memory system (e.g., "pagefile.sys" in Microsoft Windows® systems). The page file may be assigned a high priority in the file selection criteria 3131 to ensure that it is retained in the cache. The tuning behavior of the file selection criteria 3131 may be used in conjunction with other factors of the cache policy 3130, such as access frequency, access time (e.g., LRU), clock sweep, and the like.

In some embodiments, file selection criteria 3131 may be used to define cache directives at a file-level of granularity. For example, the file selection criteria 3131 may be used to pin data of a particular file within the cache storage device 3110 (e.g., pin pagefile.sys in the cache storage device 3110). Other file selection criteria 3131 may be used to prefetch file data into the cache storage device 3110. In some embodiments, file selection criteria 3131 may be used to prefetch and/or pin files of the operating system 3104 and/or storage client 3103. For example, files required to boot the operating system 3104 may be pinned in the cache storage device 3110 to reduce system startup time. In another example, application files of a storage client 3103 may be prefetched and/or pinned within the cache storage device 3110 to improve the performance of the storage client 3103.

In some embodiments, certain resources, such as boot files for the operating system 3104, may be shared between virtual machines and/or virtual machines and a host. Referring to FIG. 31B, the cache storage device 3110 may be shared between a plurality of virtual machines VM-1 to N operating on a host 3102. The cache storage device 3110 may be configured to pin files of an operating system 3104 shared by two or more of the virtual machines VM-1-N and/or host 3102.

The cache policy 3130 may further comprise application criteria 3132, which may be used to determine whether a particular I/O request should be cached based upon application-specific rules pertaining to the I/O request. As used herein, application criteria refers to application-specific cache directives and/or rules. Application criteria may reflect application-level knowledge, such as storage requirements of an application, data access patterns of an application, and so on. As discussed above, I/O requests are typically performed on behalf of a storage client 3103, such as an application, file system, server, or the like. The application criteria 3132 may be used to tune the file-level cache 3101 in accordance with application-level knowledge pertaining to the storage client 3103.

In some embodiments, application criteria 3132 may be used to prevent caching for certain storage clients 3103. For example, a backup application storage client 3103 may generate a large number of I/O requests in the storage stack 3108. Application criteria pertaining to the backup storage client 3103 may indicate that these accesses are "one-time" use (copying files to a backup storage location) and that the I/O request data should not be cached. In fact, caching this data would "poison" the cache storage device 3110 with data that is unlikely to be requested again. Accordingly, a user (or other entity) may define application criteria 3132 that indicates that I/O requests associated with the backup application storage client 3103 should be ignored, even if the particular file is a cacheable file per the file selection criteria 3131. Other cache levels may comprise similar application criteria. Application criteria 3132 may be defined to prevent other types of storage clients 3103 from poisoning the cache storage device 3110, such as sequential streaming storage clients 3103 (e.g. video, music, or other media players), virus scanner storage clients 3103, and the like.

In some embodiments, the I/O request monitor 3114A is configured to identify an application (e.g., storage client 3103) associated with an I/O request. The I/O request monitor 3114A may include an application identifier in I/O request metadata (e.g., in a context of the I/O request), as described above. The I/O request monitor 3114A may provide an indicator of the application associated with an I/O request to the cache management system 3112, along with other I/O request metadata, such as source identifier, and the like.

The file selection criteria 3131 and/or the application criteria 3132 may be used in conjunction with the I/O cache limits of the cache management system 3112 discussed above. For example, I/O requests that exceed a maximum cache size or are smaller than a minimum cache threshold may be ignored, even if the I/O request pertains to a cacheable file per the file selection criteria 3131 and/or application criteria 3132.

Other application criteria 3142 may be used to tune the file-level cache 3101 for certain storage clients 3103. For example, a particular storage client 3103 may access data according to a pre-determined access pattern (e.g., access data in N kb sized portions). When servicing a cache miss for the particular storage client 3103, the application criteria 3142 may be used to prefetch data into the cache storage device 3110 in accordance with the access pattern (e.g., prefetch N kb into the cache storage device 3110).

In some embodiments, application criteria 3132 may be used to modify the behavior of the storage stack 3108. Application criteria 3132 may indicate that some write operations of a particular storage client 3103 should not be persisted to the primary storage 3126. The I/O request monitor 3114A may consume such requests, to bypass other, lower levels of the storage stack 3108 (e.g., prevent the write to primary storage 3126), as discussed above.

Figure 32:
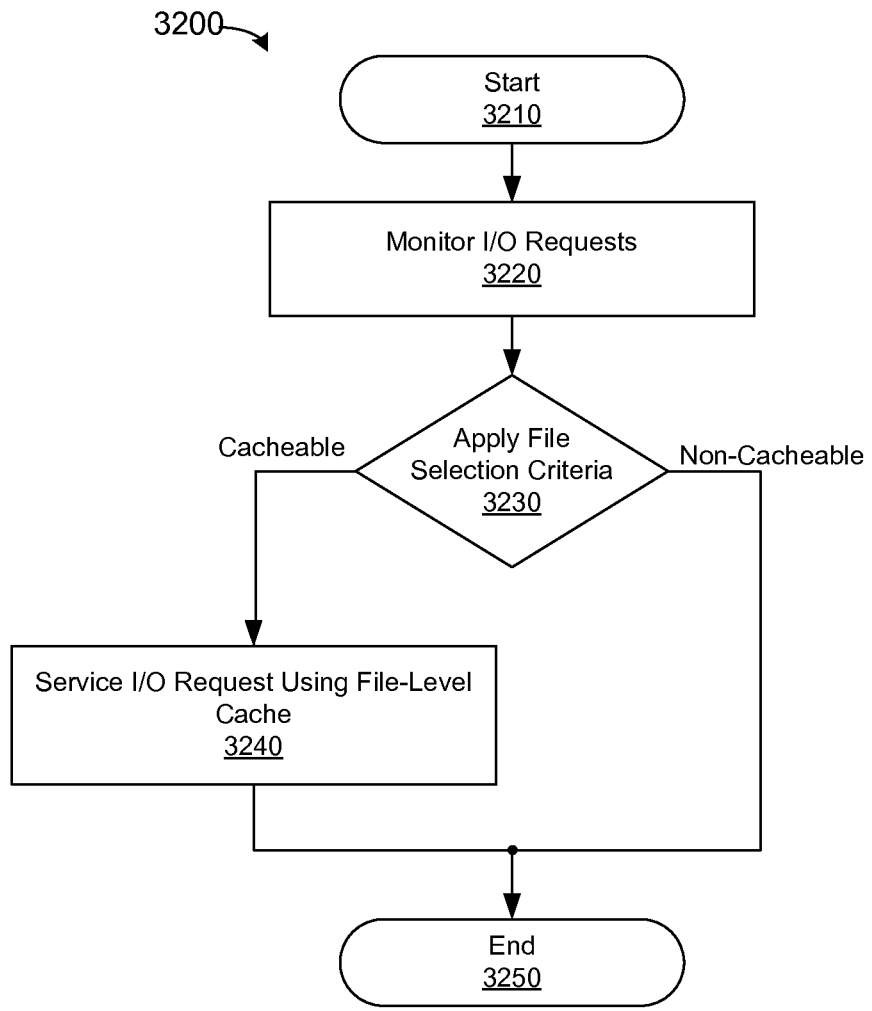
FIG. 32 is a flow diagram of one embodiment of a method for caching I/O request data on a file-level cache.

FIG. 32 is a flow diagram of one embodiment of a method 3200 for caching I/O request data on a cache storage device. At step 3210, the method 3200 starts and is initialized, as described above.

Step 3220 comprises monitoring I/O requests on a storage stack. The monitoring of step 3220 may comprise filtering I/O requests using a file filter or other suitable monitoring module, such as the I/O request monitor 2614 and/or 2614A, described above. The monitoring of step 3220 may be configured to ignore pre-determined storage requests, such as direct I/O requests, non-paging I/O requests, and the like. In some embodiments, step 3220 comprises configuring file selection criteria, as described above.

Step 3230 may comprise applying a cache policy to the monitored I/O requests to identify cacheable I/O requests. Step 3230 may comprise applying file selection criteria to identify I/O requests pertaining to cacheable files, as described above. In some embodiments, the file selection criteria may be user-defined. Accordingly, in some embodiments, a cacheable I/O request may be an I/O request that pertains to a cacheable file (e.g., a file that satisfies the file selection criteria). As described above, the file selection criteria may comprise any suitable criteria including, but not limited to: file name, file extension, regular expression, file path, application association, and the like.

In some embodiments, step 3230 may comprise accessing and/or updating I/O request metadata of the monitored I/O requests, as described above. For example, in response to an I/O request pertaining to a file (e.g., a file open, read, write, etc.), step 3230 may comprise updating metadata of the request (e.g., updating a "context" of the I/O request), with a source identifier, an indicator of whether the file is cacheable, and so on.

Alternatively, or in addition, step 3230 may comprise accessing existing metadata pertaining to a monitored I/O request. As discussed above, step 3230 may comprise updating I/O request metadata in response to certain I/O requests (e.g., file open, read, write, etc.). Subsequent, non-paging I/O requests, which are serviced using an existing cache manager, may be ignored. However, these I/O requests may result in one or more paging I/O requests that may be serviced using the cache storage device. Step 3230 may comprise accessing existing I/O request metadata, which was updated in response to one or more initial I/O requests (e.g., file open), to determine the source identifier of the I/O request, determine whether the I/O request pertains to a cacheable file, and so on.

If the I/O request is cacheable, the flow may continue to step 3240; otherwise, the flow ends at step 3250.

Step 3240 may comprise servicing the I/O request using a file-level cache (e.g., using a cache management system 2614A-N). When the cacheable I/O request is a read, step 3240 may comprise determining whether a cache storage device (e.g., cache storage device 3110) comprises data pertaining to the request. Step 3240 may, therefore, comprise accessing cache metadata to determine a cache storage location comprising the requested data (e.g., using a cache tag associated with a source identifier of the I/O request). When the cache storage device comprises the requested data, step 3240 may comprise reading the data from the cache storage device. When the cache storage device does not comprise the requested data, step 3240 may comprise servicing a cache miss, which may comprise accessing the requested data from primary storage and storing the data in the cache storage device. Step 3240 may further comprise pre-caching a portion of data that is not requested by the I/O request, in accordance with a cache policy.

When the cacheable I/O request is a write and/or modify, step 3240 may comprise determining whether the cache storage device comprises the data, as described above. When the cache storage device comprises data pertaining to the write operation, step 3240 may comprise updating the cache storage device with data of the I/O request. Step 3240 may further comprise acknowledging the I/O request when the data is stored on a primary store. Alternatively, the I/O request may be acknowledged when the data is stored on the cache storage device. In some embodiments, step 3240 may comprise allocating cache storage for the I/O request data. Step 3240 may comprise evaluating cache policy to identify one or more eviction candidates (e.g., steal candidates) based upon file priority data, cache policy data (e.g., pin directives), or the like, as described above. A source identifier of the I/O request may be associated with a cache storage location using the allocated cache tags.

At step 3250, the flow ends until a next I/O request is monitored at step 3220.

As discussed herein, the invention may involve a number of functions to be performed by a computer processor, such as a microprocessor. The microprocessor may be a specialized or dedicated microprocessor that is configured to perform particular tasks according to the invention, by executing machine-readable software code that defines the particular tasks embodied by the invention. The microprocessor may also be configured to operate and communicate with other devices such as direct memory access modules, memory storage devices, Internet-related hardware, and other devices that relate to the transmission of data in accordance with the invention. The software code may be configured using software formats such as Java, C++, XML (Extensible Mark-up Language) and other languages that may be used to define functions that relate to operations of devices required to carry out the functional operations related to the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention.

Within the different types of devices, such as laptop or desktop computers, hand held devices with processors or processing logic, and also possibly computer servers or other devices that utilize the invention, there exist different types of memory devices for storing and retrieving information while performing functions according to the invention. Cache memory devices are often included in such computers for use by the central processing unit as a convenient storage location for information that is frequently stored and retrieved. Similarly, a persistent memory is also frequently used with such computers for maintaining information that is frequently retrieved by the central processing unit, but that is not often altered within the persistent memory, unlike the cache memory. Main memory is also usually included for storing and retrieving larger amounts of information such as data and software applications configured to perform functions according to the invention when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. During data storage and retrieval operations, these memory devices are transformed to have different states, such as different electrical charges, different magnetic polarity, and the like. Thus, systems and methods configured according to the invention as described herein enable the physical transformation of these memory devices. Accordingly, the invention as described herein is directed to novel and useful systems and methods that, in one or more embodiments, are able to transform the memory device into a different state. The invention is not limited to any particular type of memory device, or any commonly used protocol for storing and retrieving information to and from these memory devices, respectively.

Embodiments of the systems and methods described herein facilitate the management of data input/output operations. Additionally, some embodiments may be used in conjunction with one or more conventional data management systems and methods, or conventional virtualized systems. For example, one embodiment may be used as an improvement of existing data management systems.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

Finally, although specific embodiments of the invention have been described and illustrated, the invention is not to be limited to the specific forms or arrangements of parts so described and illustrated. The scope of the invention is to be defined by the claims appended hereto and their equivalents.

We claim:

1. A method for caching input/output (I/O) request data using a non-volatile cache, the method comprising:
   monitoring I/O requests on an operating system operating on a computing device;
   applying file selection criteria to the monitored I/O requests to identify I/O requests pertaining to cacheable files;
   filtering the identified I/O requests to select I/O requests of the identified I/O requests that satisfy an application selection criterion, wherein filtering a particular one of the identified I/O requests comprises,
      determining an application associated with the particular I/O request, and
      selecting the particular I/O request to be serviced using a non-volatile cache in response to the determined application satisfying the application selection criterion; and
   servicing the selected I/O requests determined to pertain to cacheable files and to satisfy the application selection criterion using the non-volatile cache.

2. The method of claim 1, further comprising monitoring the I/O requests using a file filter driver.

3. The method of claim 1, further comprising monitoring the I/O requests within a guest operating system of a virtual machine, wherein the non-volatile cache is provided by a host of the virtual machine.

4. The method of claim 1, wherein monitoring the I/O requests comprises ignoring one or more of non-paging I/O requests and direct I/O requests.

5. The method of claim 1, wherein servicing the particular I/O request using the non-volatile cache comprises:

allocating a cache tag to associate an identifier of a cacheable file of the particular I/O request with a cache address of the non-volatile cache; and storing data of the particular I/O request on the non-volatile cache at the cache address.

6. The method of claim 1, further comprising maintaining a plurality of cache tags to associate data of cacheable files with respective cache addresses of the non-volatile cache, wherein servicing the particular I/O request comprises:

identifying a cache tag associated with a source identifier of a cacheable file of the particular I/O request; and servicing the particular I/O request using a cache address of the identified cache tag.

7. The method of claim 1, wherein servicing the particular I/O request using the non-volatile cache comprises one of one of accessing data on the non-volatile cache, writing data to the non-volatile cache, modifying data on the non-volatile cache, and removing data on the non-volatile cache.

8. The method of claim 1, further comprising:

updating I/O request metadata to indicate that the particular I/O request pertains to a cacheable file and satisfies the application selection criterion;

accessing the I/O request metadata in response to monitoring a subsequent I/O request associated with the particular I/O request; and determining by way of the I/O request metadata that the subsequent I/O request is selected to be serviced using the non-volatile cache.

9. The method of claim 8, wherein the particular I/O request comprises one of a non-paging I/O request, a direct I/O request, a file open request, a file modify request, a file read request, and a file update request, and a file truncate request.

10. The method of claim 1, wherein selecting the particular I/O request to be serviced using the non-volatile cache comprising matching the determined application associated with the particular I/O request to one of an application whitelist and an application blacklist.

11. The method of claim 10, wherein the application criterion prevents I/O requests of the identified I/O requests pertaining to cacheable files that are associated with one of a backup application and a virus scanning application from being selected to be serviced using the non-volatile cache.

12. The method of claim 1, wherein the operating system comprises a storage stack and an existing cache manager, the method further comprising servicing a cache miss in the existing cache manager using the non-volatile cache.

13. The method of claim 1, wherein selecting the particular I/O request to be serviced using the non-volatile cache further comprises determining that a size of data for the particular I/O request satisfies a maximum size threshold and a minimum size threshold.

14. The method of claim 1, further comprising admitting data of the selected I/O requests that pertain to cacheable files and that satisfy the application selection criterion into the non-volatile cache in accordance with a cache admission policy configured to prevent poisoning the non-volatile cache.

15. A system for caching input/output (I/O) request data using a non-volatile cache, comprising:

an I/O request monitor to monitor I/O requests within a storage stack;

a non-volatile cache; and a cache management system configured to apply file selection criteria to the monitored I/O requests to identify I/O requests that pertain to cacheable files, wherein the cache management system is further configured to apply an application selection criteria to the identified I/O requests that pertain to cacheable files, the application selection criterion to select I/O requests of the identified I/O requests that are associated with an application that satisfies the application selection criteria, and wherein the cache management system services the selected I/O requests that pertain to cacheable files and that satisfy the application selection criteria using the non-volatile cache.

16. The system of claim 15, wherein the cache management system operates within a virtual machine and is configured to service the selected I/O requests using cache metadata maintained within the virtual machine, and wherein non-volatile cache operates within the host of the virtual machine.

17. The system of claim 15, wherein the cache management system is configured to service particular one of the selected I/O requests using the non-volatile cache by;

allocating a cache tag in cache metadata that associates a source identifier of the particular I/O request with a cache address of the non-volatile cache, and storing data of the particular I/O request on the non-volatile cache at the cache address.

18. The system of claim 15, wherein the cache management system is configured to service particular one of the selected I/O requests using the non-volatile cache by;

identifying a cache tag corresponding to a source identifier of the particular I/O request; and accessing data of the particular I/O request on the non-volatile cache at a cache address of the cache tag.

19. The system of claim 15, wherein the file selection criteria comprises one of file name matching criteria, file extension criteria, file path criteria, file application association criteria, and a regular expression.

20. The system of claim 15, wherein the I/O request monitor is configured to ignore one or more of non-paging I/O requests and direct I/O requests.

21. The system of claim 15, wherein in response determining that a first I/O request satisfies the file selection criteria and that the first I/O request satisfies the application selection criteria, the cache management system is configured to associate the first I/O request with I/O request metadata comprising one of a source identifier and an indication that the first I/O request is selected to be serviced using the non-volatile cache, and wherein, the cache management system is configured to service a second, subsequent I/O request using the non-volatile cache in response to determining that the second I/O request corresponds to the first I/O request using the I/O request metadata.

22. A non-transitory computer-readable storage medium comprising computer-readable instructions configured to cause a computing device to perform operations, comprising:

monitoring I/O requests within a virtual machine;

applying file selection criteria to the monitored I/O requests to identify I/O requests pertaining to cacheable files;

applying application selection criteria to the identified I/O requests pertaining to cacheable files to select I/O requests of the identified I/O requests associated with applications that satisfy the application selection criteria; and servicing the selected I/O requests that pertain to cacheable files and that are associated with applications that satisfy the application selection criteria using a non-volatile cache operating in the host for the virtual machine, wherein servicing a particular one of the selected I/O requests comprises accessing cache metadata that associates a source identifier of the particular I/O request with a respective cache address of the non-volatile cache.

* * * * *